United States Patent
Shimono et al.

(10) Patent No.: US 10,174,218 B2
(45) Date of Patent: Jan. 8, 2019

(54) INK SET AND IMAGE FORMING METHOD

(71) Applicant: FUJIFILM CORPORATION, Minato-ku, Tokyo (JP)

(72) Inventors: Katsuhiro Shimono, Kanagawa (JP); Takuya Arai, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/682,565

(22) Filed: Aug. 22, 2017

(65) Prior Publication Data

US 2017/0349774 A1 Dec. 7, 2017

Related U.S. Application Data

(63) Continuation of application No. PCT/JP2016/055716, filed on Feb. 25, 2016.

(30) Foreign Application Priority Data

Feb. 27, 2015 (JP) ................................ 2015-039453
Sep. 30, 2015 (JP) ................................ 2015-194355

(51) Int. Cl.
| | |
|---|---|
| *B41J 2/175* | (2006.01) |
| *B41J 2/21* | (2006.01) |
| *G01D 11/00* | (2006.01) |
| *C09D 11/54* | (2014.01) |
| *B41J 2/01* | (2006.01) |
| *B41M 5/00* | (2006.01) |
| *C09D 11/10* | (2014.01) |
| *C09D 11/107* | (2014.01) |
| *C09D 11/40* | (2014.01) |

(52) U.S. Cl.
CPC .............. *C09D 11/54* (2013.01); *B41J 2/01* (2013.01); *B41M 5/00* (2013.01); *B41M 5/0017* (2013.01); *C09D 11/10* (2013.01); *C09D 11/107* (2013.01); *C09D 11/40* (2013.01)

(58) Field of Classification Search
CPC ......... B41J 2/175; B41J 2/2107; G01D 11/00; C09D 11/54; C09D 1/00
See application file for complete search history.

(56) References Cited

U.S. PATENT DOCUMENTS

| | | | | |
|---|---|---|---|---|
| 6,398,355 | B1 * | 6/2002 | Shirota | C09D 11/38 347/100 |
| 2003/0189626 | A1 * | 10/2003 | Kataoka | C09D 11/30 347/98 |
| 2006/0057339 | A1 | 3/2006 | Adachi et al. | |
| 2009/0233064 | A1 | 9/2009 | Yatake et al. | |
| 2012/0092411 | A1 * | 4/2012 | Hakiri | C09D 11/326 347/20 |
| 2013/0249996 | A1 * | 9/2013 | Saito | C09D 1/00 347/21 |

FOREIGN PATENT DOCUMENTS

| | | |
|---|---|---|
| EP | 2233634 A1 | 9/2010 |
| JP | H08-157731 A | 6/1996 |
| JP | 2002-302627 A | 10/2002 |
| JP | 2005-052984 A | 3/2005 |
| JP | 2005-138503 A | 6/2005 |
| JP | 2006264267 A2 * | 10/2006 |
| JP | 2010-155959 A | 7/2010 |
| JP | 2010-194998 A | 9/2010 |
| JP | 2013-018156 A | 1/2013 |
| JP | 2013-018948 A | 1/2013 |
| JP | 2013018156 A2 * | 1/2013 |
| JP | 2013-072045 A | 4/2013 |
| JP | 2013-199719 A | 10/2013 |
| JP | 2015-202617 A | 11/2015 |

OTHER PUBLICATIONS

International Search Report issued in International Application No. PCT/JP2016/055716 dated May 31, 2016.
Written Opinion of the ISA issued in International Application No. PCT/JP2016/055716 dated May 31, 2016.
Extended European Search Report dated Dec. 14, 2017, issued in corresponding EP Patent Application No. 16755658.8.
English language translation of the following: Office action dated Oct. 2, 2018 from the JPO in a Japanese patent application No. 2017-502491 corresponding to the instant patent application.

* cited by examiner

*Primary Examiner* — Jason S Uhlenhake
(74) *Attorney, Agent, or Firm* — Solaris Intellectual Property Group, PLLC

(57) ABSTRACT

Provided is an ink set including an ink composition which contains a colorant and water; and a treatment liquid which contains water-insoluble resin particles in which the content of a carboxy group or a salt of the carboxy group is in a range of 1.0 mmol to 7.0 mmol per 1 g of the water-insoluble resin particles, a compound that causes the colorant in the ink composition to aggregate, and water.

19 Claims, No Drawings

INK SET AND IMAGE FORMING METHOD

CROSS-REFERENCE TO RELATED APPLICATION

This application is a Continuation of PCT International Application No. PCT/JP2016/055716, filed Feb. 25, 2016, which claims priority to Japanese Patent Application Nos. 2015-039453 filed Feb. 27, 2015, and 2015-194355 filed Sep. 30, 2015. Each of the above applications is hereby expressly incorporated by reference, in its entirety, into the present application.

BACKGROUND OF THE INVENTION

1. Field of the Invention

The present invention relates to an ink set and an image forming method.

2. Description of the Related Art

A recording method that uses an inkjet method has been widely used since high-quality images can be recorded on various substrates by ejecting an ink in the form of droplets from multiple nozzles provided on an inkjet head.

In image formation using an inkjet method, an image forming method of forming an image by bringing an ink containing a colorant and a treatment liquid containing a compound that causes components in the ink to aggregate into contact with each other is occasionally used. The ink and the treatment liquid have been used as an ink set.

For example, JP2013-18948A discloses an ink set including an ink composition which contains resin particles and a pigment; and a treatment liquid which contains an organic acidic compound having a specific structure. It is considered that an image whose graininess is suppressed can be obtained by using such an ink set.

Further, JP2013-72045A discloses an ink set including an ink composition which contains a pigment and water; and a treatment liquid which contains a water-soluble polymer compound, an organic acidic compound, silicon oil, and water. It is considered that coating unevenness of the treatment liquid can be suppressed and an image whose graininess is suppressed can be obtained by using such an ink set.

SUMMARY OF THE INVENTION

However, in a case where an image is attempted to be formed on a substrate having a surface with high water repellency (for example, a surface having a contact angle with water of 70° or greater) using the ink sets described in JP2013-18948A and JP2013-72045A, the amount of impacted droplets of an ink becomes smaller than the amount of droplets impacted on plain paper or the like since wettability of the surface of the substrate with respect to water is low. Since a treatment liquid used to suppress the graininess causes the ink to aggregate in such a state, the size of droplets of the ink that forms an image becomes extremely smaller and a decrease in density and striped unevenness tend to occur in a case where a solid image is formed.

An embodiment of the present invention has been made in consideration of the above-described problem, and the purpose of the present invention is to provide an ink set used to form an image in which the density of a solid image portion is decreased and striped unevenness (hereinafter, also referred to as streak unevenness) and graininess are suppressed; and an image forming method. Further, an object of the present invention is to achieve the purpose.

The "solid image" in the present specification indicates a surface image formed by applying an ink composition at a halftone dot rate (density). The "decrease in density of a solid image portion" indicates a phenomenon in which an image is affected by the color of a substrate so that the numerical value of the color density is more decreased than the intended color density because the size of droplets of an ink composition landed on the substrate is small or a phenomenon in which an ink composition is moved due to impact interference of the ink composition and an image is affected by the color of a substrate so that the numerical value of the color density is more decreased than the intended color density, in a case where a solid image is formed on the substrate.

The "streak unevenness" indicates a phenomenon in which shading occurs in the form of a stripe because ejection bending or the like occurs at the time of image formation and an ink composition is impacted by being shifted from a predetermined position or a phenomenon in which shading occurs in the form of a stripe because an ink composition is moved due to impact interference of the ink composition.

The "graininess" indicates a phenomenon in which extremely small density unevenness occurs in an image so that the uniformity of pixels is degraded because droplets are united after an ink composition is impacted on a substrate.

Specific means for solving the above-described problem includes the following aspects.

<1> An ink set comprising: an ink composition which contains a colorant and water; and a treatment liquid which contains water-insoluble resin particles in which the content of a carboxy group or a salt of the carboxy group is in a range of 1.0 mmol to 7.0 mmol per 1 g of the water-insoluble resin particles, a compound that causes the colorant in the ink composition to aggregate, and water.

<2> The ink set according to <1>, in which the water-insoluble resin particles further include a sulfo group or a salt of the sulfo group.

<3> The ink set according to <2>, in which the water-insoluble resin particles include at least one sulfo group or salt of the sulfo group in a terminal of a water-insoluble resin.

<4> The ink set according to <2> or <3>, in which the content of the sulfo group or the salt of the sulfo group in the water-insoluble resin particles is in a range of 0.1 mmol to 1.2 mmol per 1 g of the water-insoluble resin particles.

<5> The ink set according to any one of <2> to <4>, in which a ratio of the total amount of the sulfo group or the salt of the sulfo group to the total amount of the carboxy group or the salt of the carboxy group, per 1 g of the water-insoluble resin particles, is in a range of 0.08 to 2.0 on a molar basis.

<6> The ink set according to any one of <1> to <5>, in which the water-insoluble resin particles include at least one constitutional unit selected from a constitutional unit represented by Formula 1 or 2, and the total content of the constitutional unit represented by Formula 1 and the constitutional unit represented by Formula 2 is in a range of 10% by mass to 50% by mass with respect to the total mass of the water-insoluble resin particles.

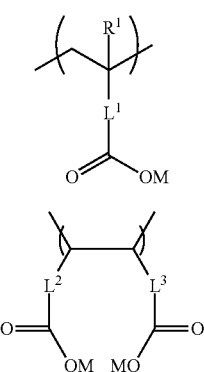

Formula (1)

Formula (2)

In Formula 1, $R^1$ represents a methyl group or a hydrogen atom, $L^1$ represents a single bond, a linear, branched, or cyclic alkylene group having 1 to 12 carbon atoms, an arylene group having 6 to 12 carbon atoms, —O—, —NH—, —S—, —C(=O)—, or a divalent linking group formed by two or more of these being linked to each other, and M represents a hydrogen atom or a cation.

In Formula 2, $L^2$ and $L^3$ each independently represent a single bond or a methylene group, and M represents a hydrogen atom or a cation.

<7> The ink set according to any one of <1> to <6>, in which the water-insoluble resin particles include a constitutional unit represented by Formula 3, and the content of the constitutional unit represented by Formula 3 is in a range of 5% by mass to 25% by mass with respect to the total mass of the water-insoluble resin particles.

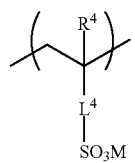

Formula 3

In Formula 3, $R^4$ represents a methyl group or a hydrogen atom, $L^4$ represents a single bond, a linear, branched, or cyclic alkylene group having 1 to 10 carbon atoms, an arylene group having 6 to 10 carbon atoms, —O—, —NH—, —S—, —C(=O)—, —CH(—OH)—, or a divalent linking group formed by two or more of these being linked to each other, and M represents a hydrogen atom or a cation.

<8> The ink set according to any one of <1> to <7>, in which the water-insoluble resin particles include a constitutional unit containing a hydrophobic group, and the content of the constitutional unit containing a hydrophobic group is in a range of 5% by mass to 40% by mass with respect to the total mass of the water-insoluble resin particles.

<9> The ink set according to <8>, in which a ratio of the content of the constitutional unit containing a hydrophobic group to the content of a constitutional unit derived from a monomer containing a carboxy group or a salt of the carboxy group is in a range of 0.2 to 1.4 on a mass basis, in the water-insoluble resin particles.

<10> The ink set according to <8> or <9>, in which the constitutional unit containing a hydrophobic group is at least one constitutional unit selected from constitutional units represented by Formulae A to F.

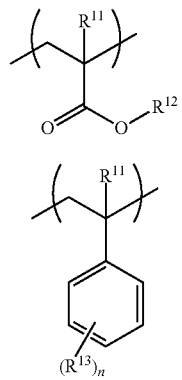

Formula A

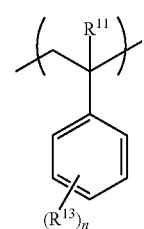

Formula B

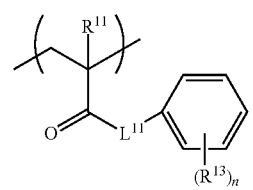

Formula C

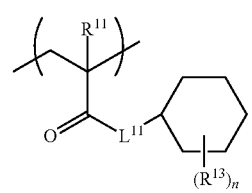

Formula D

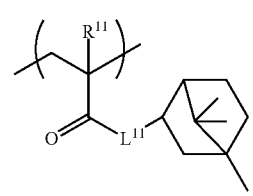

Formula E

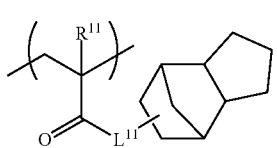

Formula F

In Formulae A to F, $R^{11}$ represents a methyl group or a hydrogen atom, $R^{12}$ and $R^{13}$ each independently represent a chain-like or branched alkyl group having 4 or more carbon atoms, n represents an integer of 0 to 6, $L^{11}$ represents a single bond or a linear, branched, or cyclic alkylene group having 1 to 18 carbon atoms, an arylene group having 6 to 18 carbon atoms, —O—, —NH—, —S—, —C(=O)—, or a divalent linking group formed by two or more of these being linked to each other.

<11> The ink set according to any one of <1> to <10>, in which the content of the water-insoluble resin particles is in a range of 0.5% by mass to 20% by mass with respect to the total mass of the treatment liquid.

<12> The ink set according to any one of <1> to <11>, in which a volume average particle diameter of the water-insoluble resin particles is 1 μm or less.

<13> The ink set according to any one of <1> to <12>, in which a glass transition temperature of the water-insoluble resin particles is in a range of 100° C. to 250° C.

<14> The ink set according to any one of <1> to <13>, in which a weight-average molecular weight of the water-insoluble resin particles is in a range of $5.0 \times 10^3$ to $5.00 \times 10^4$.

<15> The ink set according to any one of <1> to <14>, in which the compound that causes the colorant in the ink composition to aggregate is an organic acidic compound.

<16> The ink set according to any one of <1> to <15>, in which a ratio of the content of the water-insoluble resin particles to the content of the compound that causes the colorant in the ink composition to aggregate is in a range of 0.01 to 2.0 on a mass basis.

<17> An image forming method comprising: a pre-treatment step of applying the treatment liquid of the ink set according to any one of claims 1 to 16 to at least one surface of a substrate having a contact angle of 70° or greater when 3 seconds have elapsed from application of water droplets to the surface; and an image forming step of forming an image by ejecting the ink composition of the ink set according to any one of claims 1 to 16 to the surface of the substrate to which the treatment liquid is applied.

<18> The image forming method according to <17>, in which the substrate is a paper substrate having a coating layer using an inkjet method.

According to one embodiment of the present invention, it is possible to provide an ink set used to form an image in which the density of a solid image portion is decreased and striped unevenness (streak unevenness) and graininess are suppressed; and an image forming method.

DESCRIPTION OF THE PREFERRED EMBODIMENTS

Hereinafter, an ink set and an image forming method will be described in detail.

In the present specification, the numerical ranges shown using "to" indicate ranges including the numerical values described before and after "to" as the lower limits and the upper limits.

<<Ink Set>>

An ink set includes an ink composition which contains a colorant and water; and a treatment liquid which contains water-insoluble resin particles in which the content of a carboxy group or a salt of the carboxy group is in a range of 1.0 mmol to 7.0 mmol per 1 g of the water-insoluble resin particles (hereinafter, also simply referred to as water-insoluble resin particles), a compound that causes the colorant in the ink composition to aggregate (hereinafter, also referred to as an aggregation compound), and water.

The detailed operation mechanism according to one embodiment of the present invention is not clear, but it is speculated that the mechanism is operated as follows.

Since water-soluble resins which have been used for a treatment liquid in ink sets of the related art are not in a particle state, the water-soluble resins easily enter the inside of a substrate and effects of improving wettability of the surface of the substrate cannot be expected. Further, surfactants are occasionally used in order to improve the wettability of the surface of a substrate, but the effects of improving the wettability using surfactants are not sufficient in some cases.

On the contrary, according to the embodiment of the present invention, the treatment liquid contains water-insoluble resin particles in which the content of a carboxy group or a salt of the carboxy group is in a range of 1.0 mmol to 7.0 mmol per 1 g of the water-insoluble resin particles. It is considered that the water-insoluble resin particles contained in the treatment liquid are unlikely to enter the inside of the substrate and unevenly distributed in a surface of the substrate in a case where the treatment liquid is applied to the substrate. Particularly, when the water-insoluble resin particles containing a carboxy group or a salt of the carboxy group are unevenly distributed in a hydrophobic surface of the substrate (for example, a substrate having a contact angle of 70° or greater when 3 seconds have elapsed from application of water droplets to the surface), the wettability of the surface of the substrate is remarkably improved.

When an ink composition is impacted on the surface of the substrate to which such specific resin particles are applied, it is considered that the size of droplets of the impacted ink composition does not become extremely small and thus the droplets are prevented from being united and the size of droplets becomes the target size in a case where an aggregation compound contained in the treatment liquid causes the colorant in the ink composition to aggregate.

As the result, the liquid droplets of the ink composition are disposed at a desired size in a desired position of the substrate. Therefore, an image in which the density of a solid image portion is decreased and streak unevenness and graininess are suppressed is considered to be formed.

Hereinafter, the treatment liquid and the ink composition of the ink set will be described.

<Treatment Liquid>

The treatment liquid contains water-insoluble resin particles in which the content of a carboxy group or a salt of the carboxy group is in a range of 1.0 mmol to 7.0 mmol per 1 g of the water-insoluble resin particles, a compound that causes the colorant in the ink composition to aggregate (aggregation compound), and water.

The treatment liquid may contain components other than the water-insoluble resin particles, the aggregation compound, and water within the range in which effects of the embodiment of the present invention are exhibited.

[Water-Insoluble Resin Particles]

The treatment liquid contains at least one kind of water-insoluble resin particles.

As the water-insoluble resin particles, water-insoluble resin particles in which the content of a carboxy group or a salt of the carboxy group in the structure is in a range of 1.0 mmol to 7.0 mmol per 1 g of the water-insoluble resin particles can be selected as appropriate and then used.

When the treatment liquid contains water-insoluble resin particles in which the content of a carboxy group or a salt of the carboxy group is in a range of 1.0 mmol to 7.0 mmol per 1 g of the water-insoluble resin particles, most of the water-insoluble resin particles are unevenly distributed in the surface of the substrate after the treatment liquid is applied so that the wettability of the surface of the substrate is improved. Accordingly, the droplets wet-spread over the surface of the substrate in a case where the ink composition described below is impacted on the surface and the aggregation compound contained in the treatment liquid causes the colorant in the ink composition to aggregate, and thus the droplets are prevented from being united and the size of droplets becomes the target size. As the result, an image in which the density of a solid image portion is decreased and streak unevenness and graininess are suppressed is formed.

Even when the water-insoluble resin particles are brought into contact with the aggregation compound described below, the dispersion state thereof in the treatment liquid is maintained.

The term "water-insoluble" of the water-insoluble resin particles indicates a state in which, when the volume average particle diameter is measured using an aqueous dispersion liquid of resin particles obtained by adjusting the concentration of solid contents to be in a range of 1% by mass to 2% by mass at a liquid temperature of 25° C., particles can be detected and the volume average particle diameter thereof can be measured. Further, the resin is in a state of being dissolved in water in a case where particles are not detected and the volume average particle diameter cannot be measured, and this state is typically referred to as a "water-soluble" state.

The volume average particle diameter can be measured using a nanotrac particle size distribution measurement apparatus UPA-EX150 (manufactured by Nikkiso Co., Ltd.) according to a dynamic light scattering method.

In a case where the substrate is a paper substrate including a coating layer, when water-soluble resin particles containing a carboxy group or a salt of the carboxy group are used, the carboxy group or the salt of the carboxy group interacts with a component (for example, calcium carbonate) of the coating layer and thus the water-insoluble resin particles are easily unevenly distributed in the surface of the substrate. Therefore, the wettability of the surface of the substrate can be further improved and the effects of restraining a decrease in density of a solid image portion and occurrence of streak unevenness are remarkably exhibited.

As the salt of a carboxy group in the water-insoluble resin particles, a structure obtained by substituting hydrogen atoms in a carboxy group with cations is exemplified. Examples of the cation include ions, for example, an alkali metal ion such as a sodium ion, a potassium ion, or a lithium ion; an alkaline earth metal ion such as a calcium ion or a magnesium ion; and an ammonium ion, but the examples are not limited to these.

From the viewpoint of further suppressing a decrease in density of a solid image portion and occurrence of streak unevenness, it is preferable that the water-insoluble resin particles contain a carboxy group or a salt of the carboxy group and a sulfo group or a salt of the sulfo group.

It is preferable that the water-insoluble resin particles containing a carboxy group or a salt of the carboxy group are water-insoluble resin particles formed of a polymer obtained by polymerizing a monomer containing a carboxy group or a salt of the carboxy group. In other words, it is preferable that the water-insoluble resin particles have a constitutional unit derived from a monomer containing a carboxy group or a salt of the carboxy group, as a constitutional unit.

It is preferable that the water-insoluble resin particles have at least one constitutional unit selected from a constitutional unit represented by Formula 1 or a constitutional unit represented by Formula 2, as the constitutional unit derived from a monomer containing a carboxy group or a salt of the carboxy group.

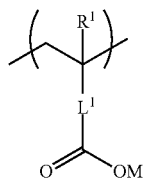

Formula (1)

In Formula 1, $R^1$ represents a methyl group or a hydrogen atom.

In Formula 1, $L^1$ represents a single bond, a linear, branched, or cyclic alkylene group having 1 to 12 carbon atoms, an arylene group having 6 to 12 carbon atoms, —O—, —NH—, —S—, —C(=O)—, or a divalent linking group formed by two or more of these being linked to each other. It is preferable that $L^1$ represents at least one group selected from the following group a.

In Formula 1, M represents a hydrogen atom or a cation. Examples of the cation include ions, for example, an alkali metal ion such as a sodium ion, a potassium ion, or a lithium ion; an alkaline earth metal ion such as a calcium ion or a magnesium ion; and an ammonium ion.

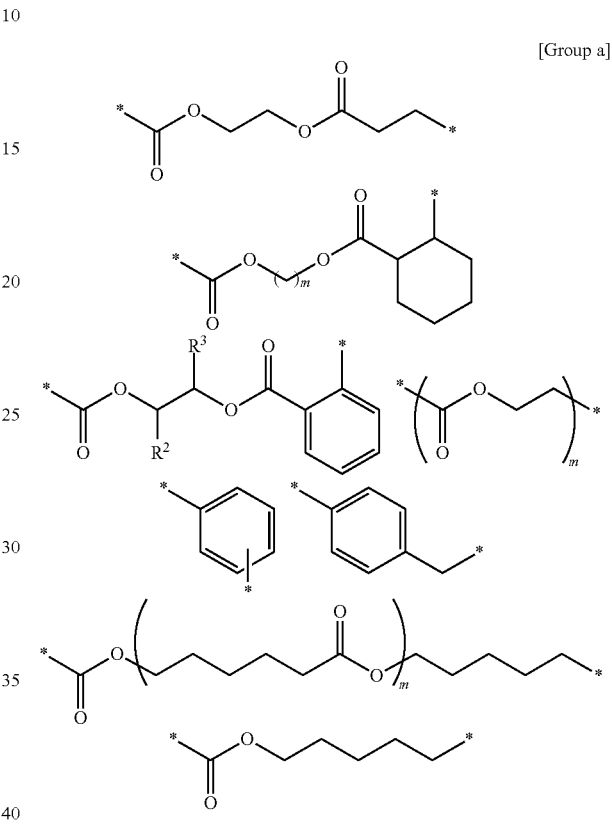

[Group a]

In groups shown in the group a, $R^2$ and $R^3$ each independently represent a hydrogen atom or a methyl group, m represents an integer of 1 to 5, and the symbol "*" represents a binding position.

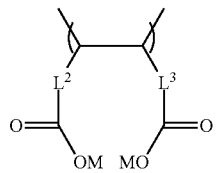

Formula (2)

In Formula 2, $L^2$ and $L^3$ each independently represent a single bond or a methylene group.

In Formula 2, M represents a hydrogen atom or a cation. Examples of the cation include ions, for example, an alkali metal ion such as a sodium ion, a potassium ion, or a lithium ion; an alkaline earth metal ion such as a calcium ion or a magnesium ion; and an ammonium ion.

Examples of the constitutional unit represented by Formula 1 or the constitutional unit represented by Formula 2 include unsaturated monocarboxylic acids such as acrylic acid, methacrylic acid, 2-acryloyloxyethylsuccinic acid, 2-methacryloyloxyethylphthalic acid, β-carboxyethyl acrylate (acrylic acid dimer), 2-methacryloyloxyethylhexahydrophthalic acid, 1-methyl-2-acryloyloxypropylphthalic acid, 2-methacryloyloxyethylsuccinic acid, 2-methacryloyloxyethyl-2-hydroxypropylphthalic acid, 2-methacryloyloxypropylhexahydrophthalic acid, 2-acryloyloxypropylphthalic acid, vinylphenylacetic acid, ω-carboxypolycaprolactone (n=2) monoacrylate, p-vinylbenzoic acid, 2-methacryloyloxyethylmaleic acid, monosodium itaconate, monobutyl maleate, crotonic acid, α-chloroacrylic acid, ethacrylic acid, and cinnamic acid; unsaturated dicarboxylic acids such as maleic acid, fumaric acid, itaconic acid, itaconic anhydride, citraconic acid, citraconic anhydride, and mesaconic acid; and constitutional units derived from monomers having salts of these.

Further, examples of counter ions of the salts include alkali metal ions such as a sodium ion, a potassium ion, and a lithium ion; alkaline earth metal ions such as a calcium ion and a magnesium ion; and ions such as an ammonium ion.

Specific examples of the constitutional units derived from monomers containing a carboxy group or a salt of the carboxy group will be described below, but the embodiment of the present invention is not limited to the following specific examples.

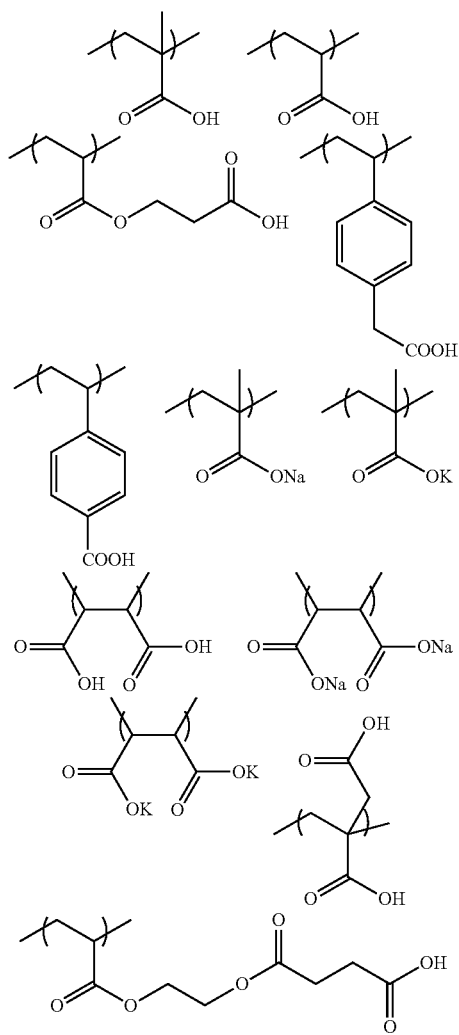

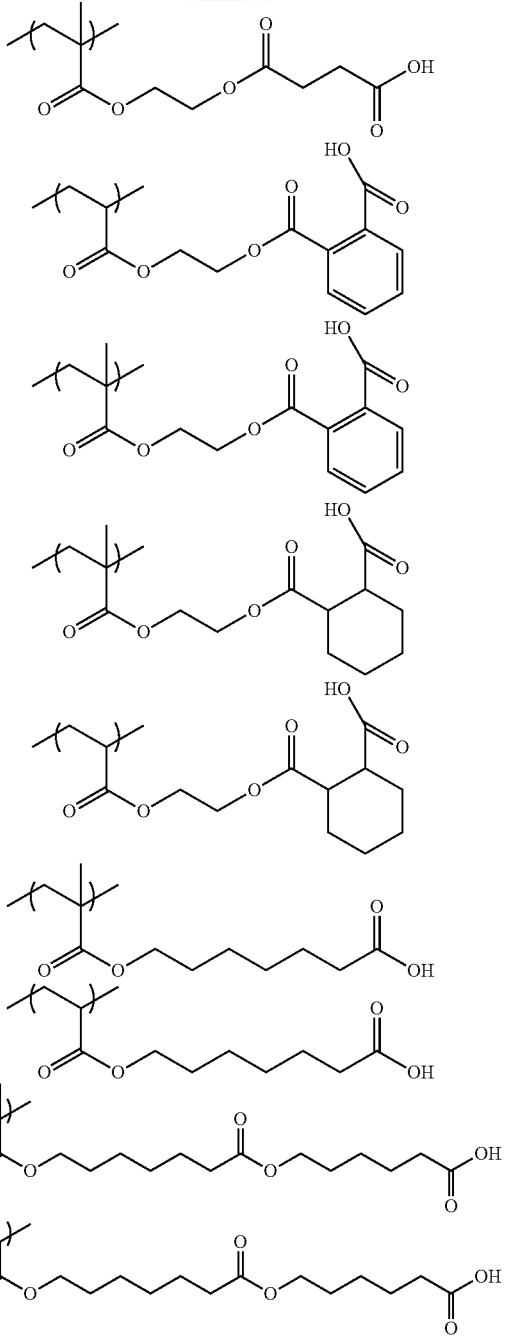

Further, in a case where carboxylic anhydride such as maleic acid anhydride is used as a monomer containing a carboxy group or a salt of the carboxy group, the carboxy group may be introduced into a constitutional unit using a method of copolymerizing the carboxylic anhydride to synthesize a polymer, hydrolyzing the synthesized polymer, and adding a strong acid thereto to regenerate a carboxy group.

For example, a constitutional unit derived from a monomer containing a tri- or higher valent unsaturated polyvalent carboxy group can be used in addition to the constitutional unit represented by Formula 1 or the constitutional unit represented by Formula 2 which is derived from a monomer having a carboxy group or a salt of the carboxy group.

Among constitutional units derived from monomers having a carboxy group or a salt of the carboxy group, constitutional units having a high acid value easily exhibit the effects of improving the wettability of the surface of the substrate. From this viewpoint, constitutional units derived from monomers having acrylic acid, methacrylic acid, β-carboxyethyl acrylate, maleic acid, itaconic acid, respectively with a low molecular weight, and salts of these are preferable. Preferred examples of counter ions of the salts include a sodium ion, a potassium ion, a lithium ion, and an ammonium ion.

Further, from the viewpoint of polymerizability, acrylic acid, methacrylic acid, sodium methacrylate, and β-carboxyethyl acrylate are more preferable.

It is preferable that the water-insoluble resin particles contain a sulfo group or a salt of the sulfo group in addition to a carboxy group or a salt of the carboxy group.

When the water-insoluble resin particles contain a sulfo group or a salt of the sulfo group, the effects of suppressing a decrease in density of a solid image portion and occurrence of streak unevenness become excellent. Further, in a case where an acidic compound is used as an aggregation compound described below, the dispersion stability of the water-insoluble resin particles in the treatment liquid is further improved when the water-insoluble resin particles contain a sulfo group or a salt of the sulfo group.

In the case where the water-insoluble resin particles contain a sulfo group or a salt of the sulfo group in the structure, it is preferable that the water-insoluble resin particles are formed of a polymer obtained by polymerizing a monomer containing a sulfo group or a salt of the sulfo group. In other words, it is preferable that the water-insoluble resin particles have a constitutional unit derived from a monomer containing a sulfo group or a salt of the sulfo group as the constitutional unit.

It is preferable that the water-insoluble resin particles have a constitutional unit represented by Formula 3 as the constitutional unit derived from a monomer containing a sulfo group or a salt of the sulfo group.

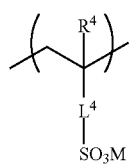

Formula 3

In Formula 3, $R^4$ represents a methyl group or a hydrogen atom.

In Formula 3, $L^4$ represents a single bond, a linear, branched, or cyclic alkylene group having 1 to 10 carbon atoms, an arylene group having 6 to 10 carbon atoms, —O—, —NH—, —S—, —C(=O)—, —CH(—OH)—, or a divalent linking group formed by two or more of these being linked to each other. It is preferable that $L^4$ represents at least one group selected from the following group a.

In Formula 3, M represents a hydrogen atom or a cation. Examples of the cation include ions, for example, an alkali metal ion such as a sodium ion, a potassium ion, or a lithium ion; an alkaline earth metal ion such as a calcium ion or a magnesium ion; and an ammonium ion.

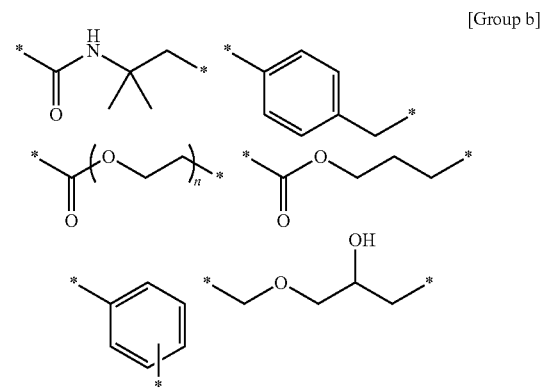

[Group b]

In groups shown in the group b, n represents an integer of 1 to 5 and the symbol "*" represents a binding position.

Examples of the constitutional unit represented by Formula 3 include constitutional units derived from monomers containing 2-acrylamide-2-methylpropanesulfonic acid, acrylamido-2-methylpropanesulfonic acid, vinylsulfonic acid, styrenesulfonic acid, α-methyl styrenesulfonic acid, 2-sulfoethyl (meth)acrylate, 3-sulfopropyl (meth)acrylate, methacryloyloxyethylsulfonic acid, vinylbenzylsulfonic acid, 1-allyloxy-2-hydroxypropylsulfonic acid, allyloxypolyethylene glycol (the polymerization degree of an ethylene glycol moiety: 10) sulfonic acid, and salts of these.

Further, examples of counter ions of the salts include alkali metal ions such as a sodium ion, a potassium ion, and a lithium ion; alkaline earth metal ions such as a calcium ion and a magnesium ion; and ions such as an ammonium ion.

As a method of synthesizing water-insoluble resin particles containing a sulfo group or a salt of the sulfo group, a monomer containing a sulfo group or a salt of the sulfo group may be copolymerized. Alternatively, a monomer containing a sulfo group may be copolymerized, and water-insoluble resin particles are synthesized and neutralized using a base to obtain a salt of a sulfo group.

Among the constitutional units derived from monomers having a sulfo group or a salt of the sulfo group, constitutional units derived from monomers containing acrylamide-2-methylpropanesulfonic acid or a salt of the acrylamide-2-methylpropanesulfonic acid and 3-sulfopropyl (meth)acrylate are preferable. Further, as counter ions of the salts, a sodium ion, a potassium ion, a lithium ion, and an ammonium ion are preferable and acrylamide-2-methylpropanesulfonic acid and sodium acrylamide-2-methylpropanesulfonate are more preferable.

Specific examples of the constitutional units derived from monomers containing a sulfo group or a salt of the sulfo group will be described below, but the embodiment of the present invention is not limited to the following specific examples.

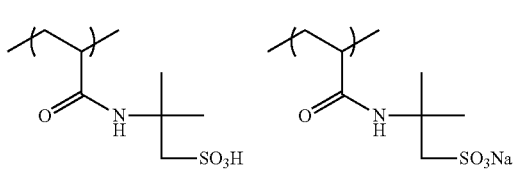

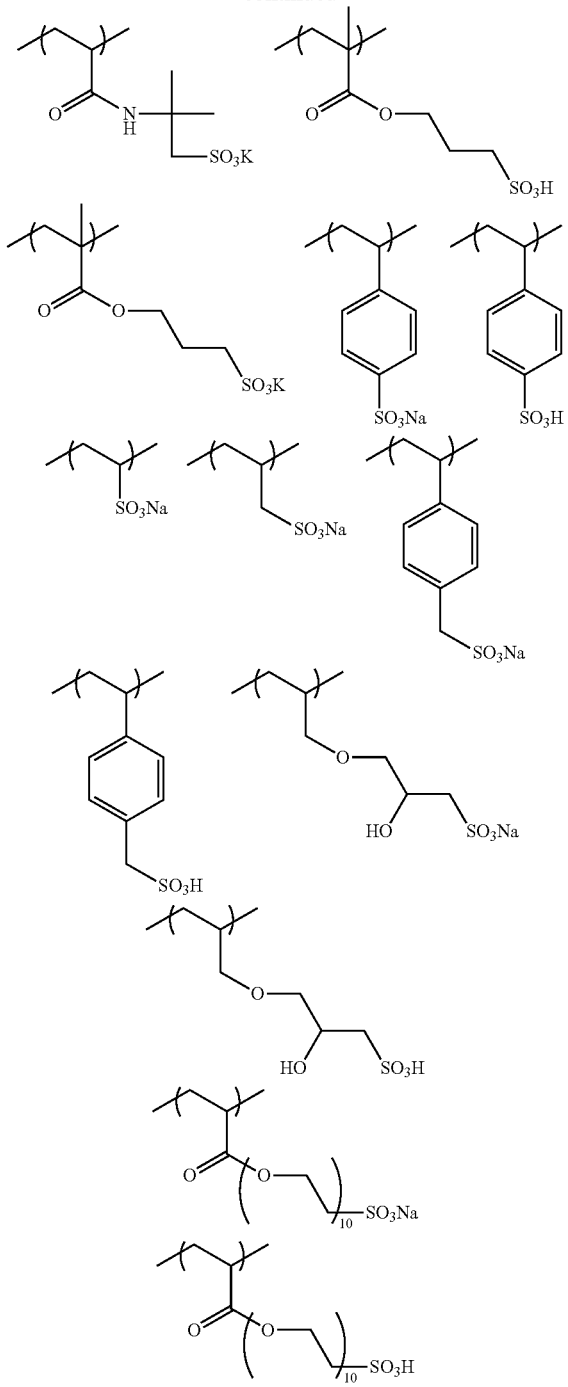

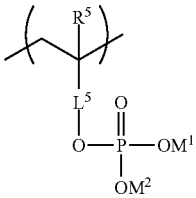

Formula 4

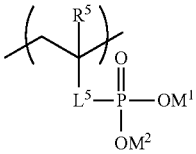

Formula 5

As the constitutional unit derived from a monomer containing a phosphoric acid group or a salt of the phosphoric acid group, a constitutional unit represented by Formula 4 is preferable. Further, as the constitutional unit derived from a monomer containing a phosphonic acid group or a salt of the phosphonic acid group, a constitutional unit represented by Formula 5 is preferable.

In Formulae 4 and 5, $R^5$ represents a methyl group or a hydrogen atom, and $L^5$ represents a single bond or a group selected from the following group c.

In Formulae 4 and 5, $M^1$ and $M^2$ each independently represent a hydrogen atom or a cation. Examples of the cation include ions, for example, an alkali metal ion such as a sodium ion, a potassium ion, or a lithium ion; an alkaline earth metal ion such as a calcium ion or a magnesium ion; an ammonium ion, and a monoethanol ammonium ion.

[Group c]

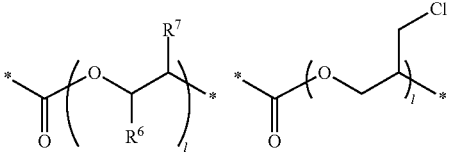

In groups shown in the group c, $R^6$ and $R^7$ each independently represent a hydrogen atom or a methyl group, 1 represents an integer of 1 to 10, and the symbol "*" represents a binding position.

Examples of the monomers forming the constitutional unit represented by Formula 4 or the constitutional unit represented by Formula 5 include 2-methacryloyloxyethyl acid phosphate (for example, Light Ester P-1M manufactured by KYOEISHA CHEMICAL Co., Ltd. or Phosmer M manufactured by Uni-chemical Co., Ltd.), bis(2-methacryloyloxyethyl) acid phosphate (for example, Light Ester P-2M manufactured by KYOEISHA CHEMICAL Co., Ltd.), acid phosphooxypolyoxyethylene glycol monomethacrylate (for example, Phosmer PE manufactured by Uni-chemical Co., Ltd.), 3-chloro-2-acid phosphooxypropyl methacrylate (for example, Phosmer CL manufactured by Uni-chemical Co., Ltd.), acid phosphooxypolyoxypropylene glycol monomethacrylate (for example, Phosmer PP manufactured by Uni-chemical Co., Ltd.), vinylphosphonic acid, and salts of these.

Further, examples of counter ions of the salts include alkali metal ions such as a sodium ion, a potassium ion, and The water-insoluble resin particles may contain at least one selected from a phosphoric acid group or a salt of the phosphoric acid group and a phosphonic acid group or a salt of the phosphonic acid group.

In other words, the water-insoluble resin particles may contain at least one selected from a constitutional unit derived from a monomer containing a phosphoric acid group or a salt of the phosphoric acid group and a constitutional unit derived from a monomer containing a phosphonic acid group or a salt of the phosphonic acid group, as the constitutional unit.

a lithium ion; alkaline earth metal ions such as a calcium ion and a magnesium ion; and ions such as an ammonium ion.

Further, dimethylaminoethyl methacrylate half salt (Phosmer MH) of 2-methacryloyloxyethyl acid phosphate is also preferably used.

As a method of synthesizing water-insoluble resin particles containing a phosphonic acid group or a salt of the phosphonic acid group and water-insoluble resin particles containing a phosphoric acid group or a salt of the phosphoric acid group, a monomer containing a phosphonic acid group or a salt of the phosphonic acid group or a monomer containing a phosphoric acid group or a salt of the phosphoric acid group may be copolymerized. Alternatively, monomers containing a phosphonic acid group and a phosphoric acid group may be copolymerized, and water-insoluble resin particles are synthesized and neutralized using a base to obtain a salt of a phosphonic acid group and a salt of a phosphoric acid group.

The content of the carboxy group or the salt of the carboxy group in the water-insoluble resin particles is preferably in a range of 1.0 mmol to 7.0 mmol, more preferably in a range of 1.0 mmol to 6.0 mmol, still more preferably in a range of 1.0 mmol to 5.0 mmol, and even still more preferably in a range of 1.5 mmol to 4.5 mmol per 1 g of the water-insoluble resin particles. When the content of the carboxy group or the salt of the carboxy group is 1.0 mmol or greater, the effects of suppressing a decrease in density of a solid image portion and occurrence of streak unevenness become excellent. Further, when the content of the carboxy group or the salt of the carboxy group is 7.0 mmol or less, the dispersion stability of the water-insoluble resin particles is improved.

The content of the carboxy group or the salt of the carboxy group can be acquired through conversion from the polymerization ratio of polymer components forming the water-insoluble resin particles, specifically, constitutional units derived from monomers containing a carboxy group or a salt of the carboxy group.

In a case where a carboxy group or a salt of the carboxy group is dissociated in the treatment liquid, the amount of a structure (—COO) formed by a hydrogen atom being separated from the carboxy group and a structure (for example, —COO in a case of —COONa) formed by a salt being separated from the salt of a carboxy group can be considered as the "content of the carboxy group or the salt of the carboxy group".

Further, the content of acidic groups or salts of the acidic groups, for example, a sulfo group or a salt of the sulfo group, a phosphonic acid group or a salt of the phosphonic acid group, and a phosphoric acid group or a salt of the phosphoric acid group can be acquired according to the same method as described above.

It is more preferable that the water-insoluble resin particles contain a carboxy group or a salt of the carboxy group and a sulfo group or a salt of the sulfo group. When the water-insoluble resin particles contain a sulfo group or a salt of the sulfo group in the structure to the extent that the resin particles are not solubilized in water, in addition to a carboxy group or a salt of the carboxy group, the hydrophilicity can be synergistically improved. Therefore, a decrease in density of a solid image portion and occurrence of streak unevenness can be further suppressed.

In a case where the water-insoluble resin particles contain a carboxy group or a salt of the carboxy group and further contain a sulfo group or a salt of the sulfo group, the content of the sulfo group or the salt of the sulfo group in the water-insoluble resin particles is preferably in a range of 0.005 mmol to 2.6 mmol, more preferably in a range of 0.1 mmol to 1.4 mmol, still more preferably in a range of 0.1 mmol to 1.2 mmol, particularly preferably in a range of 0.2 mmol to 1.2 mmol, and most preferably in a range of 0.4 mmol to 0.8 mmol per 1 g of the water-insoluble resin particles.

When the content of the sulfo group or the salt of the sulfo group is 0.005 mmol or greater, the dispersion stability of the water-insoluble resin particles becomes excellent. In addition, when the content thereof is 2.6 mmol or less, water-insoluble properties become excellent.

From the viewpoint of restraining aggregation caused by the contact with the aggregation compound, the content of the sulfo group or the salt of the sulfo group in the water-insoluble resin particles is preferably 0.005 mmol or greater and more preferably 0.1 mmol or greater per 1 g of the water-insoluble resin particles. Further, from the same viewpoint as described above, it is preferable that the water-insoluble resin particles contain a sulfo group or a salt of the sulfo group in at least one chain terminal of a polymer of the water-insoluble resin.

In a case where the water-insoluble resin particles contain a salt of a carboxy group, the aggregation compound and the salt of a carboxy group interact with each other and the particles are easily aggregated. Therefore, when the water-insoluble resin particles contain a sulfo group or a salt of the sulfo group, the dispersibility of the particles is not lost and the aggregation can be suppressed.

As the method of introducing a sulfo group or a salt of the sulfo group in the chain terminal of a polymer of the water-insoluble resin particles, a method of using persulfate such as potassium peroxodisulfate, sodium peroxodisulfate, or ammonium peroxodisulfate as a polymerization initiator described below in a case where the water-insoluble resin particles are prepared through polymerization is exemplified.

In the case where the water-insoluble resin particles contain a carboxy group or a salt of the carboxy group and a sulfo group or a salt of the sulfo group, a ratio of the total amount of the sulfo group or the salt of the sulfo group to the total amount of the carboxy group or the salt of the carboxy group, that is, [the amount (mmol) of the sulfo group or the salt of the sulfo group]/[the amount (mmol) of the carboxy group or the salt of the carboxy group] per 1 g of the water-insoluble resin particles is preferably in a range of 0.001 to 2.6, more preferably in a range of 0.08 to 2.3 from the viewpoint of having excellent effects on image quality, still more preferably in a range of 0.08 to 2.0, and even still more preferably in a range of 0.08 to 0.6 on a molar basis.

Further, the content of the constitutional unit (preferably the constitutional units represented by Formulae 1 and 2) derived from a monomer containing a carboxy group or a salt of the carboxy group in the water-insoluble resin particles is preferably in a range of 10% by mass to 60% by mass, more preferably in a range of 10% by mass to 50% by mass, and still more preferably in a range of 25% by mass to 40% by mass with respect to the total mass of the water-insoluble resin particles.

Further, in the case where the water-insoluble resin particles have a constitutional unit (preferably the constitutional unit represented by Formula 3) derived from a monomer containing a sulfo group or a salt of the sulfo group, the content of the constitutional unit derived from a monomer containing a sulfo group or a salt of the sulfo group is preferably in a range of 5% by mass to 25% by mass, more preferably in a range of 10% by mass to 25% by mass, and still more preferably in a range of 10% by mass to 20% by mass with respect to the total mass of the water-insoluble resin particles.

In a case where the water-insoluble resin particles are synthesized by copolymerizing constitutional units, the water-insoluble resin particles may have a constitutional unit containing a hydrophobic group and constitutional units derived from other monomers in addition to the constitutional units derived from monomers containing acidic groups such as a carboxy group or a salt of the carboxy group or salts of acidic groups. From the viewpoint of re-dispersibility of the treatment liquid, it is preferable that the water-insoluble resin particles have a constitutional unit containing a hydrophobic group.

The term "re-dispersibility" indicates a property of re-dispersion of the water-insoluble resin particles in a treatment liquid which occurs in a case where a new treatment liquid is supplied to a solidified material after water contained in a treatment liquid evaporates and the water-insoluble resin particles are deposited and solidified.

The "hydrophobic group" in the constitutional unit containing a hydrophobic group indicates a hydrocarbon group formed by 4 or more carbon atoms being bonded to each other. That is, a constitutional unit containing a hydrocarbon group formed by 4 or more carbon atoms being bonded to each other in a side chain thereof is referred to as a constitutional unit containing a hydrophobic group.

Further, the constitutional unit containing a hydrophobic group is different from the constitutional unit derived from a monomer containing the above-described acidic group or a salt of the acidic group in terms that the constitutional unit containing a hydrophobic group does not contain an acidic group or a salt of the acidic group.

When the water-insoluble resin particles have the constitutional unit containing a hydrophobic group, the re-dispersibility thereof in the treatment liquid after being dried is excellent.

Examples of the constitutional unit containing a hydrophobic group include constitutional units represented by Formulae A to F.

It is preferable that the water-insoluble resin particles have at least one constitutional unit selected from the constitutional units represented by Formulae A to F as the constitutional unit containing a hydrophobic group.

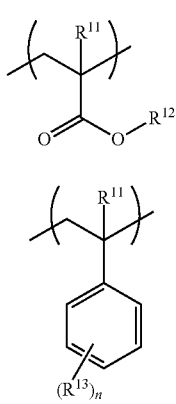

Formula A

Formula B

-continued

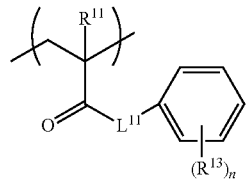

Formula C

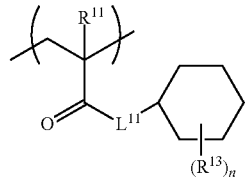

Formula D

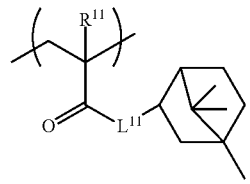

Formula E

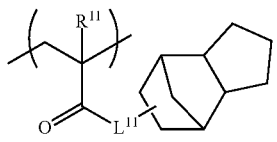

Formula F

In Formulae A to F, $R^{11}$ represents a methyl group or a hydrogen atom.

In Formulae A to F, $R^{12}$ and $R^{13}$ each independently represent a chain-like or branched alkyl group having 4 or more carbon atoms. It is preferable that $R^{12}$ and $R^{13}$ each independently represent a chain-like or branched alkyl group having 4 to 20 carbon atoms.

In Formulae A to F, n represents an integer of 0 to 6.

In Formulae A to F, $L^{11}$ represents a single bond or a linear, branched, or cyclic alkylene group having 1 to 18 carbon atoms, an arylene group having 6 to 18 carbon atoms, —O—, —NH—, —S—, —C(=O)—, or a divalent linking group formed by two or more of these being linked to each other. It is preferable that $L^{11}$ has the following structure.

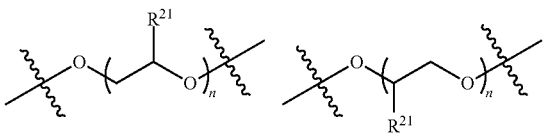

$R^{21}$'s each independently represent a methyl group or a hydrogen atom.

n represents an integer of 1 to 8.

Specific examples of constitutional units containing a hydrophobic group will be described below, but the embodiment of the present invention is not limited to the following specific examples.

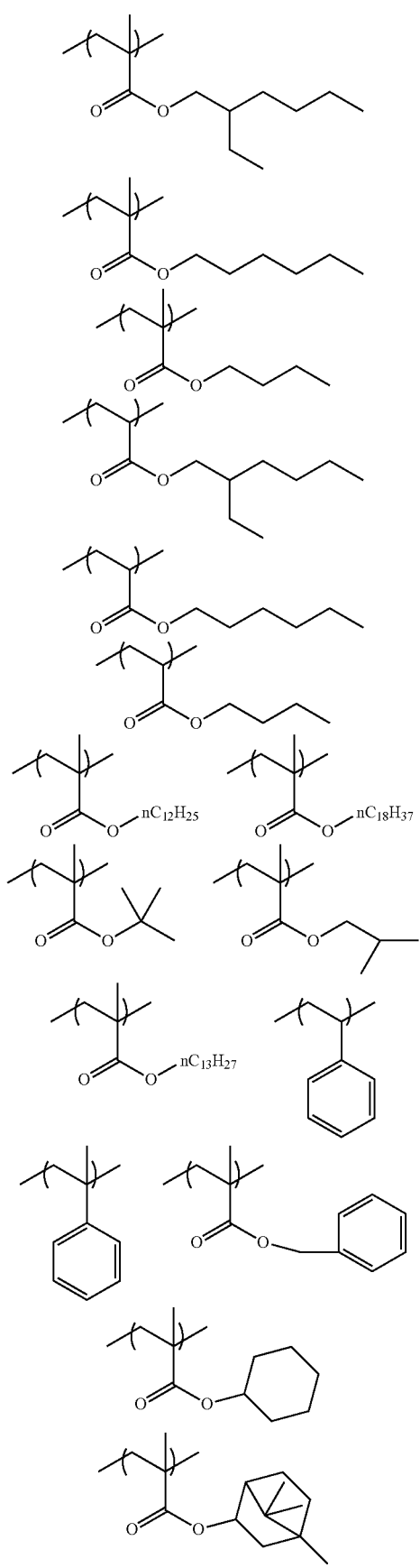
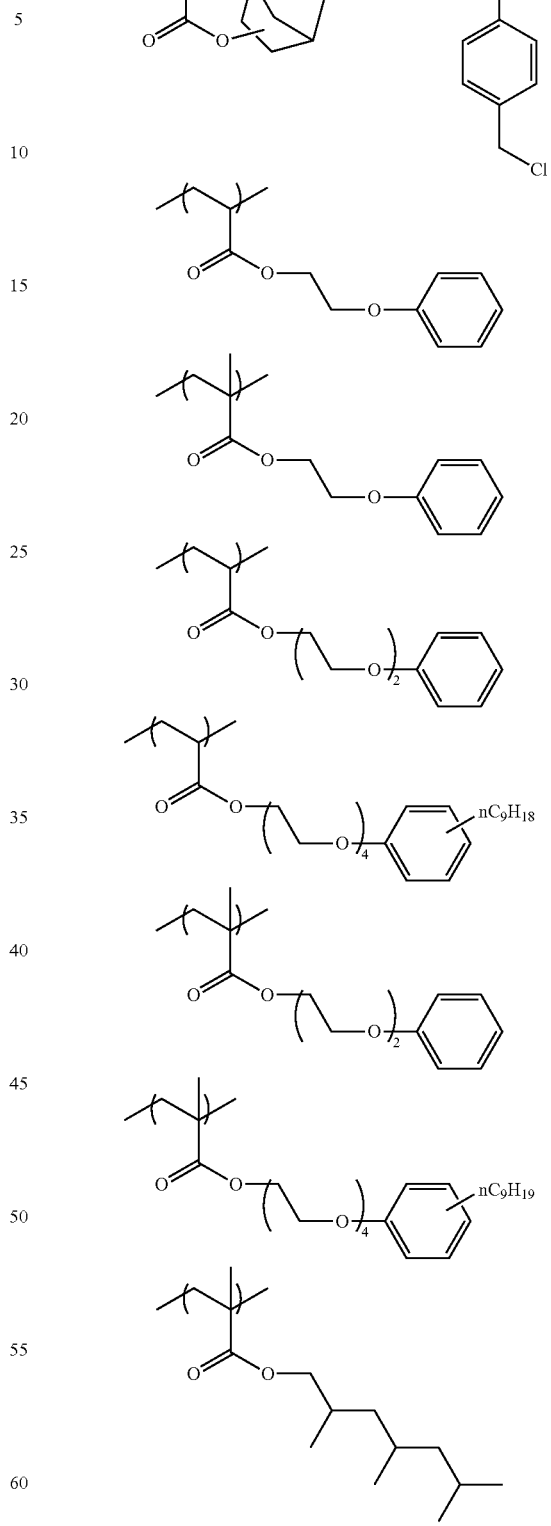
In a case where the water-insoluble resin particles has the constitutional unit containing a hydrophobic group, the content of the constitutional unit containing a hydrophobic group is preferably in a range of 5% by mass to 40% by mass, more preferably in a range of 10% by mass to 40% by mass, and still more preferably in a range of 20% by mass to 40% by mass with respect to the total mass of the water-insoluble resin particles.

Further, a ratio of the content (the total content in a case where a plurality of constitutional units are included) of the constitutional unit containing a hydrophobic group (preferably the constitutional units represented by Formulae A to F) to the content (the total content in a case where a plurality of constitutional units are included) of the constitutional unit (preferably at least one selected from the constitutional unit represented by Formula 1 and the constitutional unit represented by Formula 2) derived from a monomer containing a carboxy group or a salt of the carboxy group is preferably in a range of 0.15 to 1.4, more preferably in a range of 0.2 to 1.4, and still more preferably in a range of 0.4 to 1.1 on a mass basis.

When the ratio is in the above-described range, the re-dispersibility of the treatment liquid is excellent.

As the constitutional units of the water-insoluble resin particles, constitutional units derived from monomers other than the above-described monomers may be used.

The constitutional units derived from other monomers are different from the constitutional units derived from monomers containing the above-described acidic groups or salts of the acidic groups and the constitutional units containing the above-described hydrophobic groups in terms that the constitutional unit derived from other monomers do not contain an acidic group or a salt of the acidic group and a hydrophobic group (a hydrocarbon group formed by 4 or more carbon atoms being bonded to each other).

Examples of the constitutional units derived from other monomers include constitutional units derived from cationic monomers, for example, methacrylic acid esters such as methyl methacrylate, ethyl methacrylate, and 2-hydroxyethyl methacrylate; acrylic acid esters such as methyl acrylate and 2-hydroxyethyl acrylate; amide monomers such as acrylamide, N-(2-hydroxyethyl)acryl amide, N,N-dimethylacryl amide, N,N-diethylacrylamide, isopropylacrylamide, N-(2-hydroxymethyl)acrylamide, and methacrylamide; vinyl cyanide monomers such as acrylonitrile and methacrylonitrile; ethylenically unsaturated carboxylic acid hydroxyalkyl ester monomers such as β-hydroxyethyl acrylate and β-hydroxyethyl methacrylate; tertiary salts such as hydrochloride and sulfate of dialkylaminoalkyl (meth)acrylate such as dimethylaminoethyl (meth)acrylate, diethylaminoethyl (meth)acrylate, dimethylaminoethyl (meth)acrylate, diethylamino-2-hydroxypropyl (meth)acrylate, and dimethylaminopropyl (meth)acrylate; tertiary salt of hydrochloride and sulfate of dialkylaminoalkyl (meth)acrylamide such as dimethyl aminoethyl (meth)acrylamide; quaternary salts, for example, a halogenated alkyl adduct such as a methyl chloride adduct of dialkylaminoalkyl (meth)acrylate and a halogenated aryl adduct such as a benzyl chloride adduct; and quaternary salts, for example, a halogenated alkyl adduct such as a methyl chloride adduct of dialkylaminoalkyl (meth)acrylate and a halogenated aryl adduct such as a benzyl chloride adduct, and the examples are not limited to these. Further, constitutional units derived from bifunctional (meth)acrylate such as ethylene glycol dimethacrylate, ethylene glycol methacrylate, diethylene glycol dimethacrylate, or diethylene glycol methacrylate can be used.

These may be used alone or in combination of two or more kinds thereof. From the viewpoint of maintaining the hydrophilicity of the water-insoluble resin particles, a monomer which is not hydrophobic is preferable.

Further, the term "(meth)acrylate" indicates acrylate or methacrylate and the term "(meth)acryl" indicates acryl or methacryl.

Among these constitutional units derived from other monomers, constitutional units derived from methyl methacrylate, ethyl methacrylate, and ethyl acrylate are preferable, constitutional units derived from methyl methacrylate and ethyl methacrylate are more preferable, and constitutional units derived from methyl methacrylate are most preferable.

The content of these constitutional units derived from other monomers is preferably in a range of 20% by mass to 80% by mass, more preferably in a range of 30% by mass to 75% by mass, and still more preferably in a range of 30% by mass to 60% by mass with respect to the total mass of the water-insoluble resin particles.

Specific examples of the water-insoluble resin particles will be described below, but the embodiment of the present invention is not limited to the following specific examples. Further, the subscript for each constitutional unit shows the compositional ratio on a mass basis (% by mass). In addition, the water-insoluble resin particles may be used in the form of an aqueous dispersion which is referred to as a so-called latex.

A-1

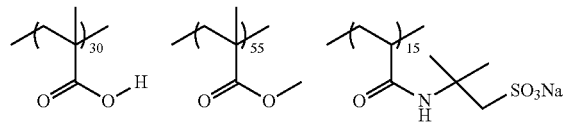

A-2

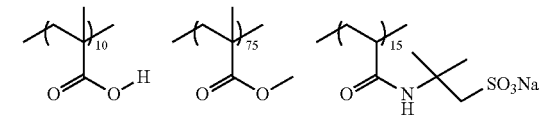

A-4

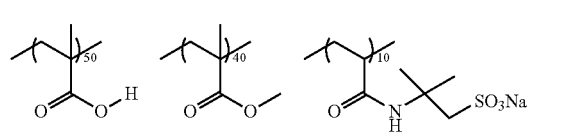

A-5

A-6

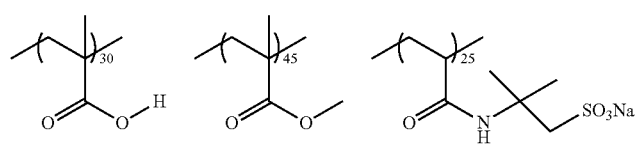

-continued
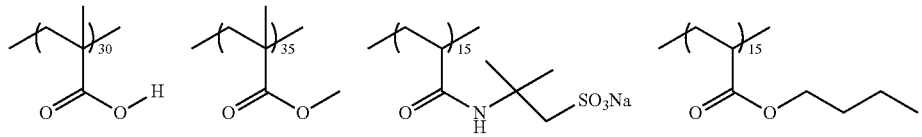
A-7
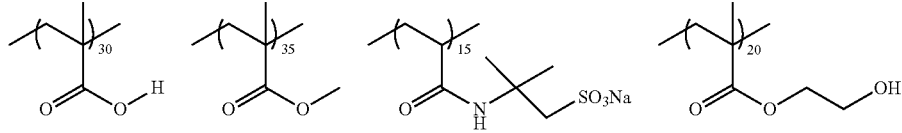
A-8
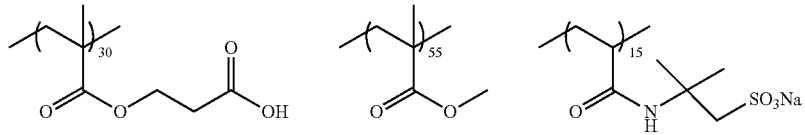
A-9
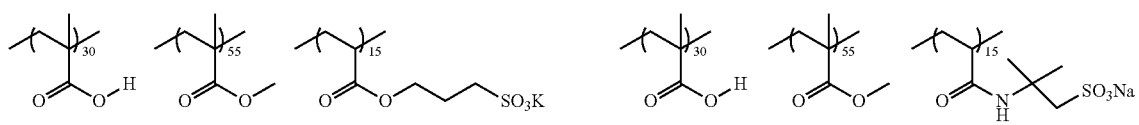
A-10    A-11
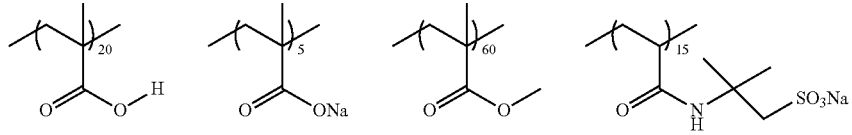
A-12
A-13    A-14
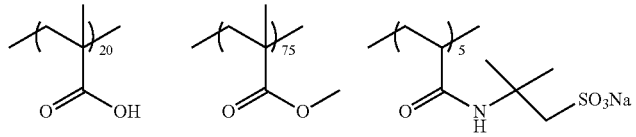
A-16
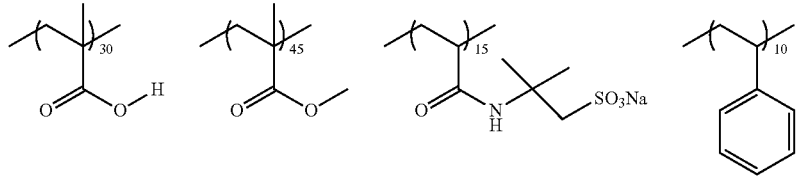
A-20
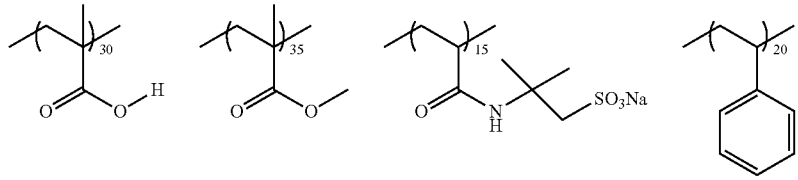
A-21
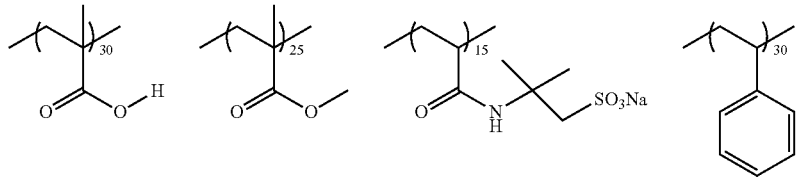
A-22, A-25

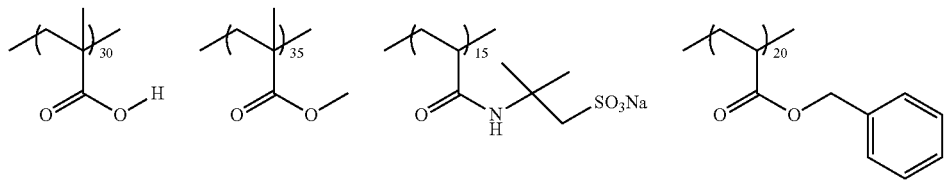
A-23
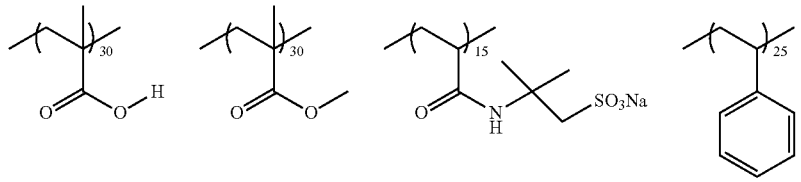
A-24
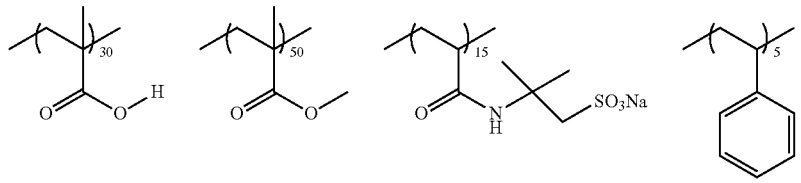
A-26
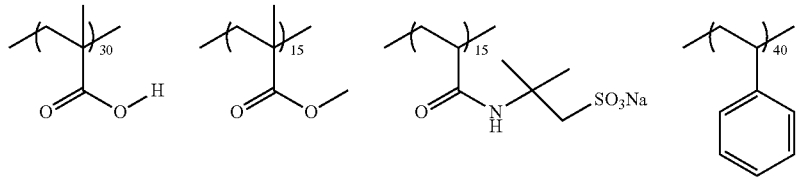
A-27
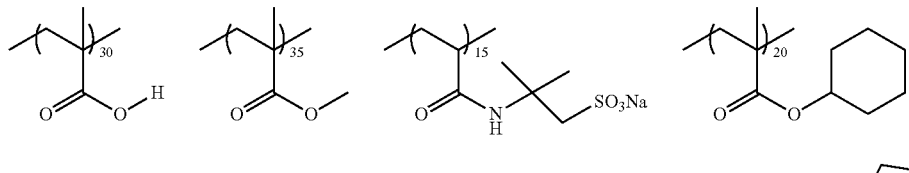
A-28
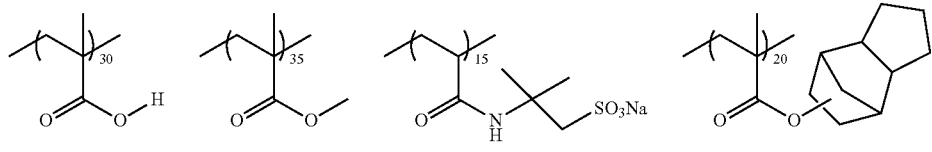
A-29
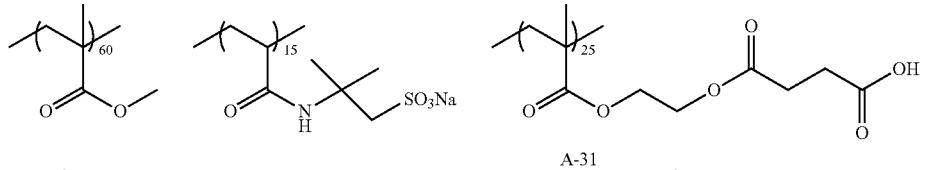
A-30
A-31
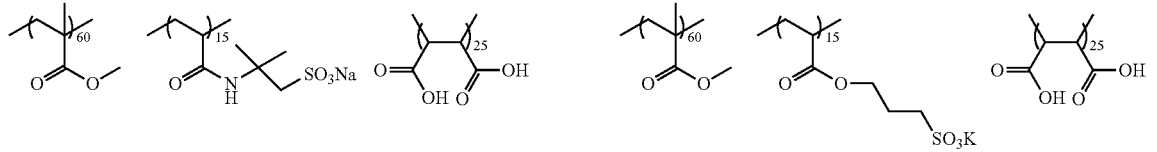
A-32
A-33
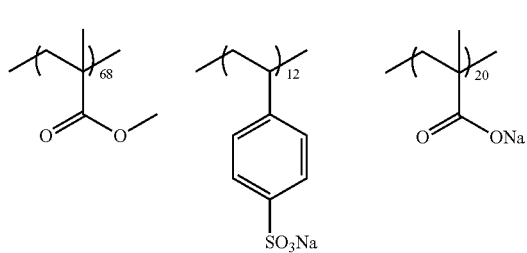

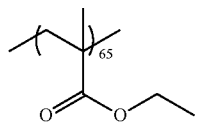 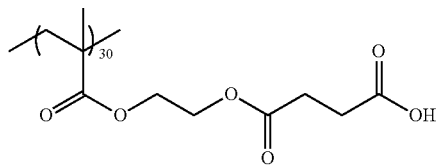 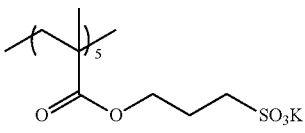

A-34

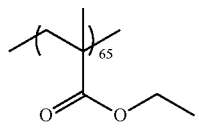 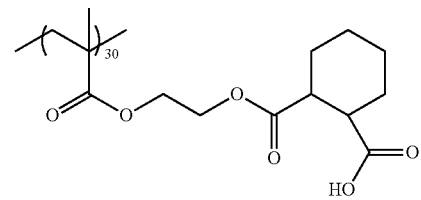 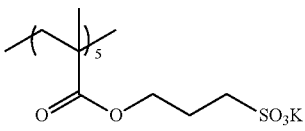

A-35

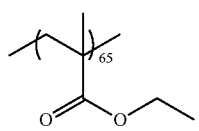 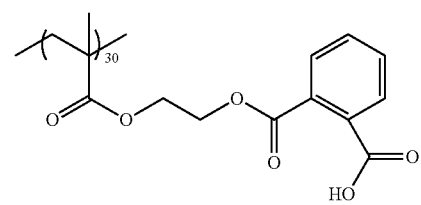 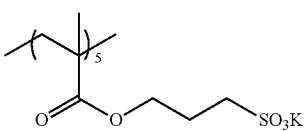

A-36

A-37

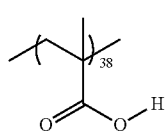 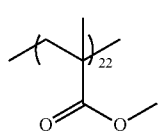 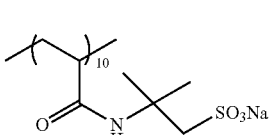 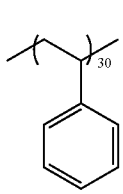

The method of preparing the water-insoluble resin particles is not particularly limited, and batch polymerization, semi-batch polymerization, seed polymerization, and the like can be used. As the water-insoluble resin particles, core shell particles or the like can be suitably used. In a case of core shell particles, it is preferable that the core shell particles contain an acidic group in the shell side.

An emulsifier may be used when the water-insoluble resin particles are prepared. Examples of the emulsifier include non-ionic surfactants such as an alkyl ester type surfactant of polyethylene glycol, an alkyl phenyl ether type surfactant, and an alkyl ether type surfactant; and anionic surfactants such as rosin acid salt, fatty acid salt, or sulfuric acid ester salt of higher alcohol, alkyl benzene sulfonate, alkyl diphenyl ether sulfonate, aliphatic sulfonate, aliphatic carboxylate, sulfuric acid ester salt of a non-ionic surfactant, and a formalin condensate of naphthalene sulfonate.

Among these emulsifiers, anionic surfactants are preferable and rosin acid salt and a formalin condensate of naphthalene sulfonate are more preferable.

The emulsifiers can be used alone or in combination of two or more kinds thereof.

It is preferable that a polymerization initiator is used when the water-insoluble resin particles are prepared.

A radical polymerization initiator is preferable as a polymerization initiator. A sulfo group or a salt of the sulfo group can be introduced to a terminal (polymer chain terminal) of the water-insoluble resin particles by using persulfate among radical polymerization initiators. The stability of the water-insoluble resin particles can be imparted with respect to the aggregation compound by introducing a sulfo group or a salt of the sulfo group to the polymer chain terminal of the water-insoluble resin particles.

That is, it is preferable that the water-insoluble resin particles are water-insoluble resin particles obtained from polymerization using radical persulfate as a polymerization initiator and also preferable that at least one terminal chain terminal of the water-insoluble resin particles is a sulfo group or a salt of the sulfo group.

Examples of the polymerization initiator include persulfate such as potassium peroxodisulfate (potassium persulfate), sodium peroxodisulfate (sodium sulfate), or ammonium peroxodisulfate (ammonium persulfate); an azo initiator such as 2,2-azobis-(2-aminodipropane)dihydrochloride, 4,4'-azobis(4-cyanovaleric acid), 2,2'-azobis[N-(2-carboxyethyl)-2-methylpropionamidine]hydrochloride, 2,2'-azobis{2-methyl-N-[2-(1-hydroxybutyl)]propionamide}, 2,2'-azobis[2-methyl-N-(2-hydroxyethyl)propionamide], 2,2'-azobis(2-amidinopropane)hydrochloride, 2,2'-azobis[2-(3,4,5,6-tetrahydropyrimidin-2-yl)propane]hydrochloride, 2,2'-azobis{2-[1-(2-hydroxyethyl)-2-imidazolin-2-yl]propane}hydrochloride, 2,2'-azobis(2-methylbutanamidoxime)dihydrochloride, or 4'-azobis(4-cyanovaleric acid); and persulfate such as cumene hydroperoxide, benzoyl peroxide, t-butyl hydroperoxide, acetyl peroxide, diisopropylbenzene hydroperoxide, or 1,1,3,3-tetramethylbutyl hydroperoxide.

Among there polymerization initiators, potassium persulfate, sodium persulfate, ammonium persulfate, and cumene hydroperoxide are preferable and potassium persulfate, sodium persulfate, and ammonium persulfate are more preferable.

As necessary, a reducing agent and a chain transfer agent may be used.

Examples of the reducing agent include sulfite, bisulfite, pyrosulfite, dithionite, dithionate, thiosulfate, formaldehyde sulfonate, benzaldehyde sulfonate, carboxylic acids, salts of carboxylic acids (such as L-ascorbic acid, erythobic acid, tartaric acid, and citric acid), reducing saccharides (such as dextrose and sucrose), and amines (such as dimethylaniline and triethanolamine). Among these, carboxylic acids and salts of the carboxylic acids are preferable and L-ascorbic acid and erythobic acid are more preferable.

The volume average particle diameter of the water-insoluble resin particles is preferably 1 μm or less from the viewpoint of decreasing the viscosity of the treatment liquid and more preferably 300 nm or less from the viewpoint of stability of the treatment liquid. From the above-described viewpoint, the volume average particle diameter of the water-insoluble resin particles is still more preferably 150 nm or less and particularly preferably 80 nm or less.

The lower limit of the volume average particle diameter is 0.8 nm or greater due to the detection limit of a particle diameter measurement apparatus.

The volume average particle diameter is measured using a nanotrac particle size distribution measurement apparatus UPA-EX150 (manufactured by Nikkiso Co., Ltd.) according to a dynamic light scattering method.

The volume average particle diameter is measured at a liquid temperature of 25° C. using an aqueous dispersion liquid whose concentration of solid contents is adjusted to be in a range of 1% by mass to 2% by mass.

The weight-average molecular weight of the water-insoluble resin particle diameter is preferably in a range of $1.0 \times 10^3$ to $1.00 \times 10^6$, more preferably in a range of $5.0 \times 10^3$ to $5.00 \times 10^5$, and still more preferably in a range of $5.0 \times 10^3$ to $3.00 \times 10^5$. Further, from the viewpoint of re-dispersibility, the weight-average molecular weight thereof is even still more preferably in a range of $5.0 \times 10^3$ to $5.00 \times 10^4$.

The weight-average molecular weight can be measured by gel permeation chromatography (GPC).

According to GPC, HLC-8220GPC (manufactured by TOSOH CORPORATION) is used, three columns of TSKgel, Super Multipore HZ-H (manufactured by TOSOH CORPORATION, 4.6 mmID×15 cm) are used as columns, and tetrahydrofuran (THF) is used as an eluant. The weight-average molecular weight is measured under conditions of a sample concentration of 0.45% by mass, a flow rate of 0.35 mL/min, a sample injection amount of 10 and a measurement temperature of 40° C. using a refractive index (RI) detector. Further, the calibration curve is created from 8 samples of "standard samples TSK standard, polystyrene" (manufactured by TOSOH CORPORATION), which are "F-40", "F-20", "F-4", "F-1", "A-5000", "A-2500", "A-1000", and "n-propylbenzene".

From the viewpoint of satisfactorily maintaining heat stability of the treatment liquid, the glass transition temperature (Tg) of the water-insoluble resin particles is preferably in a range of 100° C. to 250° C.

The Tg of the water-insoluble resin particles is measured using a differential scanning calorimeter (DSC) EXSTAR6220 (manufactured by SII Nanotechnology, Inc.).

The content of the water-insoluble resin particles in the treatment liquid is preferably in a range of 0.5% by mass to 20% by mass, more preferably in a range of 1% by mass to 10% by mass, and still more preferably in a range of 3% by mass to 5% by mass with respect to the total mass of the treatment liquid. When the content of the water-insoluble resin particles is 0.5% by mass or greater, the effects of improving wettability of the substrate are high. Further, when the content thereof is 20% by mass or less, the viscosity of the treatment liquid is maintained to be in an appropriate range and the stability of the treatment liquid is improved.

[Aggregation Compound]

The treatment liquid contains at least one compound (aggregation compound) that causes the colorant in the ink composition to aggregate.

The expression "causes the colorant to aggregate" indicates that the particle diameter of secondary particles formed by the colorant is increased by destabilizing the dispersion state of the colorant which has been dispersed in the ink composition. Further, the change in particle diameter can be confirmed by measuring the volume average particle diameter using a nanotrac particle size distribution measurement apparatus UPA-EX150 (manufactured by Nikkiso Co., Ltd.) according to a dynamic light scattering method.

When the treatment liquid contains a compound that causes a colorant to aggregate, the colorant contained in the ink composition described below can be caused to aggregate and a high-resolution image can be formed.

As an aggregation compound, a compound that causes at least one of resin particles having an anionic dissociable group other than the sulfo group in the ink composition or an anionic colorant to aggregate is preferable.

Examples of the compound that causes the colorant to aggregate include acidic compounds such as organic acidic compounds and inorganic acidic compounds, polyvalent metal salts, and cationic compounds. Among these, from the viewpoint of the aggregation rate, acidic compounds are preferable and inorganic acidic compounds are more preferable.

Examples of the acidic compounds include acidic substances capable of decreasing the pH of an ink composition. Further, both of an organic acidic compound and an inorganic acidic compound may be used and two or more of organic acidic compounds and inorganic acidic compounds may be used in combination.

(Organic Acidic Compound)

In a case where the treatment liquid contains an organic acidic compound, the organic acidic compound can cause the components in the ink composition to aggregate.

The organic acidic compound contained in the treatment liquid is not particularly limited. Examples of the organic acidic compound include a compound containing a phosphoric acid group, a compound containing a phosphonic acid group, a compound containing a phosphinic acid group, a compound containing a sulfuric acid group, a compound containing a sulfonic acid group, a compound containing a sulfinic acid group, and a compound containing a carboxy group.

From the viewpoint of aggregation rate of the ink composition, as the organic acidic compound, a compound containing a phosphoric acid group or a carboxy group is preferable and a compound containing a carboxy group is more preferable.

Preferred examples of the compound containing a carboxy group include polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts of these (for example, polyvalent metal salts). These compounds may be used alone or in combination of two or more kinds thereof.

From the viewpoint of the aggregation rate of the ink composition, as the compound containing a carboxy group, a di- or higher valent carboxylic acid (hereinafter, also referred to as polyvalent carboxylic acid) is preferable, malonic acid, malic acid, maleic acid, succinic acid, glutaric acid, fumaric acid, tartaric acid, 4-methylphthalic acid, and citric acid is more preferable, and malonic acid, malic acid, maleic acid, tartaric acid, and citric acid are particularly preferable.

It is preferable that the organic acidic compound contained in the treatment liquid has a low pKa. The surface charge of particles of a pigment or polymer particles in the ink composition in which the particles are stably dispersed due to a weakly acidic functional group such as a carboxy group is decreased by bringing the particles into contact with an organic acidic compound having a lower pKa than the pKa of the particles and the dispersion stability can be degraded.

It is preferable that the organic acidic compound contained in the treatment liquid has a low pKa, high solubility in water, and a valence of divalent or higher. Further, it is more preferable that the organic acidic compound is a divalent or trivalent acidic substance with high buffer capacity in a pH region having a lower pKa than the pKa of a functional group (for example, a carboxy group) that allows the particles to be stably dispersed in the ink composition.

(Inorganic Acidic Compound)

In a case where the treatment liquid contains an inorganic acidic compound, the inorganic acid compound can cause the components in the ink composition to aggregate.

Examples of the inorganic acidic compound contained in the treatment liquid include phosphoric acid, a phosphoric acid compound, nitric acid, nitrous acid, sulfuric acid, and hydrochloric acid, and the examples are not limited to these. From the viewpoints of suppressing graininess of an image and improving the aggregation rate of an ink, phosphoric acid or a phosphoric acid compound are preferable as the inorganic acidic compound.

The solubility (25° C.) of phosphoric acid in water when turned into calcium salt (calcium phosphate) is 0.0018 g per 100 g of water, which is small. Therefore, when the inorganic acidic compound contained in the treatment liquid is phosphoric acid, calcium salt is not dissolved in the treatment liquid and fixed and the effects of suppressing occurrence of graininess on the surface of an image portion are excellent. Particularly, phosphoric acid is advantageous as the inorganic acidic compound contained in the treatment liquid when a recording medium that includes a coating layer containing calcium carbonate is used as a recording medium.

As the phosphoric acid compound, phosphorous acid, hypophosphorous acid, pyrophosphoric acid, metaphosphoric acid, polyphosphoric acid, and salts of these can be used.

(Polyvalent Metal Salt)

Examples of the polyvalent metal salt include salts of alkaline earth metals (such as magnesium and calcium) of Group 2 of the periodic table, salts of transition metals (such as lanthanum) of Group 3 of the periodic table, salts of cations (such as aluminum) of Group 13 of the periodic table, and salts of lanthanides (such as neodymium).

Preferred examples of the metal salts include carboxylate (formic acid, acetic acid, or benzoic acid), nitrate, chloride, and thiocyanate. Among these, calcium salt of carboxylate (formic acid, acetic acid, or benzoic acid), magnesium salt, calcium salt or magnesium salt of nitric acid, calcium chloride, magnesium chloride, and calcium salt or magnesium salt of thiocyanic acid are more preferable.

(Cationic Compound)

Preferred examples of the cationic compound include cationic resins and cationic surfactants.

Examples of the cationic resins include an epichlorohydrin-dimethylamine addition polymer, a polycondensate of dicyandiamide and formalin or diethylenetriamine, a dimethyl diallyl ammonium chloride-$SO_2$ copolymer, a diallylamine salt-$SO_2$ copolymer, a dimethyl diallyl ammonium chloride polymer, a polymer of allylamine salt, a dialkylaminoethyl (meth)acrylate quaternary polymer, polyallylamine, cationic epoxy, polyethyleneimine, polyacrylamide, poly(meth)acrylic acid ester, vinyl formamide, a cationic resin emulsion, and cationic resin polyvalent metal salt.

As cationic surfactants, for example, primary, secondary, or tertiary amine salt type compounds are preferable. Examples of the amine salt type compounds include compounds of hydrochloride or acetate (such as laurylamine, coconut amine, stearylamine, and rosinamine), quaternary ammonium salt type compounds (such as lauryl trimethyl ammonium chloride, cetyl trimethyl ammonium chloride, lauryl dimethyl benzyl ammonium chloride, benzyl tributyl ammonium chloride, and benzalkonium chloride), pyridinium salt type compounds (such as cetyl pyridinium chloride and cetyl pyridinium bromide), imidazoline cationic compounds (such as 2-heptadecenyl-hydroxyethylimidazoline), and ethylene oxide adducts of higher alkylamine (such as dihydroxy ethyl stearylamine).

In addition, polyallylamines may be used. In addition to these, amphoteric surfactants exhibiting cationic properties in a desired pH region can be used, and examples thereof include an amino acid type amphoteric surfactant, a $R-NH-CH_2CH_2-COOH$ type compound (R represents an alkyl group), a carboxylate type amphoteric surfactant (such as steary dimethyl betaine or lauryl dihydroxy ethyl betaine), a sulfuric acid ester type amphoteric surfactant, a sulfonic acid type amphoteric surfactant, and a phosphoric acid ester type amphoteric surfactant.

The content (total content) of the aggregation compound in the total mass of the treatment liquid is not particularly limited, but is preferably in a range of 5% by mass to 40% by mass and more preferably in a range of 10% by mass to 30% by mass with respect to the total amount of the treatment liquid. In a case where the content thereof is 5% by mass or greater, the graininess of an image can be suppressed. Further, in a case where the content thereof is 40% by mass or less, rub resistance of an image is improved.

In the content ratio between an organic acidic compound and an inorganic acidic compound in a case where an organic acidic compound and an inorganic acidic compound are used in combination as the aggregation compound, from the viewpoint of the aggregation rate and suppression of the graininess, the content of the inorganic acidic compound to the content of the organic acidic compound is preferably in a range of 5 mol % to 50 mol %, more preferably in a range of 10 mol % to 40 mol %, and still more preferably in a range of 15 mol % to 35 mol % on a mass ratio.

A ratio ([water-insoluble resin particles (% by mass)/[aggregation compound (% by mass)]) of the content of the water-insoluble resin particles to the content of the compound (aggregation compound) that causes the colorant in the treatment liquid to aggregate is preferably in a range of 0.01 to 2.0, more preferably in a range of 0.01 to 1.0, still more preferably in a range of 0.04 to 0.5, and particularly preferably in a range of 0.1 to 0.3, from the viewpoints of suppressing a decrease in density of a solid image portion, occurrence of streak unevenness, and the graininess.

[Water]

The treatment liquid contains water. The content of water is not particularly limited, but is preferably in a range of 10% by mass to 99% by mass, more preferably in a range of 50% by mass to 90% by mass, and still more preferably in a range of 60% by mass to 80% by mass with respect to the total mass of the treatment liquid.

[Organic Solvent]

It is preferable that the treatment liquid contains at least one selected from organic solvents.

As the organic solvent, an organic solvent (hereinafter, also referred to as a "water-soluble organic solvent") to be dissolved in 100 g of water at 20° C. by an amount of 5 g or greater is preferable.

As the water-soluble organic solvent, a solvent which is the same as the water-soluble organic solvent contained in the ink composition described below can be used. Among the examples of the organic solvent, from the viewpoint of curl suppression, polyalkylene glycol or a derivative thereof is preferable and diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol are more preferable.

The content of the organic solvent in the treatment liquid is not particularly limited, but is preferably in a range of 1% by mass to 30% by mass and more preferably in a range of 5% by mass to 15% by mass with respect to the total amount of the treatment liquid from the viewpoint of curl suppression.

[Nitrogen-Containing Heterocyclic Compound]

The treatment liquid may contain a nitrogen-containing heterocyclic compound. In this manner, the rub resistance of an image and the transportability of the substrate are improved.

As the heterocyclic structure of the nitrogen-containing heterocyclic compound, a nitrogen-containing 5-membered ring structure or a nitrogen-containing 6-membered ring structure is preferable. Among these, a nitrogen-containing 5-membered ring structure is preferable.

In the nitrogen-containing 5-membered ring structure or the nitrogen-containing 6-membered ring structure, a 5- or 6-membered heterocyclic structure containing at least one atom preferably selected from a carbon atom, a nitrogen atom, an oxygen atom, a sulfur atom, and a selenium atom is preferable. Further, this heterocycle may be condensed with a carbon aromatic ring or a heteroaromatic ring.

Examples of the heterocycle include a tetrazole ring, a triazole ring, an imidazole ring, a thiadiazole ring, an oxadiazole ring, a selenadiazole ring, an oxadiazole ring, a thiazole ring, a benzoxazole ring, a benzothiazole ring, a benzimidazole ring, a pyrimidine ring, a triazaindene ring, a tetraazaindene ring, and a pentaazaindene ring.

These rings may contain a substituent, and examples of the substituent include a nitro group, a halogen atom (such as a chlorine atom or a bromine atom), a mercapto group, a cyano group, a substituted or unsubstituted alkyl group (such as each group of methyl, ethyl, propyl, t-butyl, or cyanoethyl), a substituted or unsubstituted aryl group (such as each group of phenyl, 4-methanesulfonamide phenyl, 4-methylphenyl, 3,4-dichlorophenyl, or naphthyl), a substituted or unsubstituted alkenyl group (such as an allyl group), a substituted or unsubstituted aralkyl group (such as each group of benzyl, 4-methylbenzyl, or phenethyl), a substituted or unsubstituted sulfonyl group (such as each group of methanesulfonyl, ethanesulfonyl, or p-toluenesulfonyl), a substituted or unsubstituted carbamoyl group (such as each group or unsubstituted carbamoyl, methyl carbamoyl, or phenyl carbamoyl), a substituted or unsubstituted sulfamoyl group (such as each group of unsubstituted sulfamoyl, methyl sulfamoyl, or phenyl sulfamoyl), a substituted or unsubstituted carbonamide group (such as each group of acetamide or benzamide), a substituted or unsubstituted sulfonamide group (such as each group or methanesulfonamide, benzenesulfonamide, or p-toluenesulfonamide), a substituted or unsubstituted acyloxy group (such as each group of acetyloxy or benzoyloxy), a substituted or unsubstituted sulfonyloxy group (such as methanesulfonyloxy), a substituted or unsubstituted ureido group (such as each group of unsubstituted ureido, methylureido, ethylureido, or phenylureido), a substituted or unsubstituted acyl group (such as each group of acetyl or benzoyl), a substituted or unsubstituted oxycarbonyl group (such as each group of methoxycarbonyl or phenoxycarbonyl), a substituted or unsubstituted oxycarbonylamino group (such as each group of methoxycarbonylamino, phenoxycarbonylamino, or 2-ethylhexyloxycarbonylamino), and a substituted or unsubstituted hydroxyl group. A plurality of substituents may be substituted with one ring.

Preferred specific examples of the nitrogen-containing heterocyclic compound include the following compounds.

The examples include imidazole, benzoimidazole, benzoindazole, benzotriazole, tetrazole, benzoxazole, benzothiazole, pyridine, quinoline, pyrimidine, piperazine, quinoxaline, and morpholine. These may include the substituents such as an alkyl group, a carboxy group, and a sulfo group described above.

Preferred examples of the nitrogen-containing 6-membered ring compound include compounds including a triazine ring, a pyrimidine ring, a pyridine ring, a pyrroline ring, a piperidine ring, a pyridazine ring, or a pyrazine ring. Among these, compounds including a triazine ring or a pyrimidine ring are preferable. These nitrogen-containing 6-membered ring compound may include substituents, and examples of the substituents in this case include an alkyl group having 1 to 6 carbon atoms (more preferably an alkyl group having 1 to 3 carbon atoms), an alkoxy group having 1 to 6 carbon atoms (more preferably an alkoxy group having 1 to 3 carbon atoms), a hydroxyl group, a carboxy group, a mercapto group, an alkoxyalkyl group having 1 to 6 carbon atoms (more preferably an alkoxyalkyl group having 1 to 3 carbon atoms), and a hydroxyalkyl group having 1 to 6 carbon atoms (more preferably a hydroxyalkyl group having 1 to 3 carbon atoms).

Preferred specific examples of the nitrogen-containing 6-membered ring compound include triazine, methyl triazine, dimethyl triazine, hydroxyethyl triazine ring, pyrimidine, 4-methylpyrimidine, pyridine, and pyrroline.

[Anti-Foaming Agent]

The treatment liquid may contain at least one anti-foaming agent as necessary.

Examples of the anti-foaming agent include a silicone-based compound (silicone-based anti-foaming agent), and a pluronic compound (pluronic anti-foaming agent). Among these, a silicone-based anti-foaming agent is preferable.

As the silicone-based anti-foaming agent, a silicone-based anti-foaming agent having a polysiloxane structure is preferable.

As the anti-foaming agent, commercially available anti-foaming agents can be used. Examples thereof include BYK-012, BYK-017, BYK-021, BYK-022, BYK-024, BYK-025, BYK-038, and BYK-094 (all manufactured by BYK Chemie GmbH), KS-537, KS-604, and KM-72F (all manufactured by Shin-Etsu Chemical Co., Ltd.), TSA-739

(manufactured by Momentive Performance Materials Inc.), and OLFINE AF104 (manufactured by Nissin Chemical Industry Co., Ltd.).

Among these, BYK-017, BYK-021, BYK-022, BYK-024, BYK-025, BYK-094, KS-537, KS-604, KM-72F, and TSA-739 which are silicone-based anti-foaming agents are preferable. Among these, BYK-024 is most preferable from the viewpoint of jetting stability of an ink.

In a case where the treatment liquid contains an anti-foaming agent, the content of the anti-foaming agent is preferably in a range of 0.0001% by mass to 1% by mass and more preferably in a range of 0.001% by mass to 0.1% by mass with respect to the total mass of the treatment liquid.

[Other Additives]

The treatment liquid may contain other additives in addition to the above-described components. Other additives in the treatment liquid are the same as other additives in the ink composition described below.

The surface tension of the treatment liquid is not particularly limited and can be set to 20 mN/m or greater. From the viewpoint of coating properties with respect to the substrate, the surface tension thereof is preferably in a range of 20 mN/m to 60 mN/m and more preferably in a range of 25 mN/m to 45 mN/m.

The surface tension of the treatment liquid can be adjusted by adding a surfactant to the treatment liquid. The surface tension of the treatment liquid can be measured under a temperature condition of 25° C. using Automatic Surface Tensionmeter CBVP-Z (manufactured by Kyowa Interface Science Co., Ltd.) according to a plate method.

From the viewpoint of the aggregation rate of the ink composition, the pH (25° C.±1° C.) of the treatment liquid is preferably 7.0 or greater, more preferably in a range of 0.5 to 3.5, and still more preferably in a range of 0.5 to 2.0. The pH thereof can be measured using a pH meter WM-50EG (manufactured by DKK-TOA CORPORATION) in an environment of 25° C.

From the viewpoint of the aggregation rate of the ink composition, the viscosity of the treatment liquid is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s. The viscosity thereof can be measured under a temperature condition of 25° C. using VISCOMETER TV-22 (manufactured by TOKI SANGYO CO., LTD.).

<Ink Composition>

The ink composition contains a colorant and water.

The ink composition may contain resin particles, a pigment dispersing agent (polymer dispersing agent), an organic solvent, a neutralizing agent, and other components as necessary.

[Colorant]

The ink composition contains at least one colorant. The colorant is not particularly limited and may be a pigment or a dye.

In addition, from the viewpoint that aggregation properties become excellent when the colorant is brought into contact with the above-described aggregation compound, an anionic colorant is preferable.

Here, the "anionic colorant" here indicates a colorant containing an anionic group such as a carboxy group, a sulfonic acid group, or a phosphoric acid group in the structure (in the structure of a dispersing agent in a case where the colorant is covered with a dispersing agent described below).

(Pigment)

The pigment is not particularly limited and can be selected as appropriate depending on the purpose thereof. The pigment may be any of an organic pigment and an inorganic pigment. From the viewpoint of ink colorability, it is preferable that the pigment is a pigment which is almost insoluble or sparingly soluble in water.

Examples of the organic pigment include a polycyclic pigment such as azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment or a quinophthalone pigment, dye lake such as a basic dye type lake or acidic dye type lake, a nitro pigment, a nitroso pigment, aniline black, and a daylight fluorescent pigment.

Examples of the inorganic pigment include titanium oxide, iron oxide, calcium carbonate, barium sulfate, aluminum hydroxide, barium yellow, cadmium red, chrome yellow, and carbon black.

Further, even pigments which are not described in Color Index can be used as long as the pigments can be dispersed in a water phase. Further, pigments which are surface-treated with a surfactant or a polymer dispersing agent and graft carbon can be used.

Among these pigments, particularly, an azo pigment, a phthalocyanine pigment, an anthraquinone pigment, a quinacridone pigment, and a carbon black pigment are preferable and an anionic azo pigment, an anionic phthalocyanine pigment, and an anionic quinacridone pigment are more preferable.

~Dispersing Agent~

In the ink composition, the form in which a pigment is dispersed by a dispersing agent is preferable. Among examples of this form, particularly, the form in which a pigment is dispersed by a polymer dispersing agent, that is, the form in which at least a part of a pigment is covered with a polymer dispersing agent is preferable. A pigment of which at least a part is covered with a polymer dispersing agent is referred to as a "resin-coated pigment".

As the dispersing agent, a polymer dispersing agent or a low-molecular-weight surfactant-type dispersing agent may be used. Further, a polymer dispersing agent which is not crosslinked (non-crosslinked polymer dispersing agent) and a polymer dispersing agent (crosslinked polymer dispersing agent) which is crosslinked by a crosslinking agent may be used.

As the non-crosslinked polymer dispersing agent, a water-soluble non-crosslinked polymer dispersing agent or a water-insoluble non-crosslinked polymer dispersing agent may be used.

As the low-molecular-weight surfactant-type dispersing agent, surfactant type dispersing agents described in paragraphs 0016 to 0020 of JP2010-188661A can be used.

Among the examples of the non-crosslinked polymer dispersing agent, a hydrophilic polymer compound can be used as a water-soluble non-crosslinked polymer dispersing agent.

As the water-soluble non-crosslinked polymer dispersing agent, natural hydrophilic polymer compounds described in paragraphs 0021 and 0022 of JP2010-188661A can be used.

Further, a synthetic hydrophilic polymer compound can be used as the water-soluble non-crosslinked polymer dispersing agent.

Examples of the synthetic hydrophilic polymer compound include polymer compounds having a vinyl-based polymer such as polyvinyl alcohol, polyvinylpyrrolidone, or polyvinyl methyl ether, an acrylic resin such as polyacrylamide, polyacrylic acid or alkali metal salt thereof, or a water-soluble styrene acrylic resin, a water-soluble styrene maleic acid resin, a water-soluble vinyl naphthalene acrylic resin, a water-soluble vinyl naphthalene maleic acid resin, alkali metal salt of a β-naphthalenesulfonic acid formalin condensate, and salts of a cationic functional group of quaternary ammonium or an amino group, in the side chain.

Among these, from the viewpoint of dispersion stability and aggregating properties of a pigment, a polymer compound containing a carboxy group is preferable and a polymer compound containing a carboxy group, for example, an acrylic resin such as a water-soluble styrene acrylic resin, a water-soluble styrene maleic acid resin, a water-soluble vinyl naphthalene acrylic resin, or a water-soluble vinyl naphthalene maleic acid resin is particularly preferable.

As the water-insoluble dispersing agent among the examples of the non-crosslinked polymer dispersing agent, a polymer having both of a hydrophobic part and a hydrophilic part can be used. Examples of the water-insoluble dispersing agent include a styrene-(meth)acrylic acid copolymer, a styrene-(met)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

The styrene-(meth)acrylic acid copolymer, the (meth)acrylic acid ester-(meth)acrylic acid copolymer, the polyethylene glycol (meth)acrylate-(meth)acrylic acid copolymer, and the styrene-maleic acid copolymer may be binary copolymers or ternary or higher copolymers.

Among the examples of the non-crosslinked polymer dispersing agent, a (meth)acrylic acid ester-(meth)acrylic acid copolymer is preferable and a benzyl(meth)acrylate-(meth)acrylic acid-methyl(meth)acrylate ternary copolymer is particularly preferable.

The term "(meth)acrylic acid" indicates acrylic acid or methacrylic acid and the term "(meth)acrylate" indicates acrylate or methacrylate.

Further, a copolymer may be a random copolymer, a block copolymer, or a graft copolymer.

The weight-average molecular weight of the non-crosslinked polymer dispersing agent is preferably in a range of $3.0\times10^3$ to $2.00\times10^5$, more preferably in a range of $5.0\times10^3$ to $1.00\times10^5$, still more preferably in a range of $5.0\times10^3$ to $8.00\times10^4$, and particularly preferably in a range of $1.00\times10^4$ to $6.00\times10^4$.

In addition, the weight-average molecular weight can be measured using a known method.

The acid value of the non-crosslinked polymer dispersing agent is not particularly limited, but it is preferable that the acid value of the non-crosslinked polymer dispersing agent is larger than the acid value of resin particles (preferably self-dispersing resin particles) described below from the viewpoint of the aggregation properties.

A crosslinked polymer dispersing agent is formed by a polymer (uncrosslinked polymer) being crosslinked by a crosslinking agent.

The polymer is not particularly limited and various polymers can be used. Among the various polymers, polyvinyls, polyurethanes, and polyesters which can function as water-soluble dispersing agents are preferable and polyvinyls are more preferable.

It is preferable that the polymer is a copolymer obtained by using a carboxy group-containing monomer as a copolymer component. Examples of the carboxy group-containing monomer include monomers containing a carboxy group such as (meth)acrylic acid, β-carboxyethyl acrylate, fumaric acid, itaconic acid, maleic acid, or crotonic acid. Among these monomers, from the viewpoint of crosslinking properties and dispersion stability of the polymer, (meth)acrylic acid and β-carboxyethyl acrylate are preferable.

Since the polymer is crosslinked by a crosslinking agent, the polymer contains a functional group which can be crosslinked by a crosslinking agent. The functional group which can be crosslinked is not particularly limited, and examples thereof include a carboxy group or a salt thereof, an isocyanate group, and an epoxy group. Among these, from the viewpoint of improving dispersibility, a carboxy group or a salt thereof is preferable.

From the viewpoint of water solubility of the polymer, the acid value of the polymer is preferably 90 mgKOH/g or greater and more preferably 95 mgKOH/g or greater.

Further, from the viewpoints of dispersibility and dispersion stability of a pigment, the acid value thereof is preferably in a range of 100 mgKOH/g to 180 mgKOH/g, more preferably in a range of 100 mgKOH/g to 170 mgKOH/g, and still more preferably in a range of 100 mgKOH/g to 160 mgKOH/g.

In addition, the acid value can be measured using a method described in JIS standard (JISK0070: 1992).

The weight-average molecular weight (Mw) of the polymer is preferably in a range of $5.00\times10^4$ to $1.20\times10^5$, more preferably in a range of $6.00\times10^4$ to $1.20\times10^5$, still more preferably in a range of $6.00\times10^4$ to $1.00\times10^5$, and particularly preferably in a range of $6.00\times10^4$ to $9.00\times10^4$.

Further, the weight-average molecular weight can be measured using a known method.

It is preferable that the polymer contains at least one hydrophobic monomer as a copolymer component. Examples of the hydrophobic monomer include (meth)acrylate containing an aromatic ring group such as alkyl (meth)acrylate having 1 to 20 carbon atoms, benzyl (meth)acrylate, or phenoxyethyl (meth)acrylate, styrene, and derivatives thereof.

The form of copolymerization of a polymer is not particularly limited, and the polymer may be a random polymer, a block polymer, or a graft polymer.

The method of synthesizing a polymer is not particularly limited, but a random polymerization method of a vinyl monomer is preferable from the viewpoint of dispersion stability.

The crosslinking agent is not particularly limited as long as the crosslinking agent is a compound having 2 or more sites that react with a polymer. Among the examples thereof, a compound (bi- or higher functional epoxy group) containing 2 or more epoxy groups is preferable from the viewpoint of excellent reactivity with a carboxy group.

Examples of the crosslinking agent include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylol propane triglycidyl ether. Among these, polyethylene glycol diglycidyl ether, diethylene glycol diglycidyl ether, and trimethylol propane triglycidyl ether are preferable.

As the method of covering a pigment with a crosslinking polymer dispersing agent, a method of preparing a pigment dispersing agent by crosslinking a polymer using a crosslinking agent after a pigment is dispersed using a water-soluble or water-insoluble polymer.

In the ink composition, the mass ratio (pigment:dispersing agent) of the mass of the pigment to the mass of the dispersing agent is preferably in a range of 1:0.06 to 1:3, more preferably in a range of 1:0.125 to 1:2, and still more preferably in a range of 1:0.125 to 1:1.5.

The average particle diameter (the average particle diameter of the resin-coated pigment in the case of the resin-coated pigment, the same applies to hereinafter) of the pigment is preferably in a range of 10 nm to 200 nm, more preferably in a range of 10 nm to 150 nm, and still more preferably in a range of 10 nm to 100 nm. When the average particle diameter is 200 nm or less, color reproducibility becomes excellent and jetting properties when droplets are ejected according to an inkjet method become excellent. Further, when the average particle diameter is 10 nm or greater, light resistance becomes excellent. Further, the particle size distribution is not particularly limited, and any of wide particle size distribution and monodisperse particle size distribution may be used. In addition, two or more pigments having monodisperse particle size distribution may be mixed with each other and then used.

Further, the average particle diameter and the particle size distribution of the pigment are acquired by measuring the volume average particle diameter using a nanotrac particle size distribution measurement apparatus UPA-EX150 (manufactured by Nikkiso Co., Ltd.) according to a dynamic light scattering method.

From the viewpoint of the image density, the content of the pigment in the ink composition is preferably in a range of 1% by mass to 25% by mass, more preferably in a range of 2% by mass to 20% by mass, and particularly preferably in a range of 2% by mass to 10% by mass with respect to the total mass of the ink composition.

The pigment may be used alone or in combination of two or more kinds thereof.

(Dye)

As a dye, a known dye can be used without particular limitation. For example, dyes described in JP2001-115066A, JP2001-335714A, and JP2002-249677A can be preferably used in the embodiment of the present invention.

Further, in a case of using a dye, a dye which is held by a water-insoluble carrier may be used. The carrier (water-insoluble coloring particle) holding a dye can be used as an aqueous dispersion using a dispersing agent. The carrier is not particularly limited as long as the carrier is insoluble or sparingly soluble in water, and examples thereof include inorganic materials, organic materials, and composite materials of these. Specifically, carriers described in JP2001-181549A and JP2007-169418A can be preferably used in the embodiment of the present invention.

[Resin Particles]

It is preferable that the ink composition contains at least one kind of resin particles.

The resin particles are different from the above-described polymer dispersing agent (polymer dispersing agent that covers at least a part of the pigment) and are present separately from the pigment.

In a case where the ink composition contains resin particles, the resin particles aggregate when brought into contact with the aggregation compound.

Further, from the viewpoint that the aggregating properties when the resin particles are brought into contact with the above-described aggregation compound become excellent, resin particles containing an anionic dissociable group other than a sulfo group are preferable as the resin particles. The details of the resin particles containing an anionic dissociable group other than a sulfo group will be described below.

Resin particles containing a sulfo group as an anionic dissociable group are not preferable because the dispersion stability of the resin particles is not greatly improved so that the resin particles do not aggregate when brought into contact with the aggregation compound in the treatment liquid and thus image formation becomes difficult.

It is preferable that the resin particles are insoluble or sparingly soluble in water.

The expression "insoluble or sparingly soluble in water" indicates that the dissolution amount of a resin is 15 g or less in a case where the resin is dissolved in 100 g of water at 25° C. after being dried at 105° C. for 2 hours. From the viewpoint of improving the continuous jetting properties and jetting stability of an ink, the dissolution amount thereof is preferably 10 g or less, more preferably 5 g or less, and still more preferably 1 g or less. The dissolution amount indicates a dissolution amount obtained by neutralizing the resin particles at a neutralization degree of 100% with sodium hydroxide or acetic acid depending on the type of a salt-forming group of the resin particles which are insoluble or sparingly soluble in water.

As the resin particles, particles of any of thermoplastic resins and thermosetting resins may be used, and examples thereof include particles of resins having anionic groups such as a modified acrylic resin, an epoxy resin, a polyurethane resin, a polyether resin, a polyamide resin, an unsaturated polyester resin, a phenolic resin, a silicone resin, a fluorine resin, a polyvinyl resin (such as vinyl chloride, vinyl acetate, polyvinyl alcohol, or polyvinyl butyral), a polyester resin (such as an alkyd resin or a phthalic acid resin), an amino resin (such as a melamine resin, a melamine formaldehyde resin, an aminoalkyd co-condensation resin, or a urea resin), or copolymers or mixtures of these. Among these resin particles, the modified acrylic resin (anionic acrylic resin) is obtained by polymerizing acrylic monomers (anionic group-containing acrylic monomers) containing an anionic dissociable group other than a sulfo group and other monomers which can be copolymerized with anionic dissociable group-containing acrylic monomers as necessary, in a solvent. Examples of the anionic dissociable group-containing acrylic monomer include an acrylic monomer containing one or more selected from the group consisting of a carboxy group and a phosphonic acid group. Among these, acrylic monomers (such as acrylic acid, methacrylic acid, crotonic acid, ethaacrylic acid, propylacrylic acid, isopropylacrylic acid, itaconic acid, and fumaric acid) having a carboxy group are preferable and acrylic acid and methacrylic acid are particularly preferable.

It is preferable that the resin particles are self-dispersing resin particles (self-dispersing resin particles) from the viewpoints of jetting stability and liquid stability (particularly dispersion stability) of a system containing a colorant. The self-dispersing resin indicates a water-insoluble polymer which may be in a state of being dispersed in an aqueous medium by a functional group (particularly an acidic group or a salt thereof) included in a polymer when the polymer is set to be in a dispersion state using a phase-transfer emulsification method in the absence of a surfactant.

The dispersion state includes both of an emulsion state (emulsion) formed by a water-insoluble polymer being dispersed in an aqueous medium in a liquid state and a dispersion state (suspension) formed by a water-insoluble polymer being dispersed in an aqueous medium in a solid state.

In addition, the aqueous medium indicates a medium containing water. The aqueous medium may contain a hydrophilic organic solvent as necessary. It is preferable that the aqueous medium contains water and a hydrophilic organic solvent at a content of 0.2% by mass or less with respect to water and more preferable that the aqueous medium contains only water.

From the viewpoints of the aggregation rate and fixing properties in a case where the self-dispersing resin is contained in the ink composition, self-dispersing resin particles in which a water-insoluble polymer can be dispersed in a solid state are preferable as the self-dispersing resin.

As the method of obtaining an emulsified or dispersion state of the self-dispersing resin, that is, a method of preparing an aqueous dispersion of the self-dispersing resin particles, a phase-transfer emulsification method is exemplified.

As the phase-transfer emulsification method, a method of dissolving or dispersing a self-dispersing resin in a solvent (for example, a water-soluble organic solvent), putting the resultant in water without adding a surfactant thereto, stirring and mixing the solution in a state in which a salt-forming group (for example, an acidic group) included in the self-dispersing resin is neutralized, and removing the solvent therefrom to obtain an aqueous dispersion in an emulsified or dispersion state is exemplified.

Further, a stable emulsified or dispersion state of the self-dispersing resin indicates a state (that is, the state in which precipitation cannot be confirmed visually) in which an emulsified or dispersion state is stably maintained at 25° C. for at least one week even after a solution obtained by dissolving 30 g of a water-insoluble polymer in 70 g of an organic solvent (for example, methyl ethyl ketone), a neutralizing agent (sodium hydroxide in a case where the salt-forming group is anionic and acetic acid in a case where the salt-forming group is cationic) which is capable of neutralizing a salt-forming group of the water-insoluble polymer at a neutralization degree of 100%, and 200 g of water are mixed and stirred (device: stirring device provided with stirring blades, rotation speed of 200 rpm, 30 minutes, 25° C.) and then the organic solvent is removed from the mixed solution.

In addition, the stability of the emulsified or dispersion state of the self-dispersing resin can be confirmed by performing a sedimentation acceleration test using centrifugation. The stability confirmed by the sedimentation acceleration test using centrifugation can be evaluated by adjusting the concentration of solid contents of the aqueous dispersion of resin particles obtained by the above-described method to 25% by mass, performing centrifugation at 12000 rpm for one hour, and measuring the concentration of solid contents of the supernatant after the centrifugation.

When the ratio of the concentration of solid contents after the centrifugation to the concentration of solid contents before the centrifugation is large (when the numerical value is close to 1), this means that sedimentation of resin particles due to centrifugation does not occur, that is, the aqueous dispersion of the resin particles becomes more stable. The ratio between the concentrations of solid contents before and after the centrifugation is preferably 0.8 or greater, more preferably 0.9 or greater, and particularly preferably 0.95 or greater.

When the self-dispersing resin is in the dispersion state, the content of a water-soluble component showing water solubility is preferably 10% by mass or less, more preferably 8% by mass or less, and still more preferably 6% by mass or less. When the content of the water-soluble component is 10% by mass or less, it is possible to effectively suppress swelling of resin particles and fusion welding of resin particles and to more stably maintain the dispersion state. Further, an increase in viscosity of the ink composition can be suppressed, and the jetting stability becomes more excellent in a case where the ink composition is applied to an inkjet method.

The water-soluble component is a compound to be contained in the self-dispersing resin. In other words, the water-soluble component indicates a compound to be dissolved in water in a case where the self-dispersing resin is set to be in the dispersion state. The water-soluble component is a water-soluble compound which is created as a by-product or mixed into in a case where the self-dispersing resin is produced.

A main chain skeleton of the water-insoluble polymer is not particularly limited, and a vinyl polymer or a condensation type polymer (such as an epoxy resin, polyester, polyurethane, polyamide, cellulose, polyether, polyurea, polyimide, or polycarbonate) can be used. Among these, a vinyl polymer is particularly preferable.

Preferred examples of a vinyl polymer and a monomer constituting a vinyl polymer include those described in JP2001-181549A and JP2002-88294A. Further, a vinyl polymer obtained by introducing a dissociable group to a terminal of a polymer chain by performing radical polymerization on a vinyl monomer using a chain transfer agent, a polymerization initiator, and an iniferter which have a dissociable group (or a substituent which can be induced to a dissociable group) or performing ion polymerization using a compound having a dissociable group (or a substituent which can be induced to a dissociable group) in either of a initiator or a terminator can be used.

Further, preferred examples of a condensation type polymer and a monomer constituting a condensation type polymer include those described in JP2001-247787A.

From the viewpoint of dispersion stability, it is preferable that the resin particles contain a water-insoluble polymer which has a hydrophilic constitutional unit and a constitutional unit derived from an aromatic group-containing monomer or a cyclic aliphatic group-containing monomer.

The "hydrophilic constitutional unit" is not particularly limited as long as the constitutional unit is derived from a hydrophilic group-containing monomer, and the constitutional unit may be a constitutional unit derived from one hydrophilic group-containing monomer or a constitutional unit derived from two or more hydrophilic group-containing monomers. The hydrophilic group is not particularly limited except for a sulfo group and may be a dissociable group or a non-ionic hydrophilic group.

From the viewpoint of the stability of the formed emulsified or dispersion state, as the hydrophilic group, a dissociable group is preferable and an anionic dissociable group is more preferable.

That is, resin particles containing an anionic dissociable group are preferable as the resin particles.

Examples of the dissociable group include a carboxy group and a phosphoric acid group. Among these, from the viewpoint of the fixing properties in a case of constituting the ink composition, a carboxy group is preferable.

From the viewpoint of the dispersion stability and aggregating properties, as the hydrophilic group-containing monomer, a dissociable group-containing monomer is preferable and a dissociable group-containing monomer that contains a dissociable group and an ethylenically unsaturated bond is more preferable.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated phosphoric acid monomer include vinylphosphonic acid, vinyl phosphate, bis(methacryloxyethyl) phosphate, diphenyl-2-acryloxyethyl phosphate, diphenyl-2-methacryloxyethyl phosphate, and dibutyl-2-acryloxyethyl phosphate.

Among the dissociable group-containing monomers, from the viewpoints of the dispersion stability and the jetting stability, an unsaturated carboxylic acid monomer is preferable and acrylic acid and methacrylic acid are more preferable.

From the viewpoint of the dispersion stability and the aggregation rate when the resin particles are brought into contact with the treatment liquid, it is preferable that the resin particles contain a polymer containing a carboxy group and more preferable that the resin particles contain a polymer which contains a carboxy group and has an acid value of 25 mgKOH/g to 100 mgKOH/g. Further, from the viewpoint of the self-dispersibility and the aggregation rate when the resin particles are brought into contact with the treatment liquid, the acid value is more preferably in a range of 25 mgKOH/g to 80 mgKOH/g and particularly preferably in a range of 30 mgKOH/g to 65 mgKOH.

Particularly, when the acid value thereof is 25 mgKOH/g or greater, the dispersion stability becomes excellent. Further, when the acid value thereof 100 mgKOH/g or less, the aggregation rate is improved.

Further, the acid value can be measured using a known method.

The aromatic group-containing monomer is not particularly limited as long as the aromatic group-containing monomer is a compound containing an aromatic group and a polymerizable group. The aromatic group may be a group derived from aromatic hydrocarbon or a group derived from an aromatic heterocycle. From the viewpoint of stability of the particle shape in an aqueous medium, it is preferable that the aromatic group is an aromatic group derived from aromatic hydrocarbon.

Further, the polymerizable group may be a polymerizable group which is condensation-polymerizable or a polymerizable group which is addition-polymerizable. From the viewpoint of stability of the particle shape in an aqueous medium, as the polymerizable group, a polymerizable group which is addition-polymerizable is preferable and a group containing an ethylenically unsaturated bond is more preferable.

It is preferable that the aromatic group-containing monomer is a monomer containing an ethylenically unsaturated bond and an aromatic group derived from aromatic hydrocarbon. The aromatic group-containing monomer may be used alone or in combination of two or more kinds thereof.

Examples of the aromatic group-containing monomer include phenoxyethyl (meth)acrylate, benzyl (meth)acrylate, phenyl (meth)acrylate, and a styrene-based monomer. Among these, from the viewpoints of the balance between hydrophilicity and hydrophobicity of the polymer chain and ink fixing properties, an aromatic group-containing (meth)acrylate monomer is preferable, phenoxyethyl (meth)acrylate, benzyl (meth)acrylate, and phenyl (meth)acrylate are more preferable, and phenoxyethyl (meth)acrylate and benzyl (meth)acrylate are still more preferable.

The term "(meth)acrylate" indicates acrylate or methacrylate.

As the cyclic aliphatic group-containing monomer, a monomer containing a cyclic aliphatic group derived from cyclic aliphatic hydrocarbon and an ethylenically unsaturated bond is preferable and a cyclic aliphatic group-containing (meth)acrylate monomer (hereinafter, also referred to as alicyclic (meth)acrylate is more preferable).

The alicyclic (meth)acrylate is a compound which includes a constitutional site derived from (meth)acrylic acid and a constitutional site derived from alcohol and has a structure containing at least one substituted or unsubstituted alicyclic hydrocarbon group (cyclic aliphatic group) in the constitutional site derived from alcohol. Further, the alicyclic hydrocarbon group may be the constitutional site derived from alcohol or may be bonded to the constitutional site derived from alcohol through a linking group.

The alicyclic hydrocarbon group is not particularly limited as long as the alicyclic hydrocarbon group is a hydrocarbon group containing a cyclic non-aromatic hydrocarbon group, and examples thereof include a monocyclic hydrocarbon group, a bicyclic hydrocarbon group, and a tricyclic or higher polycyclic hydrocarbon group. Examples of the alicyclic hydrocarbon group include cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantly group, a decahydronaphthalenyl group, a perhydrofluorenyl group, a tricycle[$5.2.1.0^{2,6}$]decanyl group, and bicycle[4.3.0]nonyl group.

The alicyclic hydrocarbon group may further include a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or arylcarbonyl group, and a cyano group. In addition, the alicyclic hydrocarbon group may form a fused ring. From the viewpoint of the viscosity or solubility, the number of carbon atoms of the alicyclic hydrocarbon group portion in the alicyclic hydrocarbon group is preferably in a range of 5 to 20.

Specific examples of the alicyclic (meth)acrylate will be described below, but the embodiment of the present invention is not limited to these.

Examples of the monocyclic (meth)acrylate include cycloalkyl (meth)acrylate containing a cycloalkyl group having 3 to 10 carbon atoms such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantly (meth)acrylate, dicyclopentanyl (meth)acrylate, and dicyclopentenyloxyethyl (meth)acrylate.

These may be used alone or in combination of two or more kinds thereof.

Among these, from the viewpoints of dispersion stability, fixing properties, and blocking resistance of resin particles, bicyclic (meth)acrylate and tricyclic or higher polycyclic (meth)acrylate are preferable and isobornyl (meth)acrylate, adamantly (meth)acrylate, and dicyclopentanyl (meth)acrylate are more preferable as the alicyclic (meth)acrylate.

As the resin used to form resin particles, an acrylic resin having a constitutional unit derived from a (meth)acrylate monomer is preferable and an acrylic resin having a constitutional unit derived from an aromatic group-containing (meth)acrylate monomer or aliphatic (meth)acrylate is more preferable. Further, it is preferable that the resin particles have a constitutional unit derived from an aromatic group-containing (meth)acrylate monomer or aliphatic (meth)acrylate and the content thereof is in a range of 10% by mass to 95% by mass. When the content of the aromatic group-containing (meth)acrylate monomer or the aliphatic (meth)0acrylate is in a range of 10% by mass to 95% by mass, emulsification or the stability of the dispersion state is improved and an increase in ink viscosity can be suppressed.

From the viewpoints of stability of the dispersion state, stabilization of the particle shape in the aqueous medium using the hydrophobic interaction between aromatic rings and alicycles, and a decrease in amount of water-soluble components due to appropriate hydrophobization of particles, the content of the aromatic group-containing (meth) acrylate monomer or the alicyclic (meth)acrylate is more preferably in a range of 15% by mass to 90% by mass, more preferably in a range of 15% by mass to 80% by mass, and particularly preferably in a range of 25% by mass to 70% by mass.

A resin used to form resin particles can be formed using a constitutional unit derived from an aromatic group-containing monomer or an alicyclic aliphatic group-containing monomer and a constitutional unit derived from a dissociable group-containing monomer. Further, other constitutional units may be also used as necessary.

The monomers forming other constitutional units are not particularly limited as long as the monomers can be copolymerized with an aromatic group-containing monomer and a dissociable group-containing monomer. Among these, from the viewpoints of flexibility of a polymer skeleton or ease of controlling the glass transition temperature (Tg), an alkyl group-containing monomer is preferable.

Examples of the alkyl group-containing monomer include alkyl(meth)acrylate such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth) acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylaminoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl (meth)acrylamide, or N-(n-,iso) butoxyethyl (meth)acrylamide.

The weight-average molecular weight of the water-insoluble polymer that forms resin particles is preferably in a range of $3.0 \times 10^3$ to $2.00 \times 10^5$, more preferably in a range of $5.0 \times 10^3$ to $1.50 \times 10^5$, and still more preferably in a range of $1.00 \times 10^4$ to $1.00 \times 10^5$. When the weight-average molecular weight thereof is $3.0 \times 10^3$ or greater, the amount of water-soluble components can be effectively suppressed. Further, the weight-average molecular weight thereof is $2.00 \times 10^5$ or less, the dispersion stability can be improved.

In addition, the weight-average molecular weight can be measured using a known method.

From the viewpoint of controlling hydrophobicity of the polymer, it is preferable that the water-insoluble polymer that forms resin particles includes a constitutional unit derived from an aromatic group-containing (meth)acrylate monomer (preferably a constitutional unit derived from phenoxyethyl (meth)acrylate and/or a constitutional unit derived from benzyl (meth)acrylate) or a cyclic aliphatic group-containing monomer (preferably alicyclic (meth) acrylate) at a copolymerization ratio of 15% by mass to 80% by mass with respect to the total mass of the resin particles.

In addition, from the viewpoint of controlling hydrophobicity of the polymer, it is preferable that the water-insoluble polymer includes a constitutional unit derived from an aromatic group-containing (meth)acrylate monomer or an alicyclic (meth)acrylate monomer at a copolymerization ratio of 15% by mass to 80% by mass, a constitutional unit derived from a carboxy group-containing monomer, and a constitutional unit derived from an alkyl group-containing monomer (preferably a constitutional unit derived from alkyl ester of (meth)acrylic acid) and more preferable that the water-insoluble polymer includes a constitutional unit derived from phenoxyethyl (meth)acrylate and/or a constitutional unit derived from benzyl (meth)acrylate at a copolymerization ratio of 15% by mass to 80% by mass, a constitutional unit derived from a carboxy group-containing monomer, and a constitutional unit derived from an alkyl group-containing monomer (preferably a constitutional unit derived from alkyl ester of (meth)acrylic acid having 1 to 4 carbon atoms).

It is preferable that the acid value of the water-insoluble polymer is in a range of 25 mgKOH/g to 100 mgKOH/g and the weight-average molecular weight thereof is in a range of $3.0 \times 10^3$ to $2.00 \times 10^5$ and more preferable that the acid value of the water-insoluble polymer is in a range of 25 mgKOH/g to 95 mgKOH/g and the weight-average molecular weight thereof is in a range of $5.0 \times 10^3$ to $1.50 \times 10^5$. The acid value and the weight-average molecular weight can be measured using known methods.

Hereinafter, exemplary compounds B-01 to B-23 will be described as specific examples of the water-insoluble polymer constituting the resin particles, but the embodiment of the present invention is not limited thereto. Further, the mass ratios of copolymer components are shown in the parentheses.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/ methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/ acrylic acid copolymer (5/48/40/7)

B-10: benzyl methacrylate/isobutyl methacrylate/cyclohexyl methacrylate/methacrylic acid copolymer (35/30/30/ 5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

B-20: methyl methacrylate/isobornyl methacrylate/acrylic acid copolymer (20/72/8)

B-21: methyl methacrylate/isobornyl methacrylate/acrylic acid copolymer (40/52/8)

B-22: methyl methacrylate/isobornyl methacrylate/dicyclopentanyl methacrylate/methacrylic acid copolymer (20/62/10/8)

B-23: methyl methacrylate/dicyclopentanyl methacrylate/methacrylic acid copolymer (20/72/8)

The method of producing the water-insoluble polymer contained in the resin particles is not particularly limited, and examples thereof include a method of performing emulsion polymerization in the presence of a polymerizable surfactant and covalently bonding a surfactant and a water-insoluble polymer to each other; a solution polymerization method of performing polymerization on a monomer mixture that contains the hydrophilic group-containing monomer and the aromatic group-containing monomer or the alicyclic group-containing monomer; and a method of copolymerization using a known polymerization method such as a bulk polymerization method. Among these polymerization methods, from the viewpoints of aggregation rate and jetting stability at the time of ejecting an ink composition, the solution polymerization method is preferable and a solution polymerization method using an organic solvent is more preferable.

From the viewpoint of the aggregation rate, it is preferable that the resin particles contain a polymer synthesized in an organic solvent, the polymer includes an anionic group (preferably a carboxy group), a part or the entirety of the anionic group of the polymer (preferably the acid value is in a range of 20 mgKOH/g to 100 mgKOH/g) is neutralized, and the neutralized group is prepared as a polymer dispersion using water as a continuous phase.

In other words, it is preferable that the resin particles are produced by performing a step of synthesizing a polymer in an organic solvent and a dispersion step of obtaining an aqueous dispersion in which at least a part of the anionic group (preferably a carboxy group) of the polymer is neutralized.

It is preferable that the dispersion step includes the following step (1) and step (2).

Step (1): step of stirring a mixture that contains a polymer (water-soluble polymer), an organic solvent, a neutralizing agent, and an aqueous medium Step (2): step of removing the organic solvent from the mixture It is preferable that the step (1) is a treatment of dissolving the polymer (water-insoluble polymer) in the organic solvent, gradually adding a neutralizing agent and an aqueous medium thereto, and mixing and stirring the solution to obtain a dispersion material. In this manner, resin particles having excellent storage stability can be obtained by adding a neutralizing agent and an aqueous medium to the water-insoluble polymer solution dissolved in an organic solvent without requiring strong shear force.

The method of stirring the mixture is not particularly limited, and a mixing and stirring device which is typically used and dispersers such as an ultrasonic disperser and a high pressure homogenizer can be used as necessary.

Further, in the step (2), an aqueous dispersion of resin particles can be obtained by distilling the organic solvent using a conventional method, for example, distillation under reduced pressure from the dispersion material obtained from the step (1) and performing phase transfer into a water system. The organic solvent in the obtained aqueous dispersion is substantially removed and the amount of organic solvent is preferably 0.2% by mass or less and more preferably 0.1% by mass or less.

Preferred examples of the organic solvent include an alcohol-based solvent, a ketone-based solvent, and an ether-based solvent. As the organic solvent, organic solvents exemplified in paragraph 0059 of JP2010-188661A can be used.

As the neutralizing agent, neutralizing agents exemplified in paragraphs 0060 and 0061 of JP2010-188661A can be used.

The volume average particle diameter of the resin particles (particularly, self-dispersing resin particles) is preferably in a range of 10 nm to 400 nm, more preferably in a range of 10 nm to 200 nm, still more preferably in a range of 10 nm to 100 nm, and particularly preferably in a range of 10 nm to 50 nm. When the volume average particle diameter thereof is 10 nm or greater, the production suitability is improved. Further, the volume average particle diameter thereof is 400 nm or less, the storage stability is improved. Moreover, the particle size distribution of the resin particles is not particularly limited, and any of resin particles having wide particle size distribution and resin particles having monodisperse particle size distribution may be used. In addition, the resin particles may be used in combination of two or more kinds thereof.

Further, the average particle diameter and the particle size distribution of the resin particles are acquired by measuring the volume average particle diameter using a nanotrac particle size distribution measurement apparatus UPA-EX150 (manufactured by Nikkiso Co., Ltd.) according to a dynamic light scattering method.

The ink composition may contain one or two or more kinds of resin particles (preferably self-dispersing resin particles).

From the viewpoint of glossiness of an image, the content (total content) of the resin particles (preferably self-dispersing resin particles) in the ink composition is preferably in a range of 1% by mass to 30% by mass and more preferably in a range of 3% by mass to 15% by mass with respect to the total amount of the ink composition.

[Water]

The ink composition contains water. The content of water is not particularly limited, but is preferably in a range of 10% by mass to 99% by mass, more preferably in a range of 30% by mass to 80% by mass, and still more preferably in a range of 50% by mass to 80% by mass with respect to the total mass of the ink composition.

[Organic Solvent]

It is more preferable that the ink composition further contains at least one organic solvent (preferably a water-soluble organic solvent). When the organic solvent contains particularly a water-soluble organic solvent, it is possible to prevent the ink composition from being dried and to promote penetration of the ink composition.

In a case where the water-soluble organic solvent is used as an anti-drying agent, it is possible to effectively prevent nozzle clogging which may occur due to the drying of an ink at an ink ejection opening in a case where the ink composition is ejected according to an inkjet method for image formation.

In order to prevent the ink composition from being dried, a water-soluble organic solvent having a lower vapor pressure than that of water is preferable. Specific examples of a preferred water-soluble organic solvent for the purpose of preventing the ink composition from being dried include polyalcohols such as ethylene glycol, propylene glycol, diethylene glycol, polyethylene glycol, thiodigylcol, dithiodigylcol, 2-methyl-1,3-propanediol, 1,2,6-hexanetriol, an acetylene glycol derivative, glycerin, and trimethylol propane; lower alkyl ethers of polyhydric alcohol such as ethylene glycol monomethyl (or ethyl) ether, diethylene glycol monomethyl (or ethyl) ether, triethylene glycol monoethyl (or butyl) ether, and tripropylene glycol monomethyl (or ethyl) ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethyl sulfoxide, and 3-sulfolene; polyfunctional compounds such as diacetone alcohol and diethanolamine; and urea derivatives.

Among these water-soluble organic solvents, polyhydric alcohol such as glycerin and diethylene glycol are preferable. Further, these may be used alone or in combination of two or more kinds thereof. It is preferable that the ink composition contains 10% by mass to 50% by mass of these water-soluble organic solvents.

In order to promote penetration of the ink composition, a water-soluble organic solvent is preferably used from the viewpoint of penetration of the ink composition from the substrate. Specific examples of the water-soluble organic solvent which is preferable for promoting penetration include alcohols such as ethanol, isopropanol, butanol, di(tri)ethylene glycol monobutyl ether, tripropylene glycol monomethyl (or ethyl) ether, and 1,2-hexanediol; sodium lauryl sulfate; sodium oleate; and non-ionic surfactants. When the ink composition contains 5% by mass to 30% by mass of these, excellent effects are obtained. Further, it is preferable that the amount of these water-soluble organic solvents is in a range in which blurring of printed characters and images or page omission (print through) does not occur.

Further, the water-soluble organic solvent can be used to adjust the viscosity other than the applications described above. Specific examples of the water-soluble organic solvent which can be used to adjust the viscosity include alcohol (for example, methanol, ethanol, propanol, isopropanol, butanol, isobutanol, sec-butanol, t-butanol, pentanol, hexanol, cyclohexanol, or benzyl alcohol), polyvalent alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), amine (for example, ethanolamine, diethanolamine, triethanolamine, N-methyl diethanolamine, N-ethyl diethanolamine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, solfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Further, the water-soluble organic solvents may be used alone or two or more kinds thereof.

[Surfactant]

The ink composition may contain at least one surfactant.

Examples of the surfactant include a non-ionic surfactant, a cationic surfactant, an anionic surfactant, and a betaine surfactant. From the viewpoint of the aggregation rate, an anionic surfactant or a non-ionic surfactant is preferable.

From the viewpoint of satisfactorily ejecting the ink composition using an inkjet method, it is preferable that the amount of the surfactant to be contained in the ink composition is set such that the surface tension of the ink composition can be adjusted to be in a range of 25 mN/m to 40 mN/m. Among the examples of the ranges, it is preferable that the content of the surfactant is set such that the surface tension thereof can be adjusted to be in a range of 27 mN/m to 37 mN/m.

Further, these surfactants can be used as an anti-foaming agent. As the surfactants, chelating agents typified by a fluorine-based compound, a silicone-based compound, and ethylenediaminetetraacetic acid (EDTA) can be used.

[Other Additives]

The ink composition may further contain other additives in addition to the components described above. Examples of other additives include known additives such as a discoloration preventer, an emulsification stabilizer, a penetration enhancer, an ultraviolet absorbing agent, a preservative, an antifungal agent, a pH adjusting agent, an antifoaming agent, a viscosity adjusting agent, a dispersion stabilizer, a rust inhibitor, and a chelating agent. These various additives may be directly added after preparation of the ink composition or added during the preparation of the ink composition.

As the pH adjusting agent, a neutralizing agent (an organic base or inorganic alkali) can be used. From the viewpoint of improving the storage stability of the ink composition, it is preferable that the pH adjusting agent is added to the ink composition such that the pH of the ink composition is adjusted to be in a range of 6 to 10 and more preferable that the pH adjusting agent is added to the ink composition such that the pH of the ink composition is adjusted to be in a range of 7 to 10.

From the viewpoints of jetting stability in a case of ejecting an ink using an inkjet method and the aggregation rate when a treatment liquid described below is used, the viscosity of the ink composition is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s.

The viscosity of the ink composition is obtained by measuring the ink composition under a temperature condition of 25° C. using VISCOMETER TV-22 (manufactured by TOKI SANGYO CO., LTD.).

It is preferable that the ink composition contains resin particles and a pigment covered with a polymer dispersing agent containing a carboxy group, the solid content ratio thereof is in a range of 7% by mass to 10% by mass, and the content ratio of the solid content other than the pigment to the pigment is in a range of 0.8 to 1.6 and more preferable that the ink composition contains self-dispersing resin particles and a pigment covered with an acrylic polymer, the solid content ratio thereof is in a range of 7% by mass to 9% by mass, and the content ratio of the solid content other than the pigment to the pigment is in a range of 1.0 to 1.4.

Hereinbefore, the ink set has been described, but the specific structure of the ink set according to the embodiment of the present invention is not particularly limited as long as the ink set includes a combination of at least one ink composition and a treatment liquid.

In the ink set, the ratio of the content of the colorant in the ink composition to the content of the aggregation compound based on the total mass of the treatment liquid is not particularly limited, but is preferably in a range of 0.1 to 50, more preferably in a range of 0.15 to 10, and still more preferably in a range of 0.25 to 5 on a mass basis.

When the above-described ratio between contents is 50 or less, the graininess of an image can be suppressed. Further, when the above-described ratio is 0.1 or greater, the rub resistance of an image is improved.

Examples of preferred configurations of the ink set include a configuration (three color configuration) formed of a combination of a cyan ink serving as an ink composition, a magenta ink serving as an ink composition, and a treatment liquid; and a configuration (four color configuration) formed of a combination of a black ink serving as an ink composition, a cyan ink serving as an ink composition, a magenta ink serving as an ink composition, a yellow ink serving as an ink composition, and a treatment liquid.

Here, the ink set may be an ink set with one color configuration or a two color configuration formed of a treatment liquid and one or two ink compositions.

Further, the ink set may contain other ink compositions as necessary, for example, at least one ink selected from light cyan ink, light magenta ink, and light yellow ink in addition to the above-described ink compositions. As other ink compositions described above, known ink compositions can be used without particular limitation.

Further, the ink set may contain two or more treatment liquids as necessary.

In a case where the ink set contains two or more ink compositions, at least one ink composition may be an ink composition containing resin particles and a pigment. Further, in a case where the ink set contains two or more treatment liquids, at least one treatment liquid may be a treatment liquid containing an aggregation compound and an anionic surfactant.

The ink set may be preferably used for the image forming method described below.

<<Image Forming Method>>

An image forming method includes a pre-treatment step of applying the treatment liquid of the ink set according to an embodiment of the present invention to at least one surface of a substrate having a contact angle of 70° or greater when 3 seconds have elapsed from application of water droplets to the surface; and an image forming step of forming an image by ejecting the ink composition of the ink set according to the embodiment of the present invention to the surface of the substrate to which the treatment liquid is applied.

[Pre-Treatment Step]

The pre-treatment step is a step of applying the treatment liquid of the ink set according to the embodiment of the present invention to at least one surface of the substrate having a contact angle of 70° or greater when 3 seconds have elapsed from application of water droplets to the surface.

The treatment liquid can be applied using a known method such as a coating method, an inkjet method, or an immersion method. Examples of the known coating method include an extrusion die coater, an air doctor coater, a blade coater, a rod coater, a knife coater, a squeeze coater, a reverse roll coater, and a bar coater. The details of the inkjet method will be described below.

The pre-treatment step is performed before the image forming step for which the ink composition is used.

In other words, before the ink composition is applied onto the substrate, the treatment liquid for aggregating components (a colorant and the like) in the ink composition is applied in advance, and the ink composition is applied such that the ink composition comes into contact with the treatment liquid applied onto the substrate to obtain an image.

In this manner, inkjet recording can be carried out at a high speed and a high-resolution image with a high density can be obtained even when the recording is carried out at a high speed.

Further, according to the embodiment of the present invention, it is preferable that the treatment liquid on the substrate is heated and dried from when the treatment liquid is applied onto the substrate to when the ink composition is applied. In this manner, ink colorability such as bleeding prevention become excellent and a visible image with an excellent color density and excellent hue can be recorded.

The treatment liquid is heated and dried using known heating means such as a heater, blast means for blasting such as a dryer, or a combination of these.

Examples of the heating method include a method of applying heat using a heater or the like from the opposite side of the surface of the substrate to which the treatment liquid has been applied, a method of blowing warm air or hot air to the surface of the substrate to which the treatment liquid has been applied, and a heating method using an infrared heater, and the heating may be carried out by a method of combining a plurality of methods of these.

[Image Forming Step]

The image forming step is a step of forming an image by ejecting the ink composition of the ink set according to the embodiment of the present invention to the surface of the substrate to which the treatment liquid is applied using an inkjet method.

The inkjet method is not particularly limited, and examples thereof include known methods such as a electrostatic charge control method of ejecting an ink using electrostatic attraction force; a drop-on-demand method (pressure pulses method) using a vibration pressure of a piezoelectric element; an acoustic inkjet method of ejecting an ink using a radiation pressure by changing an electric signal into an acoustic beam and applying the acoustic beam to the ink; and a thermal inkjet (bubble jet (registered trademark)) method of heating an ink to form bubbles and utilizing the generated pressure. As the inkjet method, particularly, an inkjet method, described in JP1979-59936A (JP-S54-59936A), of ejecting an ink from a nozzle using an action force caused by a rapid change in volume of the ink after being subjected to an action of thermal energy.

Further, examples of the inkjet method include a method of ejecting a small volume of an ink having a low concentration, which is referred to as a photo ink, multiple times, a method of improving the image quality using a plurality of inks having substantially the same hue and different concentrations, and a method of using a colorless transparent ink.

Further, an inkjet head used in the inkjet method may be operated by an on-demand system or a continuous system. Specific examples of the ejection system include an electromechanical conversion system (such as a single cavity type, a double cavity type, a bender type, a piston type, a share mode type, or a shared wall type), an electrothermal conversion system (such as a thermal inkjet type or a bubble jet (registered trademark) type), an electrostatic suction system (such as an electric field control type or a slit jet type), and an electrical ejection system (such as a spark jet type), and any ejection system may be used.

The ink nozzle used at the time of recording according to the inkjet method is not particularly limited and can be selected as appropriate depending on the purpose thereof.

A short serial head is used as the inkjet head, and there are two systems for the inkjet head, which are a shuttle system of performing recording while scanning a head in the width direction of the substrate and a line system of using a line head in which recording elements are disposed corresponding to the entire area of one side of the substrate. In the line system, image recording can be performed on the entire surface of the substrate by scanning the substrate in a direction orthogonal to the direction in which the recording elements are disposed. Therefore, a conveying system such as a carriage that scans a short head becomes unnecessary. Further, since movement of a carriage and complicated scanning control between the head and the substrate become unnecessary and only the substrate moves, the recording can be performed at a higher speed compared to the shuttle system.

The image forming method can be applied to any of these, and the ejection precision and the rub resistance of an image are highly improved in a case where the image forming method is applied to a line system that does not perform a dummy jet.

It is preferable that the image forming step is started within 10 seconds after the pre-treatment step and more preferable that the image forming step is started within a time range of 0.1 seconds to 10 seconds. In this manner, an image can be formed at a high speed.

According to the image forming method, when a known ink set is used, impact interference is suppressed and a high-resolution image can be formed even in case where the image is recorded at a high speed.

The expression "started within 10 seconds after the pre-treatment step" means that the time taken from when the treatment liquid is applied and the drying is completed to when the first ink droplet is impacted on the substrate is within 10 seconds.

Further, in the image forming step, the droplet amount of ink droplets to be applied (ejected) is preferably in a range of 1.5 pL (pico liter) to 3.0 pL and more preferably in a range of 1.5 pL to 2.5 pL from the viewpoint of a printed image with high resolution.

In addition, the droplet amount of the ink droplets can be adjusted by selecting the ejection conditions in the inkjet method as appropriate depending on the ink composition to be ejected.

[Heating and Fixing Step]

In the present embodiment of the present invention, it is preferable that a heating and fixing step of heating and fixing an image formed by the processing liquid applying step and the ink applying step is further provided.

An image on the substrate is fixed and the rub resistance of the image is further improved by performing such heating and fixing.

In a case where the ink composition contains resin particles, it is preferable that the heating in the heating and fixing step is performed at a temperature higher than or equal to the minimum filming temperature (MFT) of the resin particles in the image. When the heating is performed at MFT or higher, the resin particles are formed into a film so that the rub resistance of the image is improved.

In a case where an image is heated and pressed at the same time, the pressure at the time of pressing the image is preferably in a range of 0.1 MPa to 3.0 MPa, more preferably in a range of 0.1 MPa to 1.0 MPa, and still more preferably in a range of 0.1 MPa to 0.5 MPa from the viewpoint of making the surface smooth.

The heating method is not particularly limited, and preferred examples thereof include drying methods in a non-contact manner such as a heating method using a heating element such as a nichrome wire heater, a method of supplying warm air or hot air, and a heating method using a halogen lamp and an infrared lamp.

Further, the heating and pressing method is not particularly limited, and preferred examples thereof include methods of performing heating and fixing in a contact manner such as a method of pressing a hot plate to a surface of the substrate on which an image is formed; and a method of passing a pair of rollers or the like using a heating and pressing device that includes a pair of heating and pressing rollers, a pair of heating and pressing belts, or a heating and pressing belt disposed on a surface side of the substrate on which an image is formed and a holding roller disposed on the opposite side of the surface.

In a case of the heating and the pressing, the nip time is preferably in a range of 1 millisecond to 10 seconds, more preferably in a range of 2 milliseconds to 1 second, and still more preferably in a range of 4 milliseconds to 100 milliseconds. Further, the nip width is preferably in a range of 0.1 mm to 100 mm, more preferably in a range of 0.5 mm to 50 mm, and still more preferably in a range of 1 mm to 10 mm.

As a heating and pressing roller, a metal roller made of a metal or a roller provided with a coating layer that has an elastic member in the vicinity of a core metal made of a metal and a surface layer (or also referred to as a release layer) as necessary may be used. The core metal can be formed of a cylindrical body made of iron, aluminum, stainless steel (SUS), and the like, and it is preferable that at least a part of the surface of the core metal is covered with the coating layer. Particularly, it is preferable that the coating layer is formed of a silicone resin or a fluorine resin having release properties. Further, it is preferable that a heating element is included in the inside of a core metal of one heating and pressing roller, and the heat treatment and the pressure treatment may be performed at the same time by passing the substrate between the rollers or the heating treatment may be performed by interposing the substrate between two heating rollers as necessary. As the heating element, a halogen lamp heater, a ceramic heater, and a nichrome wire are preferable.

As a belt substrate that forms a heating and pressing belt used for a heating and pressing device, seamless electroformed nickel is preferable and the thickness of the substrate is preferably in a range of 10 μm to 100 μm. Further, aluminum, iron, and polyethylene other than nickel can be used as the material of the belt substrate. In a case where a silicone resin or a fluorine resin is provided, the thickness of a layer to be formed using these resins is preferably in a range of 1 μm to 50 μm and more preferably in a range of 10 μm to 30 μm.

In order to realize the pressure (nip pressure), an elastic member such as a sprint having a tensile force may be selected and then disposed on both ends of a roller such as a heating and pressing roller such that a desired nip pressure can be obtained by considering the nip gap.

The conveying speed of the substrate in a case of using a heating and pressing roller or a heating and pressing belt is preferably in a range of 200 mm/sec to 700 mm/sec, more preferably in a range of 300 mm/sec to 650 mm/sec, and still more preferably in a range of 400 mm/sec to 600 mm/sec.

(Substrate)

According to the image forming method, as described above, an image is formed on the surface to which the treatment liquid is applied after the application of the treatment liquid to the substrate having a contact angle of 70° or greater when 3 seconds have elapsed from application of water droplets to the surface.

The substrate is selected from substrates having a contact angle of 70° or greater when 3 seconds have elapsed from application of water droplets to each surface. Specific examples thereof include a paper substrate such as coated paper, synthetic paper, and a polymer substrate such as polyethylene terephthalate (PET) film. Among these substrates, from the viewpoints of interacting with an acidic group of a water-insoluble resin contained in the treatment liquid or a salt of the acidic group and remarkably exhibiting the effects of suppressing a decrease in density of a solid image portion, streak unevenness, and graininess, a paper substrate is preferable and a paper substrate (coated paper) having a coating layer is more preferable.

The contact angle between the substrate and water can be measured under conditions of a normal temperature and a normal humidity using a contact angle meter DROP MASTER DM700 (manufactured by Kyowa Interface Science Co., Ltd.) in conformity with JIS R3257.

As the paper substrate, so-called coated paper is preferable. The coated paper is a paper substrate formed by providing a coating layer containing an inorganic pigment and the like on the surface of high-quality paper, alkaline paper, or the like which includes cellulose serving as a support as a main body and which is not surface-treated. In the coated paper, gloss unevenness tends to occur in an image portion, but the occurrence of the gloss unevenness in the image portion can be effectively suppressed in a case where the treatment liquid contains phosphoric acid or a phosphoric acid compound. Specific examples of the paper substrate include art paper, coated paper, lightly coated paper, and fine coating paper.

The inorganic pigment contained in the coating layer is not particularly limited, but at least one selected from silica, kaolin, clay, baked clay, zinc oxide, tin oxide, magnesium sulfate, aluminum oxide, aluminum hydroxide, pseudoboehmite, calcium carbonate, sachin white, aluminum silicate, smectite, zeolite, magnesium silicate, magnesium carbonate, magnesium oxide, and diatomaceous earth is preferable and calcium carbonate, silica, and kaoline are more preferable.

As the substrate, commercially available products are typically used, and examples thereof include "MagnoStar-Gloss" (manufactured by Sappi), "CarolinaC2S" (manufactured by International Company), "CartaIntegra" (manufactured by Metsaboard), and "VJFP series" (manufactured by YUPO).

In the embodiment of the present invention, it is preferable that the amount of the treatment liquid to be applied and the amount of the ink composition to be applied as necessary. For example, in order to adjust the physical properties such as the viscoelasticity of an aggregate formed by the treatment liquid and the ink composition being mixed with each other, the amount of the treatment liquid to be applied may be changed depending on the substrate.

EXAMPLES

An embodiment of the present invention will be described in more detail with reference to the examples described below. However, the scope of the embodiment of the present invention is not limited to the specific examples described below. Further, "part" is on a mass basis unless otherwise noted.

(Synthesis Example of Water-Insoluble Resin Particles A-1)

1.5 g of a 62 mass % aqueous solution (manufactured by Tokyo Chemical Industry Co., Ltd.) of sodium dodecyl benzene sulfonate and 350 g of water were added to a 1000 mL three-neck flask provided with a stirrer and a cooling pipe, heated at 80° C. in a nitrogen atmosphere, and both of a solution A obtained by dissolving 0.85 g of potassium peroxodisulfate (potassium persulfate) (manufactured by Wako Pure Chemical Industries, Ltd.) as a polymerization initiator and 12.41 g of a 50 mass % aqueous solution (manufactured by Sigma-Aldrich Co. LLC.) of sodium acrylamide-2-methylpropanesulfonate as a raw material monomer in 20 g of water and a solution B obtained by mixing 22.75 g of methyl methacrylate (manufactured by Wako Pure Chemical Industries, Ltd.) as a raw material monomer and 12.41 g of methacrylic acid (manufactured by Wako Pure Chemical Industries, Ltd.) were added dropwise to the three-neck flask for 3 hours at the same time. After the dropwise addition, the solution was reacted for 3 hours, thereby obtaining 412 g of an aqueous dispersion liquid of water-insoluble resin particles A-1. The volume average particle diameter of the water-insoluble resin particles A-1 was 30 nm. The weight-average molecular weight of the water-insoluble resin particles A-1 was $1.15 \times 10^5$.

The volume average particle diameter was acquired by performing measurement using the aqueous dispersion liquid of the water-insoluble resin particles, adjusted such that the concentration of solid contents was 2% by mass, at a liquid temperature of 25° C. with a nanotrac particle size distribution measurement apparatus UPA-EX150 (manufactured by Nikkiso Co., Ltd.) according to a dynamic light scattering method.

The weight-average molecular weight was measured using gel permeation chromatography (GPC).

According to GPC, HLC-8220GPC (manufactured by TOSOH CORPORATION) was used, three columns of TSKgel, Super Multipore HZ-H (manufactured by TOSOH CORPORATION, 4.6 mmID×15 cm) were used as columns, and tetrahydrofuran (THF) was used as an eluant. The weight-average molecular weight was measured under conditions of a sample concentration of 0.45% by mass, a flow rate of 0.35 mL/min, a sample injection amount of 10 μl, and a measurement temperature of 40° C. using a refractive index (RI) detector. Further, the calibration curve was created from 8 samples of "standard samples TSK standard, polystyrene", which are "F-40", "F-20", "F-4", "F-1", "A-5000", "A-2500", "A-1000", and "n-propylbenzene".

(Synthesis Examples of Water-Soluble Resin Particles A-2 to A-11, A-13, A-16 to A-18, A-20 to A-23, and A-26 to A-36)

Aqueous dispersion liquids of water-soluble resin particles A-2 to A-11, A-13, A-16 to A-18, A-20 to A-23, and A-26 to A-36 were obtained according to the same method as that for the water-insoluble resin particles A-1 except that the raw material monomer in the water-insoluble resin particles A-1 was changed to the monomer listed in Table 1. Further, the weight-average molecular weights of water-insoluble resin particles are collectively listed in Table 1.

(Synthesis Example of Water-Insoluble Resin Particles A-12)

After an aqueous dispersion liquid of water-insoluble resin particles was obtained according to the same method as that for the water-insoluble resin particles A-1 except that the raw material monomer in the water-insoluble resin particles A-1 was changed to the monomer listed in Table 1, 1.78 g of a 50 mass % sodium hydroxide aqueous solution was added to the aqueous dispersion liquid, and the solution was stirred at 40° C. for 2 hours, thereby obtaining an aqueous dispersion liquid of the water-insoluble resin particles A-12.

(Synthesis Example of Water-Insoluble Resin Particles A-14)

An aqueous dispersion liquid of water-insoluble resin particles A-14 were obtained according to the same method as that for the water-insoluble resin particles A-1 except that potassium peroxodisulfate (potassium persulfate) serving as a polymerization initiator in the water-insoluble resin particles A-1 was changed to 2,2-azobis[2-methyl-N-(2-hydroxyethyl)propionamide] (manufactured by Wako Pure Chemical Industries, Ltd.).

(Synthesis Example of Water-Insoluble Resin Particles A-15)

After an aqueous dispersion liquid of water-insoluble resin particles was obtained according to the same method as that for the water-insoluble resin particles A-1 except that the raw material monomer in the water-insoluble resin particles A-1 was changed to the monomer listed in Table 1, 1.78 g of a 50 mass % sodium hydroxide aqueous solution was added to the aqueous dispersion liquid, and the solution was stirred at 40° C. for 2 hours, thereby obtaining an aqueous dispersion liquid of the water-insoluble resin particles A-15.

(Synthesis Example of Latex A-24)

1.5 g of sodium dodecyl benzene sulfonate (62 mass % aqueous solution, manufactured by Tokyo Chemical Industry Co., Ltd.) and 350 g of water were added to a 1000 mL three-neck flask provided with a stirrer and a cooling pipe, heated at 90° C. in a nitrogen atmosphere, and all of a solution A obtained by dissolving 12.41 g of sodium acrylamide-2-methylpropanesulfonate (50 mass % aqueous solution, manufactured by Sigma-Aldrich Co. LLC.) in 20 g of water, a solution B obtained by mixing 12.41 g of methyl methacrylate (manufactured by Wako Pure Chemical Industries, Ltd.), 12.41 g of methacrylic acid (manufactured by Wako Pure Chemical Industries, Ltd.), 10.34 g of styrene, and 0.708 g of dodecanethiol, and a solution C obtained by dissolving 1.10 g of sodium persulfate (manufactured by Wako Pure Chemical Industries, Ltd.) in 20 g of water were added dropwise to the three-neck flask for 3 hours at the same time. After the dropwise addition, the solution was reacted for 3 hours, thereby obtaining 410 g of an aqueous dispersion liquid of a latex A-24. The volume average particle diameter of the latex A-24 was 30 nm. The weight-average molecular weight of the latex A-24 was $1.25 \times 10^4$. Further, the volume average particle diameter and the weight-average molecular weight were measured using known methods.

(Synthesis Example of Latex A-25)

An aqueous dispersion liquid of a latex A-25 was obtained according to the same method as that for the synthesis of the latex A-24 except that 12.41 g of sodium acrylamide-2-methylpropanesulfonate (50 mass % aqueous solution), 10.34 g of methyl methacrylate, 12.41 of methacrylic acid, and 12.41 g of styrene were used as monomers and 1.32 g of mercaptopropionic acid was used in place of dodecanethiol in the synthesis of the latex A-24. The volume average particle diameter of the latex A-25 was 30 nm. The weight-average molecular weight of the latex A-25 was $2.58 \times 10^4$. Further, the volume average particle diameter and the weight-average molecular weight were measured using known methods.

(Synthesis Example of Latex A-37)

An aqueous dispersion liquid of a latex A-37 was obtained according to the same method as that for the synthesis of the latex A-24 except that 8.28 g of sodium acrylamide-2-methylpropanesulfonate (50 mass % aqueous solution), 9.10 g of methyl methacrylate, 15.72 g of methacrylic acid, and 12.41 g of styrene were used as monomers in the synthesis of the latex A-24. The volume average particle diameter of the latex A-37 was 60 nm. The weight-average molecular weight of the latex A-37 was $2.28 \times 10^4$. Further, the volume average particle diameter and the weight-average molecular weight were measured using known methods.

(Synthesis Example of Water-Soluble Resin X-1)

90 g of water was added to a 500 mL three-neck flask provided with a stirrer and a cooling pipe and heated at 80° C. in a nitrogen atmosphere, and both of a solution A obtained by dissolving 0.85 g of potassium persulfate and 107.06 g of sodium acrylamide-2-methylpropanesulfonate (50 mass % aqueous solution) in 45 g of water and a solution B obtained by mixing 22.94 g of methacrylic acid were added dropwise to the three-neck flask for 2 hours at the same time. After the dropwise addition, the solution was reacted for 3 hours, thereby obtaining an aqueous solution of a water-soluble resin X-1 (the following structure). The volume average particle diameter of the water-soluble resin X-1 was $7.80 \times 10^4$. Further, the particle diameter of the water-soluble resin X-1 was not detected from the measurement of the volume average particle diameter.

(Synthesis Example of Water-Insoluble Resin Particles X-2)

An aqueous dispersion liquid of a water-insoluble resin particles X-2 (the following structure) was obtained according to the same method as that for A-1 except that the raw material monomer in the water-insoluble resin particles A-1 was changed to 35.16 g of methyl methacrylate and 6.21 g of 2-hydroxyethyl methacrylate.

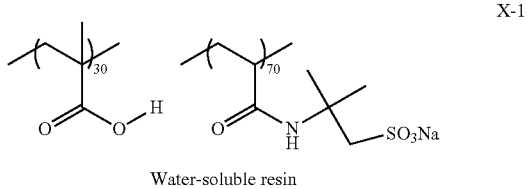

Water-soluble resin

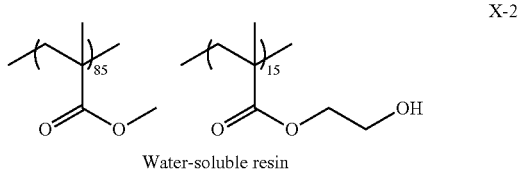

Water-soluble resin (Synthesis Examples of Water-Insoluble Resin Particles X-3 and X-4)

Water dispersion liquids of water-insoluble resin particles X-3 (the following structure) and X-4 (the following structure) were obtained according to the same method as that for the water-insoluble resin particles A-1 except that the raw material monomer in the water-insoluble resin particles A-1 was changed to the monomer listed in Table 1.

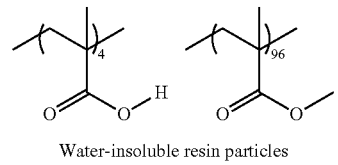

Water-insoluble resin particles X-3

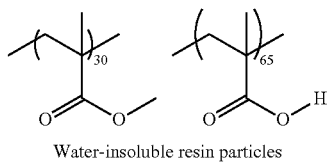

Water-insoluble resin particles X-4

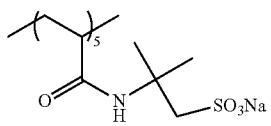

TABLE 1

| | Raw material monomer | | | | | | | | |
|---|---|---|---|---|---|---|---|---|---|
| | Solution A | | | | Solution B | | | | |
| | Sodium acrylamide-2-methyl-propane-sulfonate (50 mass % aqueous solution) | Acrylamide-2-methyl-propane sulfonic acid (50 mass % aqueous solution) | Methacrylic acid-3-sulfopropyl potassium salt | Sodium styrene sulfonate | Methyl-meth-acrylate | Ethyl-meth-acrylate | Ethyl acrylate | Methacrylic acid | Sodium methacrylate |
| A-1 | 12.41 g | | | | 22.75 g | | | 12.41 g | |
| A-2 | 12.41 g | | | | 31.03 g | | | 4.14 g | |
| A-4 | 8.27 g | | | | 16.55 g | | | 20.68 g | |
| A-5 | 8.27 g | | | | 12.41 g | | | 24.82 g | |
| A-6 | 20.68 g | | | | 18.62 g | | | 12.41 g | |
| A-7 | 12.41 g | | | | 14.48 g | | | 12.41 g | |
| A-8 | 12.41 g | | | | 14.48 g | | | 12.41 g | |
| A-9 | 12.41 g | | | | 22.75 g | | | | |
| A-10 | | | 6.21 g | | 22.75 g | | | 12.41 g | |
| A-11 | 12.41 g | | | | 22.75 g | | | | |
| A-12 | 12.41 g | | | | 24.82 g | | | 8.27 g | 2.07 g |
| A-13 | | | | | 28.96 g | | | 12.41 g | |
| A-14 | 12.41 g | | | | 22.75 g | | | 12.41 g | |
| A-16 | | 4.13 g | | | 31.03 g | | | 8.27 g | |
| A-20 | 12.41 g | | | | 18.62 g | | | 12.41 g | |
| A-21 | 12.41 g | | | | 14.48 g | | | 12.41 g | |
| A-22 | 12.41 g | | | | 10.34 g | | | 12.41 g | |
| A-23 | 12.41 g | | | | 14.48 g | | | 12.41 g | |
| A-24 | 12.41 g | | | | 12.41 g | | | 12.41 g | |
| A-25 | 12.41 g | | | | 10.34 g | | | 12.41 g | |
| A-26 | 12.41 g | | | | 20.68 g | | | 12.41 g | |
| A-27 | 12.41 g | | | | 6.21 g | | | 12.41 g | |
| A-28 | 12.41 g | | | | 14.48 g | | | 12.41 g | |
| A-29 | 12.41 g | | | | 14.48 g | | | 12.41 g | |
| A-30 | 12.41 g | | | | 24.82 g | | | | |
| A-31 | 12.41 g | | | | 24.82 g | | | | |
| A-32 | | | 6.21 g | | 24.82 g | | | | |
| A-33 | | | | 6.21 g | 35.16 g | | | | 10.34 g |
| A-34 | | | 2.07 g | | | 26.89 g | | | |
| A-35 | | | 2.07 g | | | | 26.89 g | | |
| A-36 | | | 2.07 g | | | 26.89 g | | | |
| A-37 | 8.28 g | | | | 9.10 g | | | 15.72 g | |
| X-3 | | | | | 39.71 g | | | 1.65 g | |
| X-4 | 4.14 g | | | | 12.41 g | | | 26.89 g | |

TABLE 1-continued

| | Raw material monomer Solution B | | | | | | | |
|---|---|---|---|---|---|---|---|---|
| | Acrylic acid | β-carboxy-ethyl acrylate | 2-methacryloyloxy-ethylsuccinic acid | 2-methacryloyloxy--ethylhexa-hydrophthalic acid | 2-acryloyloxy-ethylphthalic acid | Maleic acid | Butyl acrylate | Styrene |
| A-1 | | | | | | | | |
| A-2 | | | | | | | | |
| A-4 | | | | | | | | |
| A-5 | | | | | | | | |
| A-6 | | | | | | | | |
| A-7 | | | | | | | | 8.27 g |
| A-8 | | | | | | | | |
| A-9 | | 12.41 g | | | | | | |
| A-10 | | | | | | | | |
| A-11 | 12.41 g | | | | | | | |
| A-12 | | | | | | | | |
| A-13 | | | | | | | | |
| A-14 | | | | | | | | |
| A-16 | | | | | | | | |
| A-20 | | | | | | | | 4.14 g |
| A-21 | | | | | | | | 8.27 g |
| A-22 | | | | | | | | 12.41 g |
| A-23 | | | | | | | | |
| A-24 | | | | | | | | 10.34 g |
| A-25 | | | | | | | | 12.41 g |
| A-26 | | | | | | | | 2.07 g |
| A-27 | | | | | | | | 16.55 g |
| A-28 | | | | | | | | |
| A-29 | | | | | | | | |
| A-30 | | | 10.34 g | | | | | |
| A-31 | | | | | | 10.34 g | | |
| A-32 | | | | | | 10.34 g | | |
| A-33 | | | | | | | | |
| A-34 | | | 12.41 g | | | | | |
| A-35 | | | | 12.41 g | | | | |
| A-36 | | | | | 12.41 g | | | |
| A-37 | | | | | | | | 12.41 g |
| X-3 | | | | | | | | |
| X-4 | | | | | | | | |

| | Raw material monomer Solution B | | | | | Weight-average molecular weight (×10⁴) |
|---|---|---|---|---|---|---|
| | Benzyl methacrylate | Cyclohexyl methacrylate | Dicyclo-pentadienyl methacrylate | 2-hydroxyethyl methacrylate | Initiator | |
| A-1 | | | | | Potassium peroxodisulfate | 115000 |
| A-2 | | | | | | 110000 |
| A-4 | | | | | | 152000 |
| A-5 | | | | | | 142000 |
| A-6 | | | | | | 142000 |
| A-7 | | | | | | 124000 |
| A-8 | | | | 8.27 g | | 321200 |
| A-9 | | | | | | 248000 |
| A-10 | | | | | | 121000 |
| A-11 | | | | | | 131000 |
| A-12 | | | | | | 225000 |
| A-13 | | | | | | 125000 |
| A-14 | | | | | 2,2'-azobis[2-methyl-N-(2-hydroxy-ethyl)propionamide | 59000 |
| A-16 | | | | | Potassium peroxodisulfate | 128000 |
| A-20 | | | | | | 126000 |
| A-21 | | | | | | 125000 |
| A-22 | | | | | | 105000 |
| A-23 | 8.27 g | | | | | 125000 |
| A-24 | | | | | Potassium peroxodisulfate | 12500 |
| A-25 | | | | | | 25800 |
| A-26 | | | | | Potassium peroxodisulfate | 89500 |
| A-27 | | | | | | 135000 |
| A-28 | | 8.27 g | | | | 126000 |
| A-29 | | | 8.27 g | | | 98200 |
| A-30 | | | | | | 123000 |
| A-31 | | | | | | 115000 |
| A-32 | | | | | | 124000 |
| A-33 | | | | | | 125000 |

TABLE 1-continued

| | | |
|---|---|---|
| A-34 | | 134000 |
| A-35 | | 110000 |
| A-36 | | 98000 |
| A-37 | Potassium peroxodisulfate | 22800 |
| X-3 | Potassium peroxodisulfate | 89000 |
| X-4 | | 350000 |

<Preparation of Treatment Liquid>
(Preparation of Treatment Liquid A)
Respective components in the following composition were mixed to prepare a treatment liquid A.
—Composition of Treatment Liquid A—
Diethylene glycol monoethyl ether . . . 4% by mass
Tripropylene glycol monomethyl ether . . . 4% by mass
Malonic acid . . . 17.3% by mass (compound that causes colorant to aggregate, organic acidic compound)
Propanetricarboxylic acid . . . 4.3% by mass (compound that causes colorant to aggregate, organic acidic compound)
Phosphoric acid . . . 4.3% by mass (compound that causes colorant to aggregate, organic acidic compound)
Water-insoluble resin particles listed in Tables 3 and 4 . . . amounts listed in Tables 3 and 4
Benzotriazole . . . 1% by mass
Anti-foaming agent . . . 100 ppm as amount of silicone oil (manufactured by Momentive Performance Materials Inc., TSA-739 (solid content of 15% by mass), emulsion type silicon anti-foaming agent)
Ion exchange water . . . 100% by mass as residual amount in total
(Preparation of Treatment Liquid B)
Respective components in the following composition were mixed to prepare a treatment liquid B.
—Composition of Treatment Liquid B—
Dicyandiamide and formalin polycondensate . . . 10% by mass (weight-average molecular weight of 3000, compound that causes colorant to aggregate)
Glycerin . . . 5% by mass
Ethylene glycol . . . 15% by mass
IONET D46 . . . 1% by mass (SANYO CHEMICAL INDUSTRIES, LTD., quaternary cationic surfactant)
Sodium benzoate . . . 1% by mass
Triethanolamine . . . appropriate amount
Water-insoluble resin particles listed in Table 3 . . . amounts listed in Table 3
Ion exchange water . . . 100% by mass as residual amount in total
(Preparation of Treatment Liquid C)
Respective components in the following composition were mixed to prepare a treatment liquid C.
—Composition of Treatment Liquid C—
Calcium chloride . . . 10% by mass (compound that causes colorant to aggregate)
3-methoxy-3-methyl-1-butanol . . . 5% by mass
Glycerin . . . 30% by mass
EMULGEN 108 . . . 1% by mass (manufactured by Kao Corporation, surfactant polyoxyethylene lauryl ether)
PROXEL xl-2(s) . . . 0.2% by mass (manufactured by Lonza, preservative)
Water-insoluble resin particles listed in Table 3 . . . amounts listed in Table 3
Ion exchange water . . . 100% by mass as residual amount in total (Preparation of Treatment Liquid D)
Respective components in the following composition were mixed to prepare a treatment liquid D.
—Composition of Treatment Liquid D—
Diethylene glycol monoethyl ether . . . 4% by mass
Tripropylene glycol monomethyl ether . . . 4% by mass
Malonic acid . . . 10% by mass (compound that causes colorant to aggregate, organic acidic compound)
Benzotriazole . . . 1% by mass
Anti-foaming agent . . . 100 ppm as amount of silicone oil (manufactured by Momentive Performance Materials Inc., TSA-739 (solid content of 15% by mass), emulsion type silicon anti-foaming agent)
Water-insoluble resin particles listed in Table 3 . . . amounts listed in Table 3
Ion exchange water . . . 100% by mass as residual amount in total
(Preparation of Treatment Liquid E)
Respective components in the following composition were mixed to prepare a treatment liquid E.
—Composition of Treatment Liquid E—
Diethylene glycol monoethyl ether . . . 4% by mass
Tripropylene glycol monomethyl ether . . . 4% by mass
Malonic acid . . . 5% by mass (compound that causes colorant to aggregate, organic acidic compound)
Benzotriazole . . . 1% by mass
Anti-foaming agent . . . 100 ppm as amount of silicone oil (manufactured by Momentive Performance Materials Inc., TSA-739 (solid content of 15% by mass), emulsion type silicon anti-foaming agent)
Water-insoluble resin particles listed in Table 3 . . . amounts listed in Table 3
Ion exchange water . . . 100% by mass as residual amount in total
(Preparation of Treatment Liquid F)
Respective components in the following composition were mixed to prepare a treatment liquid F.
—Composition of Treatment Liquid F—
Diethylene glycol monoethyl ether . . . 4% by mass
Tripropylene glycol monomethyl ether . . . 4% by mass
Malonic acid . . . 3% by mass (compound that causes colorant to aggregate, organic acidic compound)
Benzotriazole . . . 1% by mass
Anti-foaming agent . . . 100 ppm as amount of silicone oil (manufactured by Momentive Performance Materials Inc., TSA-739 (solid content of 15% by mass), emulsion type silicon anti-foaming agent)
Water-insoluble resin particles listed in Table 3 . . . amounts listed in Table 3
Ion exchange water . . . 100% by mass as residual amount in total
(Preparation of Treatment Liquid G)
Respective components in the following composition were mixed to prepare a treatment liquid G.
—Composition of Treatment Liquid G—
Diethylene glycol monoethyl ether . . . 6.1% by mass
1,4-butanediol . . . 2.5% by mass Malonic acid . . . 9.07% by mass (compound that causes colorant to aggregate, organic acidic compound)

DL-malic acid . . . 7.66% by mass (compound that causes colorant to aggregate, inorganic acidic compound)

Propanetricarboxylic acid . . . 2.4% by mass (compound that causes colorant to aggregate, organic acidic compound)

Phosphoric acid . . . 6.73% by mass (compound that causes colorant to aggregate, organic acidic compound)

Water-insoluble resin particles listed in Table 4 . . . amounts listed in Table 4

Sodium dodecyl benzene sulfonate . . . 0.5% by mass

Anti-foaming agent . . . 100 ppm as amount of silicone oil (manufactured by Momentive Performance Materials Inc., TSA-739 (solid content of 15% by mass), emulsion type silicon anti-foaming agent)

Ion exchange water . . . 100% by mass as residual amount in total

<Preparation of Ink Composition>

(Synthesis of Polymer Dispersing Agent P-1)

A polymer dispersing agent P-1 was synthesized in the following manner according to the following scheme.

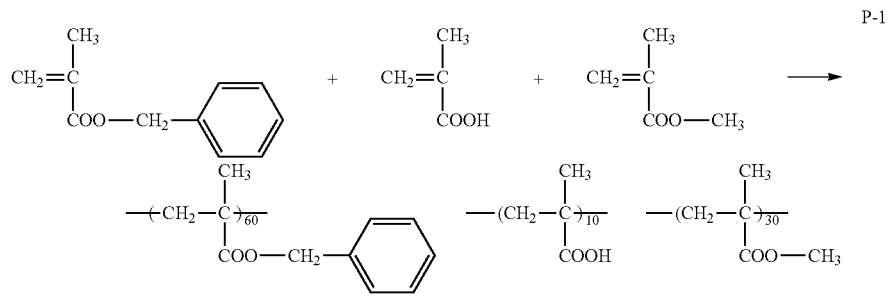

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise to the three-neck flask for 3 hours. After the dropwise addition, the solution was reacted for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was re-precipitated in an excessive amount of hexane twice, and the deposited resin was dried, thereby obtaining 96 g of a polymer dispersing agent P-1. Further, the numerical values of each constitutional unit of the polymer dispersing agent P-1 described above indicate the mass ratios.

The composition of the obtained resin was confirmed using proton nuclear magnetic resonance spectroscopy ($^1$H-NMR), and the weight-average molecular weight (Mw) acquired by GPC was 44600. Further, the acid value acquired by the method described in JIS standard (JISK0070:1992) was 65.2 mgKOH/g.

(Preparation of Pigment Dispersion Liquid)

—Preparation of Cyan Dispersion Liquid—

10 parts of Pigment Blue 15:3 (phthalocyanine blue A220, manufactured by Dainichiseika Color & Chemicals Mfg. Co., Ltd.) which is a cyan pigment, 5 parts of a polymer dispersing agent P-1, 42 parts of methyl ethyl ketone, 5.5 parts of a $1\times10^3$ mol/L NaOH aqueous solution, and 87.2 parts of ion exchange water were mixed and dispersed using zirconia beads having a diameter of 0.1 mm for 2 to 6 hours by utilizing a bead mill.

After methyl ethyl ketone was removed and some water was removed from the obtained dispersion under reduced pressure at 55° C., a centrifugation treatment was performed at 8000 rpm for 30 minutes using a high-speed centrifugal cooling machine 7550 (manufactured by KUBOTA CORPORATION) and a 50 mL centrifuge pipe. After the stretching treatment, the supernatant other than the precipitate was recovered. Thereafter, the pigment concentration was acquired from the absorbance spectrum and then a dispersion (a cyan dispersion liquid C) of resin-coated pigment particles (a pigment covered with a polymer dispersing agent) having a pigment concentration of 10.2% by mass was obtained. The average particle diameter of the resin-coated pigment particles of the obtained cyan dispersion liquid C was 105 nm. Further, the average particle diameter was measured using a known method.

—Preparation of Magenta Dispersion Liquid—

A dispersion (a magenta dispersion liquid M) of resin-coated pigment particles (a pigment covered with a polymer dispersing agent) was prepared in the same manner as in the preparation of the cyan dispersion liquid except that Pigment Red 122 which is a magenta pigment was used in place of Pigment Blue 15:3 (phthalocyanine blue A220, manufactured by Dainichiseika Color & Chemicals Mfg. Co., Ltd.). The average particle diameter of the resin-coated pigment particles of the obtained magenta dispersion liquid M was 85 nm. Further, the average particle diameter was measured using a known method.

—Preparation of Yellow Dispersion Liquid—

A dispersion (a yellow dispersion liquid Y) of resin-coated pigment particles (a pigment covered with a polymer dispersing agent) was prepared in the same manner as in the preparation of the cyan dispersion liquid except that Pigment Yellow 74 which is a yellow pigment was used in place of Pigment Blue 15:3 (phthalocyanine blue A220, manufactured by Dainichiseika Color & Chemicals Mfg. Co., Ltd.). The average particle diameter of the resin-coated pigment particles of the obtained yellow dispersion liquid Y was 82 nm. Further, the average particle diameter was measured using a known method.

—Preparation of Black Dispersion Liquid—

A dispersion (a black dispersion liquid K) of resin-coated pigment particles (a pigment covered with a polymer dispersing agent) was prepared in the same manner as in the preparation of the cyan dispersion liquid except that carbon black (manufactured by Orion Engineered Carbons, NIPEX160-IQ) which is a black pigment was used in place of Pigment Blue 15:3 (phthalocyanine blue A220, manufactured by Dainichiseika Color & Chemicals Mfg. Co., Ltd.). The average particle diameter of the resin-coated pigment particles of the obtained black dispersion liquid K was 130 nm. Further, the average particle diameter was measured using a known method.

(Preparation of Resin Particles)

360.0 g of methyl ethyl ketone was put into a 2 L three-neck flask provided with a stirrer, a thermometer, a reflux cooling pipe, and a nitrogen gas introduction pipe and heated to 75° C. While the temperature inside the reaction container was maintained to 75° C., a mixed solution formed of 180.0 g of phenoxyethyl acrylate, 162.0 g of methyl methacrylate, 18.0 of acrylic acid, 72 g of methyl ethyl ketone, and 1.44 g of "V-601" (manufactured by Wako Pure Chemical Industries, Ltd., polymerization initiator) was added dropwise at a constant speed such that the dropwise addition was completed within 2 hours. After the dropwise addition was completed, a solution formed of 0.72 g of "V-601" and 36.0 g of methyl ethyl ketone was added thereto, the solution was stirred at 75° C. for 2 hours, a solution formed of 0.72 g of "V-601" and 36.0 g of isopropanol was added thereto, and the solution was stirred at 75° C. for 2 hours and heated to 85° C., and then the solution was continuously stirred for 2 hours. The weight-average molecular weight (Mw) of the obtained copolymer was 64000 and the acid value thereof was 38.9 mgKOH/g. The acid value and the weight-average molecular weight were measured using known methods.

Next, 668.3 g of a polymer solution was weighed, 388.3 g of isopropanol and 145.7 mL of a 1 mol/L NaOH aqueous solution was added thereto, and the temperature inside of the reaction container was heated to 80° C. Next, 720.1 g of distilled water was added dropwise at a rate of 20 mL/min and dispersed in water. Thereafter, the temperature inside the reaction container was maintained at 80° C. for 2 hours, 85° C. for 2 hours, and 90° C. for 2 hours under the atmospheric pressure, the pressure inside the reaction container was reduced, and 913.7 g of isopropanol, methyl ethyl ketone, and distilled water in total were distilled off, thereby obtaining an aqueous dispersion (emulsion) of resin particles (B-01) having a concentration of solid contents of 28.0% by mass. Further, the numerical values of each constitutional unit of the exemplary compound (B-01) shown below indicate the mass ratios.

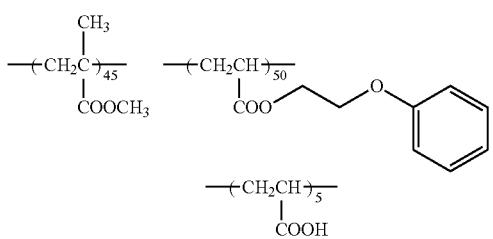
(B-01)

(Preparation of Ink 1)

Respective components were mixed to obtained the ink compositions listed in Table 2 and ink compositions (magenta ink composition M1, black ink composition K1, cyan ink composition C1, and yellow ink composition Y1) were respectively prepared using each of the pigment dispersion liquids obtained in the above-described manner (cyan dispersion liquid C, magenta dispersion liquid M, yellow dispersion liquid Y, black dispersion liquid K), and resin particles B-01.

Each of the prepared ink compositions was filtered by a polyfluoride vinylidene (PVDF) filter having a pore size of 5 (Millex SV, manufactured by Merck Millipore Corporation, diameter of 25 mm) using a plastic disposable syringe to obtain inks (magenta ink M1, black ink K1, cyan ink C1, and yellow ink Y1).

TABLE 2

|  |  | Ink 1 | | | |
|---|---|---|---|---|---|
| Ink composition | | M1 | K1 | C1 | Y1 |
| Ink composition (% by mass) | Magenta pigment (Pigment Red 122) | 4 | — | — | — |
| | Black pigment (carbon black) | — | 4 | — | — |
| | Cyan pigment (Pigment Blue 15:3) | — | — | 4 | — |
| | Yellow Pigment (Pigment Yellow 74) | — | — | — | 4 |
| | Pigment dispersing agent (polymer dispersing agent P-1) | 2 | 2 | 2 | 2 |
| | SANNIX GP-250 | 10 | 10 | 10 | 10 |
| | Tripropylene glycol monomethyl ether | 5 | 5 | 5 | 5 |
| | Olefin E1010 | 1 | 1 | 1 | 1 |
| | Resin particles (B-01) | 8 | 8 | 8 | 8 |
| | water | 70 | 70 | 70 | 70 |

(Description of Table 2)

SANNIX GP-250 . . . organic solvent (manufactured by SANYO CHEMICAL INDUSTRIES, LTD.)

Olefin E1010 . . . non-ionic surfactant (manufactured by Nissin Chemical Industry Co., Ltd.)

Examples 1 to 49 and Comparative Examples 1 to 4

<Ink Set>

Ink sets 1 to 54 obtained by combining each of the inks (magenta ink composition M1, black ink composition K1, cyan ink composition C1, and yellow ink composition Y1) with each of the treatment liquids (treatment liquids A to F). Images were formed by the following procedures using these ink sets and then evaluated.

<Image Formation>

An image was formed under the following conditions using coated paper (CartaIntegra, manufactured by Metsaboard, having a contact angle of 74° or greater when 3 seconds have elapsed from application of water droplets to the surface) as a substrate.

In the image formation, ink ejection was set to be started within 10 seconds after the processing liquid applying step.

Further, the contact angle between the substrate and water can be measured using a contact angle meter DROP MASTER DM700 (manufactured by Kyowa Interface Science Co., Ltd.) in conformity with JIS R3257. The amount of droplets was set to 2 μL and the contact angle of the substrate was measured when 3 seconds elapsed after water droplets had fallen.

(Pre-Treatment Process)

The treatment liquid was applied to the substrate using a coating bar immediately before the ink was applied to the substrate. The substrate was coated with the treatment liquid such that the coating amount thereof was set to 1.7 g/m².

Next, the treatment liquid applied to the substrate was dried under the following conditions.

~Conditions for Drying Treatment Liquid (Blast Drying)~

Wind speed: 15 m/s

Temperature and heating method: The treatment liquid was dried using a contact-type planar heater from the rear surface (the surface on the side on which the treatment liquid was not applied) of the substrate such that the surface temperature (the temperature on the side on which the treatment liquid was applied) of the substrate was set to 60°.

Blast area: 450 mm (drying time of 0.7 seconds)

(Image Forming Step)

A four-color single pass image was formed on the substrate to which the treatment liquid was applied under the following conditions.

Specifically, an image was formed by applying (ejecting) each color of ink to the treatment liquid of the substrate to which the treatment liquid was applied.

Head: A head formed by disposing piezo full line heads of 1200 dpi (dot per inch)/20 inch width for 4 colors was used.

Amount of droplets to be ejected: The amount was set to 2.4 pL.

Drive frequency: The drive frequency was set to 30 kHz (with a conveying speed of the substrate of 635 mm/sec).

Next, the ink applied to the substrate was dried under the following conditions.

~Conditions for Drying Ink (Blast Drying)~

Wind speed: 15 m/s

Temperature: The substrate was heated using a contact-type planar heater from the rear surface (the surface on the side on which the treatment liquid was not applied) of the substrate such that the surface temperature (the temperature on the side on which the treatment liquid was applied) of the substrate was set to 60°.

Blast area: 640 mm (drying time of 1 second)

(Heating and Fixing Step)

An image formed by applying the ink was heated and fixed under the following conditions using a silicon rubber roller (a hardness of 50° and a nip width of 5 mm).

In this manner, a sample having a substrate on which an image was formed was obtained.

~Conditions of Heating and Fixing~

Roller temperature: 90°

Pressure: 0.8 MPa

<Evaluation>

The following evaluations were performed on samples obtained in the above-described manner. The evaluation results are listed in Tables 3 and 4.

1. Evaluation of Density of Solid Image Portion

A solid image having a single color of black ink was formed on the substrate, and a recorded material was obtained. The density of the solid image portion was measured using the recorded material on which an image was formed. The density of the solid image portion was measured with visual (V) density using spectrophotometer SPECTROEYE (manufactured by Sakata Inx Eng. Co., Ltd.).

When the impacted and aggregated ink dots were small, the density of the solid image portion was affected by the white background so that the density appeared to be low. Further, when the aggregating properties of the ink set were degraded, impact interference occurred between the ink set and ink dots adjacent to the ink set, and the white background was easily seen. Therefore, the density thereof appeared to be low. Further, the ranks 5 and 4 in the following evaluation standard are practically acceptable levels.

—Evaluation Standard—

5: The density of the solid image portion in the recorded material was greater than 1.9.

4: The density of the solid image portion in the recorded material was greater than 1.7 and 1.9 or less.

3: The density of the solid image portion in the recorded material was greater than 1.5 and 1.7 or less.

2: The density of the solid image portion in the recorded material was greater than 1.3 and 1.5 or less.

1: The density of the solid image portion in the recorded material was 1.3 or less.

2. Evaluation of Graininess of Image

In the image forming step, a magenta ink was applied to the treatment liquid in a solid state to form a magenta solid image, and a cyan ink was applied to the obtained magenta solid image in the form of halftone dots such that the half tone dot area rate was set to be in a range of 50% to 80%, thereby obtaining a secondary color image. The above-described heating and fixing treatment was performed on the obtained secondary color image. The heated and fixed secondary color image was visually observed and the graininess of the image was evaluated based on the following standard.

—Evaluation Standard—

5: Graininess was not found in the entire image and the surface of the image was uniform.

4: Graininess was extremely slightly found, but the surface of the image was almost uniform as a whole.

3: Graininess was slightly found, which was problematic in practical use.

2: Graininess was conspicuous, which was problematic in practical use.

1: Graininess with strong shading largely occurred and the surface of the image was not uniform.

3. Evaluation of Streak Unevenness

A solid image having a single color of black ink was formed on the substrate, and a recorded material was obtained. The recorded material on which an image was formed was visually observed, and the presence or absence of occurrence of streak unevenness in the recorded material in the conveyance direction was confirmed.

The degree of occurrence of streak unevenness in the recorded material on which an image was formed was evaluated based on the following standard.

The streak unevenness easily occurs when ejection bending of the inkjet ejection head is large and streaks generated due to the ejection bending are easily recognized when dots are small. Further, when the aggregating properties of the ink set were degraded, impact interference occurred between the ink set and ink dots adjacent to the ink set, and the color of the substrate (white background) was easily seen. Therefore, streak unevenness occurs.

—Evaluation Standard—

5: Streak unevenness in the recorded material was not found.

4: One extremely thin line was found in the recorded material, but this is an acceptable level in practical use.

3: Two to four extremely thin lines were found in the recorded material, but this is an acceptable level in practical use.

2: One to four lines which were easily found in the recorded material were generated, but this is not an acceptable level in practical use.

1: Multiple lines which were easily found in the recorded material were generated, but this is not an acceptable level in practical use.

4. Evaluation of Stability of Treatment Liquid 25 g of each treatment liquids corresponding to each of the examples and comparative examples, which was obtained in the above-described manner, was put into 30 mL polyvin, and the polyvin was stored in an incubation chamber whose temperature was set to 40° C. for 2 weeks. The viscosity of the treatment liquid was measured before and after the storage and the Δ viscosity was calculated according to the following equation.

ΔViscosity=(viscosity of treatment liquid after storage at 40° C. for 2 weeks)−(viscosity of treatment liquid)

The temporal stability (temporal stability at 40° C.) of the treatment liquid was evaluated based on the obtained Δ viscosity and the following evaluation standard.

The temporal stability of the treatment liquid became excellent as the Δ viscosity was smaller. Further, the temporal stability of the treatment liquid at a high temperature was degraded as the Δ viscosity was larger.

The ranks 5 and 4 in the following evaluation standard are practically acceptable levels.

—Evaluation Standard—
5: The Δ viscosity was 0.3 mPa·s or less.
4: The Δ viscosity was greater than 0.3 mPa·s and 0.6 mPa·s or less.
3: The Δ viscosity was greater than 0.6 mPa·s and 1.0 mPa·s or less.
2: The Δ viscosity was greater than 1.0 mPa·s and 2.0 mPa·s or less.
1: The Δ viscosity was greater than 2.0 mPa·s.

5. Evaluation of Re-Dispersibility after Drying

A plastic plate was coated with each treatment liquid obtained in the above-described manner such that the thickness of the coating film was set to 10 μm and then dried at 40° C. for 6 hours. The dried plastic plate was cut into a square shape with a size of 1 cm×1 cm, the cut plate was put into a vial bottle, water was added thereto, and the resultant was stirred, and then evaluation was performed visually on whether the coating film of the treatment liquid was re-dispersed based on the following evaluation standard.

It is preferable that the dried coating film on the plastic plate was re-dispersed in water and did not remain in a solid form. The ranks 6 to 3 in the following evaluation standard are practically acceptable levels.

—Evaluation Standard—
6: After addition of water and stirring for 30 seconds, the solid matter was not found.
5: The solid matter having a long side with a size of less than 0.3 cm was observed after addition of water and stirring for 30 seconds, but was not found at all after 1 minute from the stirring.
4: The solid matter having a long side with a size of less than 0.3 cm was observed after addition of water and stirring for 30 seconds, but was not found at all after 3 minutes from the stirring.
3: The solid matter having a long side with a size of less than 0.3 cm was observed after addition of water and stirring for 2 minutes, but was not found at all after 20 minutes from the stirring.
2: After addition of water and stirring for 30 minutes, the solid matter having a long side with a size of less than 0.3 cm remained.
1: After addition of water and stirring for 30 minutes, the solid matter having a long side with a size of 0.3 cm or greater remained.

TABLE 3

| | Ink set | Type | Content (% by mass) | Carboxy group or salt of carboxy group (A) (mmol) | Content of constitutional unit derived from monomer containing carboxy group or salt of carboxy group (% by mass) | Sulfo group or salt of sulfo group (B) (mmol) | Content of constitutional unit derived from monomer containing sulfo group or salt of sulfo group (% by mass) | [amount of sulfo group or salt of sulfo group (mmol)/amount of carboxy group or salt of carboxy group (mmol)] (B/A) | Content of constitutional unit containing hydrophobic group (% by mass) | Content of constitutional unit containing hydrophobic group (% by mass)/content of constitutional unit derived from monomer containing carboxy group or salt of carboxy group (% by mass) | Tg of water-insoluble resin particles (° C.) |
|---|---|---|---|---|---|---|---|---|---|---|---|
| Example 1 | Ink set 1 | A-1 | 5 | 3.48 | 30.00 | 0.65 | 15.00 | 0.19 | 0.00 | 0.00 | 132 |
| Example 2 | Ink set 2 | A-2 | 5 | 1.16 | 10.00 | 0.65 | 15.00 | 0.56 | 0.00 | 0.00 | 110 |
| Example 4 | Ink set 4 | A-4 | 5 | 5.81 | 50.00 | 0.44 | 10.00 | 0.08 | 0.00 | 0.00 | 145 |
| Example 5 | Ink set 5 | A-5 | 5 | 6.96 | 60.00 | 0.44 | 10.00 | 0.06 | 0.00 | 0.00 | 132 |
| Example 6 | Ink set 6 | A-6 | 5 | 3.48 | 30.00 | 1.09 | 25.00 | 0.31 | 0.00 | 0.00 | 147 |
| Example 7 | Ink set 7 | A-7 | 5 | 3.48 | 30.00 | 0.65 | 15.00 | 0.19 | 20.00 | 0.67 | 105 |
| Example 8 | Ink set 8 | A-8 | 5 | 3.48 | 30.00 | 0.65 | 15.00 | 0.19 | 0.00 | 0.00 | 131 |
| Example 9 | Ink set 9 | A-9 | 5 | 2.08 | 30.00 | 0.65 | 15.00 | 0.31 | 0.00 | 0.00 | 107 |
| Example 10 | Ink set 10 | A-10 | 5 | 3.48 | 30.00 | 0.61 | 15.00 | 0.18 | 0.00 | 0.00 | 112 |
| Example 11 | Ink set 11 | A-11 | 5 | 5.35 | 30.00 | 0.65 | 15.00 | 0.12 | 0.00 | 0.00 | 105 |
| Example 12 | Ink set 12 | A-12 | 5 | 2.79 | 25.00 | 0.65 | 15.00 | 0.23 | 0.00 | 0.00 | 124 |
| Example 13 | Ink set 13 | A-13 | 5 | 3.48 | 30.00 | 0.00 | 0.00 | 0.00 | 0.00 | 0.00 | 120 |
| Example 15 | Ink set 15 | A-1 | 1 | 3.48 | 30.00 | 0.65 | 15.00 | 0.19 | 0.00 | 0.00 | 132 |
| Example 16 | Ink set 16 | A-1 | 3 | | | | | | | | |
| Example 17 | Ink set 17 | A-1 | 10 | | | | | | | | |
| Example 18 | Ink set 18 | A-1 | 5 | 3.48 | 30.00 | 0.65 | 15.00 | 0.19 | 0.00 | 0.00 | 132 |
| Example 19 | Ink set 19 | A-13 | 5 | 3.48 | 30.00 | 0.00 | 0.00 | 0.00 | 0.00 | 0.00 | 120 |
| Example 20 | Ink set 20 | A-1 | 5 | 3.48 | 30.00 | 0.65 | 15.00 | 0.19 | 0.00 | 0.00 | 132 |
| Example 21 | Ink set 21 | A-13 | 5 | 3.48 | 30.00 | 0.00 | 0.00 | 0.00 | 0.00 | 0.00 | 120 |
| Example 22 | Ink set 22 | A-1 | 5 | 3.48 | 30.00 | 0.65 | 15.00 | 0.19 | 0.00 | 0.00 | 132 |
| Example 23 | Ink set 23 | A-1 | 5 | 3.48 | 30.00 | 0.65 | 15.00 | 0.19 | 0.00 | 0.00 | 132 |
| Example 24 | Ink set 24 | A-1 | 5 | 3.48 | 30.00 | 0.65 | 15.00 | 0.19 | 0.00 | 0.00 | 132 |

TABLE 3-continued

| | | | | | | | | | | | |
|---|---|---|---|---|---|---|---|---|---|---|---|
| Example 25 | Ink set 25 | A-14 | 5 | 3.48 | 30.00 | 0.65 | 15.00 | 0.19 | 0.00 | 0.00 | 128 |
| Example 27 | Ink set 27 | A-16 | 5 | 1.85 | 20.00 | 0.24 | 5.00 | 0.13 | 0.00 | 0.00 | 125 |

| | Water-insoluble resin particles | | Aggregation compound | | Water-insoluble resin particle/ aggregation compound (mass ratio) | Evaluation result | | | | |
|---|---|---|---|---|---|---|---|---|---|---|
| | Volume average particle diameter (nm) (index of water solubility) | Weight-average molecular weight (×10⁴) | Type of treatment liquid | Content of aggregation compound (% by mass) | | Density evaluation of solid image portion | Streak unevenness evaluation | Graininess evaluation of image | Stability evaluation of treatment liquid | Re-dispersibility evaluation after drying |
| Example 1 | 30 (water-insoluble) | 11.5 | A | 25.9 | 0.19 | 5 | 5 | 5 | 5 | 3 |
| Example 2 | 30 (water-insoluble) | 11.0 | A | 25.9 | 0.19 | 5 | 5 | 5 | 5 | 3 |
| Example 4 | 120 (water-insoluble) | 15.2 | A | 25.9 | 0.19 | 5 | 5 | 5 | 5 | 3 |
| Example 5 | 150 (water-insoluble) | 14.2 | A | 25.9 | 0.19 | 4 | 4 | 5 | 4 | 3 |
| Example 6 | 30 (water-insoluble) | 14.2 | A | 25.9 | 0.19 | 5 | 5 | 5 | 5 | 3 |
| Example 7 | 50 (water-insoluble) | 12.4 | A | 25.9 | 0.19 | 5 | 5 | 5 | 5 | 5 |
| Example 8 | 30 (water-insoluble) | 32.12 | A | 25.9 | 0.19 | 5 | 5 | 5 | 5 | 3 |
| Example 9 | 90 (water-insoluble) | 24.8 | A | 25.9 | 0.19 | 5 | 5 | 5 | 5 | 3 |
| Example 10 | 110 (water-insoluble) | 12.1 | A | 25.9 | 0.19 | 5 | 5 | 5 | 5 | 3 |
| Example 11 | 70 (water-insoluble) | 13.1 | A | 25.9 | 0.19 | 5 | 5 | 5 | 5 | 3 |
| Example 12 | 30 (water-insoluble) | 22.5 | A | 25.9 | 0.19 | 5 | 5 | 5 | 5 | 3 |
| Example 13 | 100 (water-insoluble) | 12.5 | A | 25.9 | 0.19 | 4 | 4 | 4 | 3 | 3 |
| Example 15 | 30 (water-insoluble) | 11.5 | A | 25.9 | 0.04 | 4 | 4 | 5 | 5 | 3 |
| Example 16 | | | A | 25.9 | 0.12 | 5 | 5 | 5 | 5 | 3 |
| Example 17 | | | A | 25.9 | 0.30 | 5 | 5 | 5 | 4 | 3 |
| Example 18 | 30 (water-insoluble) | 11.5 | B | 10.0 | 0.50 | 5 | 4 | 4 | 4 | 3 |
| Example 19 | 30 (water-insoluble) | 12.5 | B | 10.0 | 0.50 | 4 | 4 | 4 | 4 | 3 |
| Example 20 | 30 (water-insoluble) | 11.5 | C | 10.0 | 0.50 | 5 | 4 | 4 | 4 | 3 |
| Example 21 | 30 (water-insoluble) | 12.5 | C | 10.0 | 0.50 | 4 | 4 | 4 | 5 | 3 |
| Example 22 | 30 (water-insoluble) | 11.5 | D | 10.0 | 0.50 | 5 | 5 | 5 | 5 | 3 |
| Example 23 | 30 (water-insoluble) | 11.5 | E | 5.0 | 1.00 | 5 | 4 | 4 | 5 | 3 |
| Example 24 | 30 (water-insoluble) | 11.5 | F | 3.0 | 1.67 | 4 | 4 | 3 | 5 | 3 |
| Example 25 | 110 (water-insoluble) | 12.8 | A | 25.9 | 0.19 | 4 | 4 | 5 | 4 | 3 |
| Example 27 | 100 (water-insoluble) | 12.5 | A | 25.9 | 0.19 | 4 | 4 | 5 | 5 | 3 |

TABLE 4

| | | | Water-insoluble resin particles | | | | | | |
|---|---|---|---|---|---|---|---|---|---|
| | Ink set | Type | Content (% by mass) | Carboxy group or salt of carboxy group (A) (mmol) | Content of constitutional unit derived from monomer containing carboxy group or salt of carboxy group (% by mass) | Sulfo group or salt of sulfo group (B) (mmol) | Content of constitutional unit derived from monomer containing sulfo group or salt of sulfo group (% by mass) | [amount of sulfo group or salt of sulfo group (mmol)/amount of carboxy group or salt of carboxy group (mmol)] (B/A) | Content of constitutional unit containing hydrophobic group (% by mass) |
| Example 31 | Ink set 31 | A-20 | 5 | 3.48 | 30.00 | 0.72 | 15.00 | 0.21 | 10.00 |
| Example 32 | Ink set 32 | A-21 | 5 | 3.48 | 30.00 | 0.72 | 15.00 | 0.21 | 20.00 |
| Example 33 | Ink set 33 | A-22 | 5 | 3.48 | 30.00 | 0.72 | 15.00 | 0.21 | 30.00 |
| Example 34 | Ink set 34 | A-23 | 5 | 3.48 | 30.00 | 0.72 | 15.00 | 0.21 | 20.00 |
| Example 35 | Ink set 35 | A-24 | 5 | 3.48 | 30.00 | 0.72 | 15.00 | 0.21 | 25.00 |
| Example 36 | Ink set 36 | A-25 | 5 | 3.48 | 30.00 | 0.72 | 15.00 | 0.21 | 30.00 |
| Example 37 | Ink set 37 | A-26 | 5 | 3.48 | 30.00 | 0.72 | 15.00 | 0.21 | 5.00 |
| Example 38 | Ink set 38 | A-27 | 5 | 3.48 | 30.00 | 0.72 | 15.00 | 0.21 | 40.00 |
| Example 39 | Ink set 39 | A-28 | 5 | 3.48 | 30.00 | 0.72 | 15.00 | 0.21 | 20.00 |
| Example 40 | Ink set 40 | A-29 | 5 | 3.48 | 30.00 | 0.72 | 15.00 | 0.21 | 20.00 |
| Example 41 | Ink set 41 | A-37 | 5 | 4.41 | 30.00 | 0.48 | 10.00 | 0.11 | 30.00 |
| Example 42 | Ink set 42 | A-24 | 5 | 3.48 | 30.00 | 0.72 | 15.00 | 0.21 | 25.00 |
| Example 43 | Ink set 43 | A-30 | 5 | 1.09 | 30.00 | 0.72 | 15.00 | 0.66 | 0.00 |
| Example 44 | Ink set 44 | A-31 | 5 | 2.15 | 25.00 | 0.72 | 15.00 | 0.34 | 0.00 |
| Example 45 | Ink set 45 | A-32 | 5 | 1.69 | 25.00 | 0.61 | 15.00 | 0.36 | 0.00 |
| Example 46 | Ink set 46 | A-33 | 5 | 2.31 | 25.00 | 0.72 | 15.00 | 0.31 | 0.00 |
| Example 47 | Ink set 47 | A-34 | 5 | 1.05 | 25.00 | 0.20 | 5.00 | 0.19 | 0.00 |
| Example 48 | Ink set 48 | A-35 | 5 | 1.07 | 30.00 | 0.20 | 5.00 | 0.19 | 0.00 |
| Example 49 | Ink set 49 | A-36 | 5 | 1.13 | 30.00 | 0.20 | 5.00 | 0.18 | 0.00 |

TABLE 4-continued

| | | | | | | | | |
|---|---|---|---|---|---|---|---|---|
| Comparative Example 1 | Ink set 51 | X-1 | 5 | 3.48 | 30.00 | 3.05 | 70.00 | 0.88 | 0.00 |
| Comparative Example 2 | Ink set 52 | X-2 | 5 | 0.00 | 0.00 | 0.00 | 0.00 | — | 0.00 |
| Comparative Example 3 | Ink set 53 | X-3 | 5 | 0.47 | 4.00 | 0.00 | 0.00 | 0.00 | 0.00 |
| Comparative Example 4 | Ink set 54 | X-4 | 5 | 7.55 | 65.00 | 0.24 | 5.00 | 0.03 | 0.00 |

| | Water-insoluble resin particles | | | | Aggregation compound | | |
|---|---|---|---|---|---|---|---|
| | Content of constitutional unit containing hydrophobic group (% by mass)/content of constitutional unit derived from monomer containing carboxy group or salt of carboxy group (% by mass) | Tg of water-insoluble resin particles (°C.) | Volume average particle diameter (nm) (index of water solubility) | Weight-average molecular weight (×10$^4$) | Type of treatment liquid | Content of aggregation compound (% by mass) | Water-insoluble resin particle/aggregation compound (mass ratio) |
| Example 31 | 0.33 | 130 | 30 (water-insoluble) | 12.0 | A | 25.9 | 0.19 |
| Example 32 | 0.67 | 129 | 30 (water-insoluble) | 12.5 | A | 25.9 | 0.19 |
| Example 33 | 1.00 | 128 | 30 (water-insoluble) | 10.5 | A | 25.9 | 0.19 |
| Example 34 | 0.67 | 129 | 30 (water-insoluble) | 12.5 | A | 25.9 | 0.19 |
| Example 35 | 0.83 | 128 | 30 (water-insoluble) | 1.25 | A | 25.9 | 0.19 |
| Example 36 | 1.00 | 128 | 30 (water-insoluble) | 2.58 | A | 25.9 | 0.19 |
| Example 37 | 0.17 | 130 | 30 (water-insoluble) | 8.95 | A | 25.9 | 0.19 |
| Example 38 | 1.33 | 127 | 30 (water-insoluble) | 13.5 | A | 25.9 | 0.19 |
| Example 39 | 0.67 | 126 | 30 (water-insoluble) | 12.6 | A | 25.9 | 0.19 |
| Example 40 | 0.67 | 144 | 30 (water-insoluble) | 9.82 | A | 25.9 | 0.19 |
| Example 41 | 0.79 | 142 | 60 (water-insoluble) | 2.30 | G | 25.9 | 0.19 |
| Example 42 | 0.83 | 128 | 30 (water-insoluble) | 1.25 | G | 25.9 | 0.19 |
| Example 43 | 0.00 | 107 | 30 (water-insoluble) | 12.3 | A | 25.9 | 0.19 |
| Example 44 | 0.00 | 105 | 30 (water-insoluble) | 11.5 | A | 25.9 | 0.19 |
| Example 45 | 0.00 | 101 | 40 (water-insoluble) | 12.4 | A | 25.9 | 0.19 |
| Example 46 | 0.00 | 134 | 30 (water-insoluble) | 12.5 | A | 25.9 | 0.19 |
| Example 47 | 0.00 | 98 | 40 (water-insoluble) | 13.4 | A | 25.9 | 0.19 |
| Example 48 | 0.00 | 102 | 30 (water-insoluble) | 11.0 | A | 25.9 | 0.19 |
| Example 49 | 0.00 | 101 | 30 (water-insoluble) | 9.80 | A | 25.9 | 0.19 |
| Comparative Example 1 | 0.00 | 115 | Undetected (water-soluble) | 7.80 | A | 25.9 | 0.19 |
| Comparative Example 2 | 0.00 | 101 | 50 (water-insoluble) | 12.5 | A | 25.9 | 0.19 |
| Comparative Example 3 | 0.00 | 102 | 30 (water-insoluble) | 8.90 | A | 25.9 | 0.19 |
| Comparative Example 4 | 0.00 | 190 | 230 (water-insoluble) | 35.0 | A | 25.9 | 0.19 |

| | Evaluation result | | | | |
|---|---|---|---|---|---|
| | Density evaluation of solid image portion | Streak unevenness evaluation | Graininess evaluation of image | Stability evaluation of treatment liquid | Re-dispersibility evaluation after drying |
| Example 31 | 5 | 5 | 5 | 5 | 5 |
| Example 32 | 5 | 5 | 5 | 5 | 5 |
| Example 33 | 5 | 5 | 5 | 5 | 5 |
| Example 34 | 5 | 5 | 5 | 5 | 5 |
| Example 35 | 5 | 5 | 5 | 5 | 6 |
| Example 36 | 5 | 5 | 5 | 5 | 6 |
| Example 37 | 5 | 5 | 5 | 5 | 4 |
| Example 38 | 5 | 5 | 5 | 5 | 5 |
| Example 39 | 5 | 5 | 5 | 5 | 3 |
| Example 40 | 5 | 5 | 5 | 5 | 3 |
| Example 41 | 5 | 5 | 5 | 5 | 6 |
| Example 42 | 5 | 5 | 5 | 5 | 6 |
| Example 43 | 4 | 4 | 5 | 5 | 3 |
| Example 44 | 5 | 4 | 5 | 5 | 3 |
| Example 45 | 5 | 5 | 5 | 5 | 3 |
| Example 46 | 5 | 4 | 5 | 5 | 3 |
| Example 47 | 4 | 4 | 5 | 4 | 3 |
| Example 48 | 4 | 4 | 5 | 4 | 3 |
| Example 49 | 4 | 4 | 5 | 4 | 3 |

TABLE 4-continued

| | | | | | |
|---|---|---|---|---|---|
| Comparative Example 1 | 1 | 2 | 4 | 4 | 3 |
| Comparative Example 2 | 2 | 2 | 4 | 5 | 3 |
| Comparative Example 3 | 3 | 3 | 4 | 4 | 3 |
| Comparative Example 4 | 3 | 2 | 3 | 1 | 3 |

As shown from Tables 3 and 4, it was found that the results of the density evaluation of the solid image portion, the streak unevenness evaluation, and the graininess evaluation of the image were excellent in all ink sets in a case where the water-insoluble resin particles A-1 to A-37 according to the embodiment of the present invention were used. Therefore, it was understood that an image in which a decrease in density of the solid image portion, occurrence of streak unevenness, and graininess of an image were suppressed can be formed using the ink sets of the embodiment of the present invention.

In a case where a water-soluble resin was used as in Comparative Example 1, the resin did not remain on the surface of the substrate because the resin entered the substrate and the density of the solid image portion decreased and streak unevenness occurred. Further, the stability of the treatment liquid was not degraded, but the initial viscosity was increased when the ink set of Comparative Example 1 was used.

As in Comparative Example 2, in a case where the water-insoluble resin particles did not contain a carboxy group or a salt of the carboxy group, the density of the solid image portion decreased and streak unevenness occurred.

From the comparison of Examples 1 to 5 and Comparative Example 3, it was understood that the results of the density evaluation of the solid image portion, the streak unevenness evaluation, and the graininess evaluation of the image were excellent when the content of a carboxy group or a salt of the carboxy group was in a range of 1.0 mmol to 7.0 mmol per 1 g of the water-insoluble resin particles. Further, it was understood that the results were particularly excellent when the content of a carboxy group or a salt of the carboxy group was in a range of 1.0 mmol to 6.0 mmol per 1 g of the water-insoluble resin particles.

From the comparison of Example 1 and Example 13, it was understood that the results of the density evaluation of the solid image portion, the streak unevenness evaluation, and the stability evaluation of the treatment liquid were particularly excellent when the water-insoluble resin particles contained both of a carboxy group and a sulfo group. From the comparison of Examples 1, 2, 4, and 7 to 12 and Example 5, it was understood that these results were particular excellent when the ratio of the content of the sulfo group or the salt of the sulfo group to the content of the carboxy group or the salt of the carboxy group was in a range of 0.08 to 2.0 on a molar basis.

From the comparison of Example 1 and Examples 18 to 21, it was understood that the results of the density evaluation of the solid image portion, the streak unevenness evaluation, and the graininess evaluation of the image were excellent when the aggregation compound in the treatment liquid was an organic acidic compound.

The entire disclosure of JP2015-039453 filed on Feb. 27, 2015 and JP2015-194355 filed on Sep. 30, 2015 is incorporated herein by reference.

All literatures, patent applications, and technical standards described in the present specification are incorporated herein by reference to the same extent as the case where all literatures, patent applications, and technical standards are specifically and individually indicated to be incorporated by reference.

What is claimed is:

1. An ink set comprising:
an ink composition which contains a colorant and water; and
a treatment liquid which contains water-insoluble resin particles in which a content of a carboxy group or a salt of the carboxy group is in a range of 1.0 mmol to 7.0 mmol per 1 g of the water-insoluble resin particles, a compound that causes the colorant in the ink composition to aggregate, and water,
wherein the water-insoluble resin particles include at least one constitutional unit selected from a constitutional unit represented by Formula 1 or 2, and
the total content of the constitutional unit represented by Formula 1 and the constitutional unit represented by Formula 2 is in a range of 10% by mass to 50% by mass with respect to the total mass of the water-insoluble resin particles,

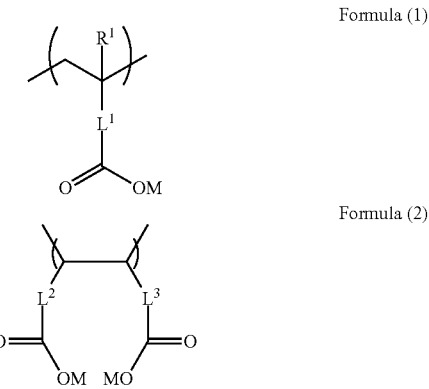

Formula (1)

Formula (2)

in Formula 1, $R^1$ represents a methyl group or a hydrogen atom, $L^1$ represents a single bond, a linear, branched, or cyclic alkylene group having 1 to 12 carbon atoms, an arylene group having 6 to 12 carbon atoms, —O—, —NH—, —S—, —C(=O)—, or a divalent linking group formed by two or more of these being linked to each other, and M represents a hydrogen atom or a cation, and in Formula 2, $L^2$ and $L^3$ each independently represent a single bond or a methylene group, and M represents a hydrogen atom or a cation.

2. The ink set according to claim 1,
wherein the water-insoluble resin particles further include a sulfo group or a salt of the sulfo group.

3. The ink set according to claim 2,
wherein the water-insoluble resin particles include at least one sulfo group or salt of a sulfo group in a terminal of a water-insoluble resin.
4. The ink set according to claim 2,
wherein the content of the sulfo group or the salt of the sulfo group in the water-insoluble resin particles is in a range of 0.1 mmol to 1.2 mmol per 1 g of the water-insoluble resin particles.
5. The ink set according to claim 2,
wherein a ratio of the total amount of the sulfo group or the salt of the sulfo group to the total amount of the carboxy group or the salt of the carboxy group, per 1 g of the water-insoluble resin particles, is in a range of 0.08 to 2.0 on a molar basis.
6. The ink set according to claim 1,
wherein the water-insoluble resin particles include a constitutional unit represented by Formula 3, and
the content of the constitutional unit represented by Formula 3 is in a range of 5% by mass to 25% by mass with respect to the total mass of the water-insoluble resin particles,

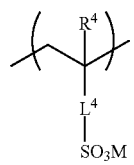

Formula 3 in Formula 3, $R^4$ represents a methyl group or a hydrogen atom, $L^4$ represents a single bond, a linear, branched, or cyclic alkylene group having 1 to 10 carbon atoms, an arylene group having 6 to 10 carbon atoms, —O—, —NH—, —S—, —C(=O)—, —CH(—OH)—, or a divalent linking group formed by two or more of these being linked to each other, and M represents a hydrogen atom or a cation.
7. The ink set according to claim 1,
wherein the water-insoluble resin particles include a constitutional unit containing a hydrophobic group, and
the content of the constitutional unit containing a hydrophobic group is in a range of 5% by mass to 40% by mass with respect to the total mass of the water-insoluble resin particles.
8. The ink set according to claim 7,
wherein a ratio of the content of the constitutional unit containing a hydrophobic group to the content of a constitutional unit derived from a monomer containing a carboxy group or a salt of the carboxy group is in a range of 0.2 to 1.4 on a mass basis, in the water-insoluble resin particles.
9. The ink set according to claim 7,
wherein the constitutional unit containing a hydrophobic group is at least one constitutional unit selected from constitutional units represented by Formulae A to F,

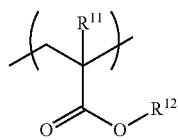

Formula A

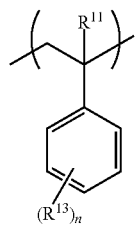

Formula B

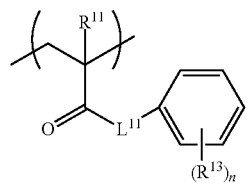

Formula C

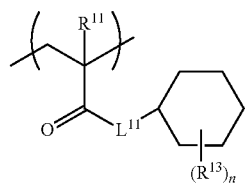

Formula D

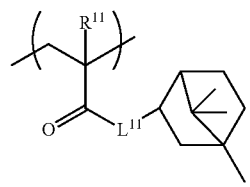

Formula E

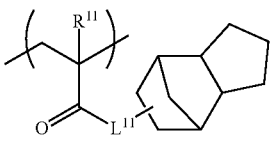

Formula F in Formulae A to F, $R^{11}$ represents a methyl group or a hydrogen atom, $R^{12}$ and $R^{13}$ each independently represent a chain-like or branched alkyl group having 4 or more carbon atoms, n represents an integer of 0 to 6, and $L^{11}$ represents a single bond or a linear, branched, or cyclic alkylene group having 1 to 18 carbon atoms, an arylene group having 6 to 18 carbon atoms, —O—, —NH—, —S—, —C(=O)—, or a divalent linking group formed by two or more of these being linked to each other.
10. The ink set according to claim 9,
wherein the content of the water-insoluble resin particles is in a range of 0.5% by mass to 20% by mass with respect to the total mass of the treatment liquid, and a volume average particle diameter of the water-insoluble resin particles is 1 μm or less.
11. The ink set according to claim 9,
wherein a glass transition temperature of the water-insoluble resin particles is in a range of 100° C. to 250° C., and a weight-average molecular weight of the water-insoluble resin particles is in a range of $5.0 \times 10^3$ to $5.00 \times 10^4$.
12. The ink set according to claim 1,
wherein the content of the water-insoluble resin particles is in a range of 0.5% by mass to 20% by mass with respect to the total mass of the treatment liquid.

13. The ink set according to claim 1,
wherein a volume average particle diameter of the water-insoluble resin particles is 1 μm or less.

14. The ink set according to claim 1,
wherein a glass transition temperature of the water-insoluble resin particles is in a range of 100° C. to 250° C.

15. The ink set according to claim 14,
wherein a weight-average molecular weight of the water-insoluble resin particles is in a range of $5.0 \times 10^3$ to $5.00 \times 10^4$.

16. The ink set according to claim 1,
wherein the compound that causes the colorant in the ink composition to aggregate is an organic acidic compound.

17. The ink set according to claim 16,
wherein a ratio of the content of the water-insoluble resin particles to the content of the compound that causes the colorant in the ink composition to aggregate is in a range of 0.01 to 2.0 on a mass basis.

18. An image forming method comprising:
a pre-treatment step of applying the treatment liquid of the ink set according to claim 1 to at least one surface of a substrate having a contact angle of 70° or greater when 3 seconds have elapsed from application of water droplets to the surface; and an image forming step of forming an image by ejecting the ink composition of the ink set according to claim 1 to the surface of the substrate to which the treatment liquid is applied using an inkjet method.

19. The image forming method according to claim 18,
wherein the substrate is a paper substrate having a coating layer.

* * * * *